(12) United States Patent
Dalsgaard et al.

(10) Patent No.: US 12,486,966 B2
(45) Date of Patent: Dec. 2, 2025

(54) LENS ACTUATION SYSTEM FOR AN OPTICAL DEVICE

(71) Applicant: Harman Professional Denmark ApS, Aarhus N (DK)

(72) Inventors: Carsten Dalsgaard, Silkeborg (DK); Uffe Kjærgaard Toft, Højbjerg (DK)

(73) Assignee: HARMAN PROFESSIONAL DENMARK APS, Aarhus N (DK)

( * ) Notice: Subject to any disclaimer, the term of this patent is extended or adjusted under 35 U.S.C. 154(b) by 0 days.

(21) Appl. No.: 18/963,283

(22) Filed: Nov. 27, 2024

(65) Prior Publication Data

US 2025/0172275 A1    May 29, 2025

Related U.S. Application Data

(60) Provisional application No. 63/603,021, filed on Nov. 27, 2023, provisional application No. 63/603,019, filed on Nov. 27, 2023, provisional application No. 63/603,023, filed on Nov. 27, 2023.

(51) Int. Cl.
| | |
|---|---|
| F21V 14/06 | (2006.01) |
| F21S 2/00 | (2016.01) |
| F21V 8/00 | (2006.01) |
| F21V 17/16 | (2006.01) |
| F21V 19/00 | (2006.01) |
| F21V 21/088 | (2006.01) |
| F21V 29/51 | (2015.01) |
| F21V 29/71 | (2015.01) |
| F21Y 115/10 | (2016.01) |

(52) U.S. Cl.
CPC ............. *F21V 14/06* (2013.01); *F21S 2/005* (2013.01); *F21V 17/166* (2013.01); *F21V 21/088* (2013.01); *F21V 29/51* (2015.01); *F21V 29/713* (2015.01); *G02B 6/0001* (2013.01); *F21V 19/004* (2013.01); *F21Y 2115/10* (2016.08)

(58) Field of Classification Search
CPC ...... F21V 17/166; F21V 19/004; F21V 29/51; F21V 29/713
USPC ...................................... 362/249.1
See application file for complete search history.

(56) References Cited

U.S. PATENT DOCUMENTS

| | | | | |
|---|---|---|---|---|
| 4,729,077 | A * | 3/1988 | Gordin | F21V 21/15 362/306 |
| 5,684,244 | A * | 11/1997 | Jones | B60Q 1/115 362/469 |
| 5,811,656 | A * | 9/1998 | Jones | B60Q 1/115 362/464 |
| 2007/0030547 | A1 | 2/2007 | Dullin et al. | |
| 2009/0080048 | A1 | 3/2009 | Tsao | |

FOREIGN PATENT DOCUMENTS

CN    111998251 A  *  11/2020  ............... F21S 2/00

OTHER PUBLICATIONS

European Patent Office, Extended European Search Report Issued in Application No. 24215407.8, May 8, 2025, Germany, 6 pages.

\* cited by examiner

*Primary Examiner* — Keith G. Delahoussaye
(74) *Attorney, Agent, or Firm* — McCoy Russell LLP

(57) ABSTRACT

Systems are provided for an optical device. The optical device comprises a lens actuation system including a motor, a flywheel, a connecting linkage, a plurality of articulating arms, and a lens. The lens is housed in a frame coupled to the articulating arms and driven via the lens actuation system between an upstream position and a downstream position.

20 Claims, 32 Drawing Sheets

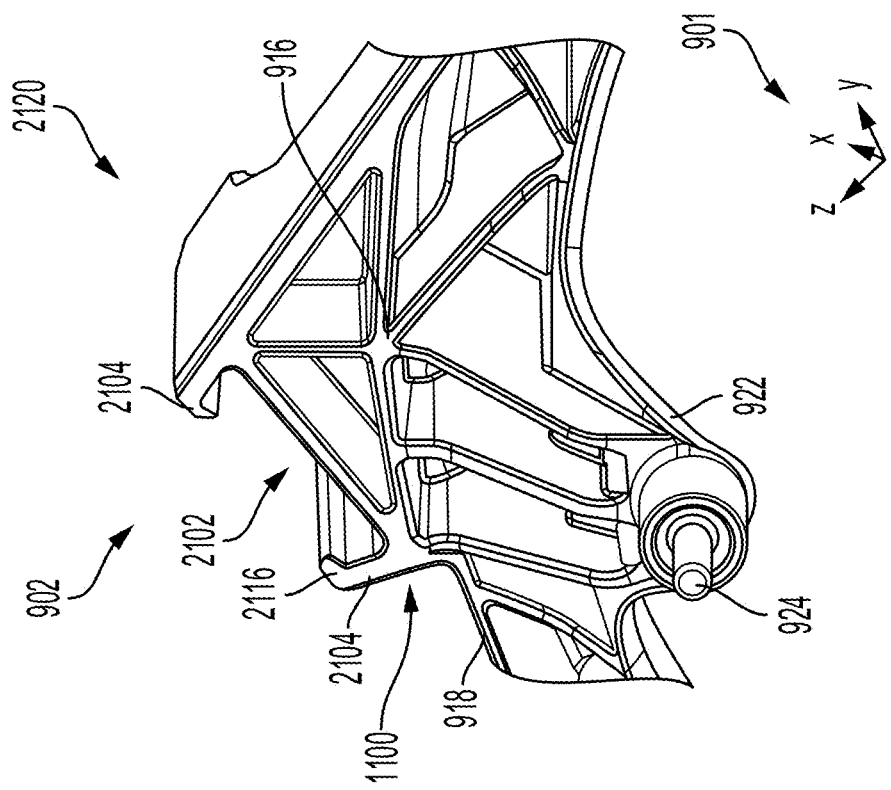
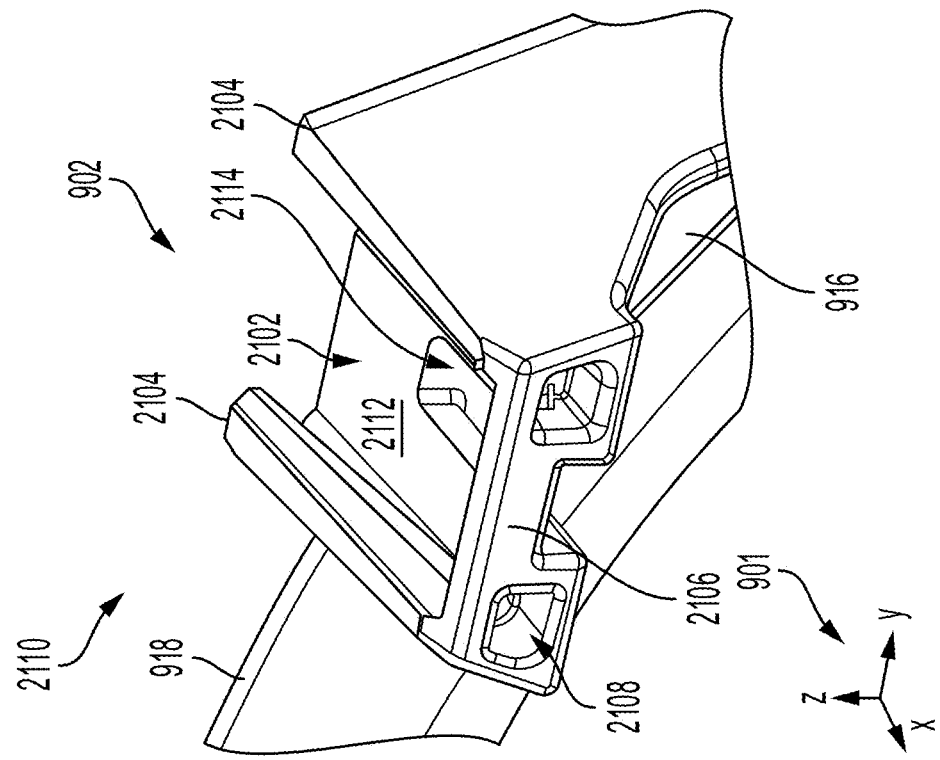
FIG. 21B
FIG. 21A

LENS ACTUATION SYSTEM FOR AN OPTICAL DEVICE

CROSS REFERENCE TO RELATED APPLICATIONS

The present application claims priority to U.S. Provisional Application No. 63/603,023 entitled SYSTEMS FOR AN OPTICAL DEVICE filed Nov. 27, 2023, U.S. Provisional Application No. 63/603,021 entitled SYSTEMS FOR A COUPLING SYSTEM filed Nov. 27, 2023, and U.S. Provisional Application No. 63/603,019 entitled SYSTEMS FOR AN OPTICAL DEVICE filed Nov. 27, 2023. The entire content of the above applications is hereby incorporated by reference for all purposes.

FIELD

The disclosure relates to optical devices, more specifically to a light fixture.

BACKGROUND

Optical devices, such as light fixtures, may be used in a variety of settings. Optical devices may include a light emitting diode (LED) comprising one or more colors. The LED may emit to a light mixing rod (e.g., a light guide) to provide a single light color or a spectrum of colors. Following the light mixing rod, the light may travel through a lens which may distribute (e.g., focus) the light. The lens may be moved linearly (e.g., closer and further away from the light mixing rod) to adjust distribution of light. For example, position of the lens may be adjusted to move between a wide beam and a narrow beam of light. Rapid movement may be demanded in some applications, for example to support strobe optical effects.

Conventional systems for moving the lens along a linear path between two end positions (e.g., upstream position and a downstream position) may include one or more motors adapted to slide the lens between the two end positions and sensors (e.g., one at each of the two end positions) to track location and progression of the lens. For example, a worm drive or a belt drive may be implemented for such lens movement. Precise control of speed and position of the lens may be demanded, particularly at and near each of the two end positions, to prevent degradation to the system. Thus, in conventional systems, the motor drive may decelerate lens movement near each of the two end positions to stop at the end position, then reverse and reaccelerate towards the other end position. Deceleration may limit an average speed of the lens, therefore limiting speed of transition of the lens between the two end positions.

SUMMARY

The disclosure provides support for an optical device that at least partially addresses the issues described above. The optical device comprises a motor, a flywheel rotationally coupled to the motor, a connecting linkage coupled to the flywheel via a rod, and a plurality of articulating arms extending from the connecting linkage to a frame housing a lens. The lens may be moved linearly within a housing of the optical device as a result of rotation of the flywheel which is driven by the motor.

In this way, driving the linear lens movement through circular rotation of the flywheel rather than linear motion (e.g., via a worm drive, belt drive, or the like) may allow the optical device of the present disclosure to operate continuously instead of stopping at each end position. Thus, deceleration of the motor may not be demanded when repeatedly switching between the upstream position and the downstream position. In this way, a speed of cycling between the upstream and downstream positions may be increased (e.g., from once per second to three or more times per second). Additionally, continuous operation may be more energy efficient than stopping at each end position.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIGS. 21A and 21B illustrate a detailed view of the mount;

FIGS. 1-23 are shown approximately to scale.

DETAILED DESCRIPTION

Figure 1:
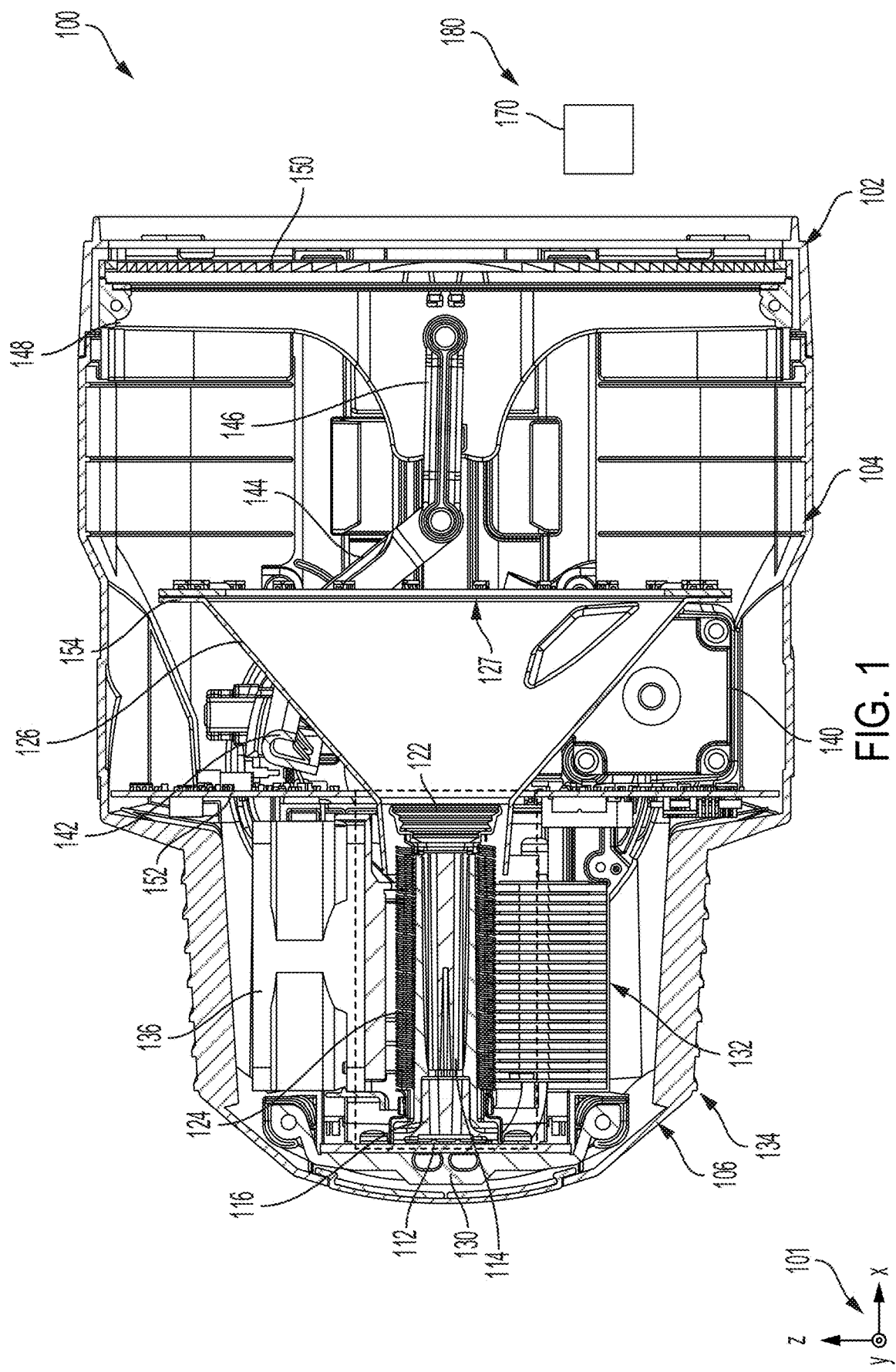
FIG. 1 illustrates a cross-sectional view of an optical device.
Figure 2B:
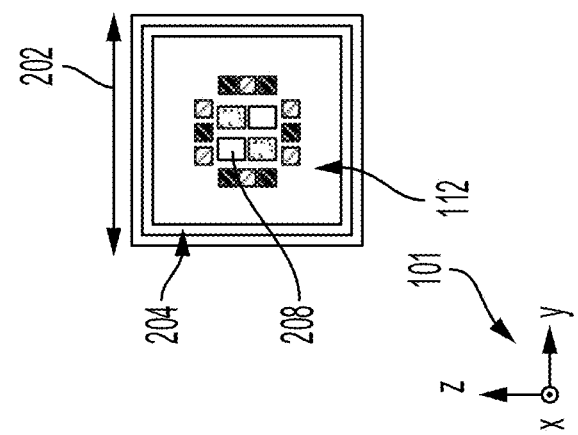
FIG. 2B illustrates the LED.
Figure 2A:
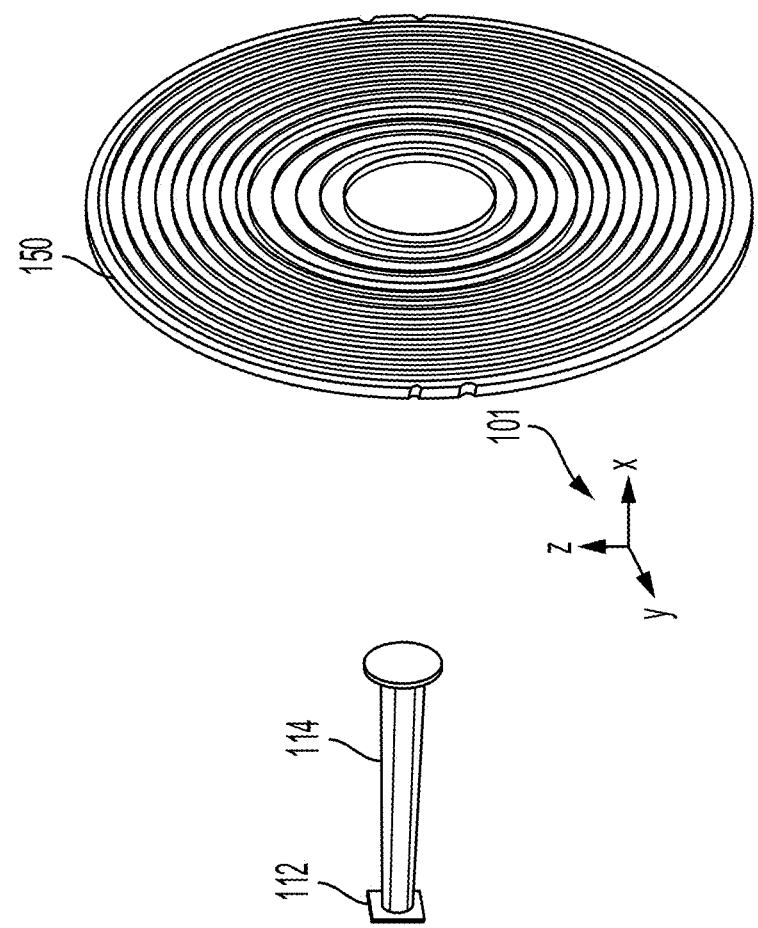
FIG. 2A illustrates examples of a LED, a light mixing rod, and a lens of the optical device.
Figure 3A:
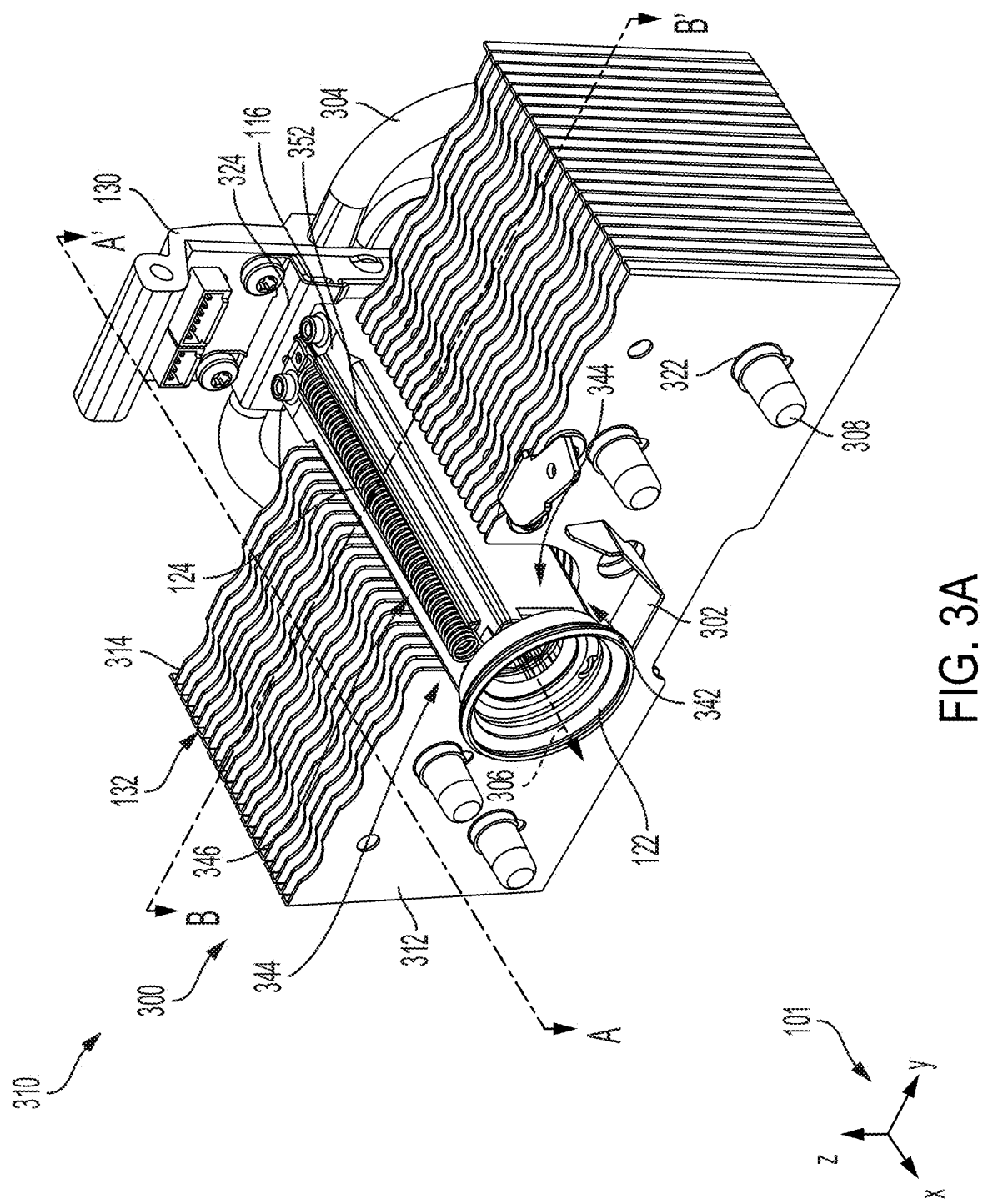
FIGS. 3A-3C illustrate a light engine of the optical device, the light engine comprising the LED, the light mixing rod, and a plurality of heat exchangers.
Figure 3B:
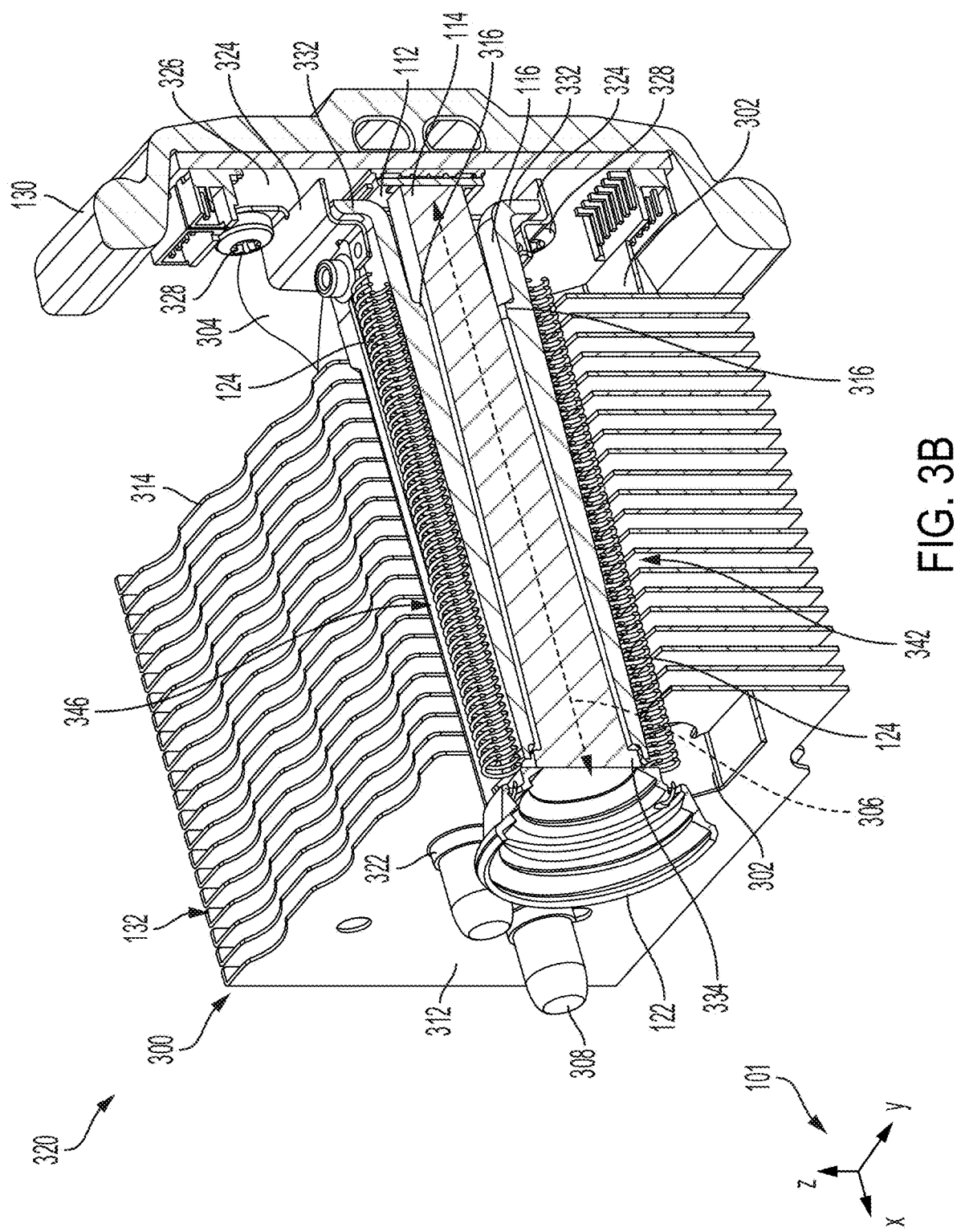
Figure 4A:
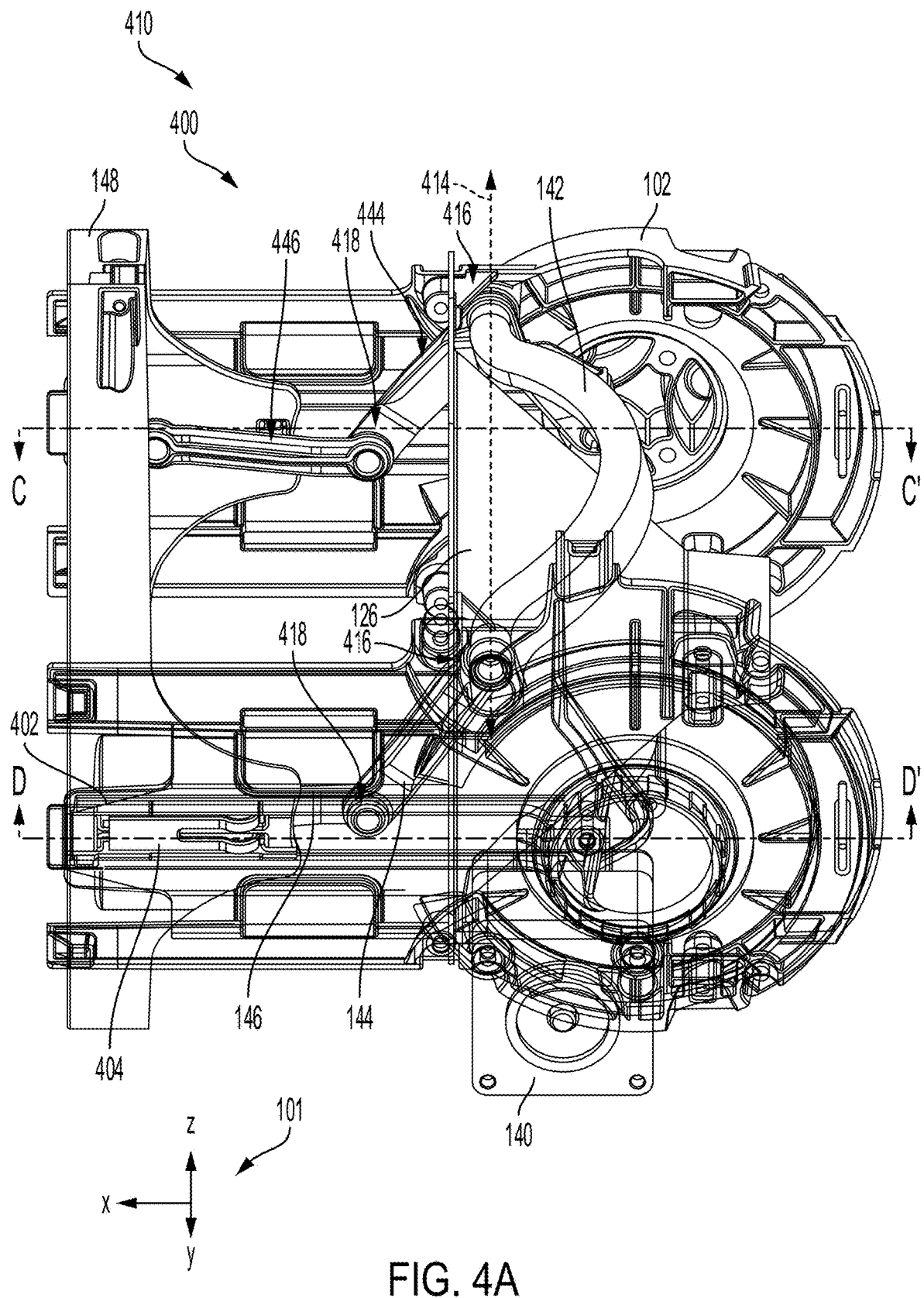
FIGS. 4A-4D illustrate a lens actuation system of the optical device.
Figure 4B:
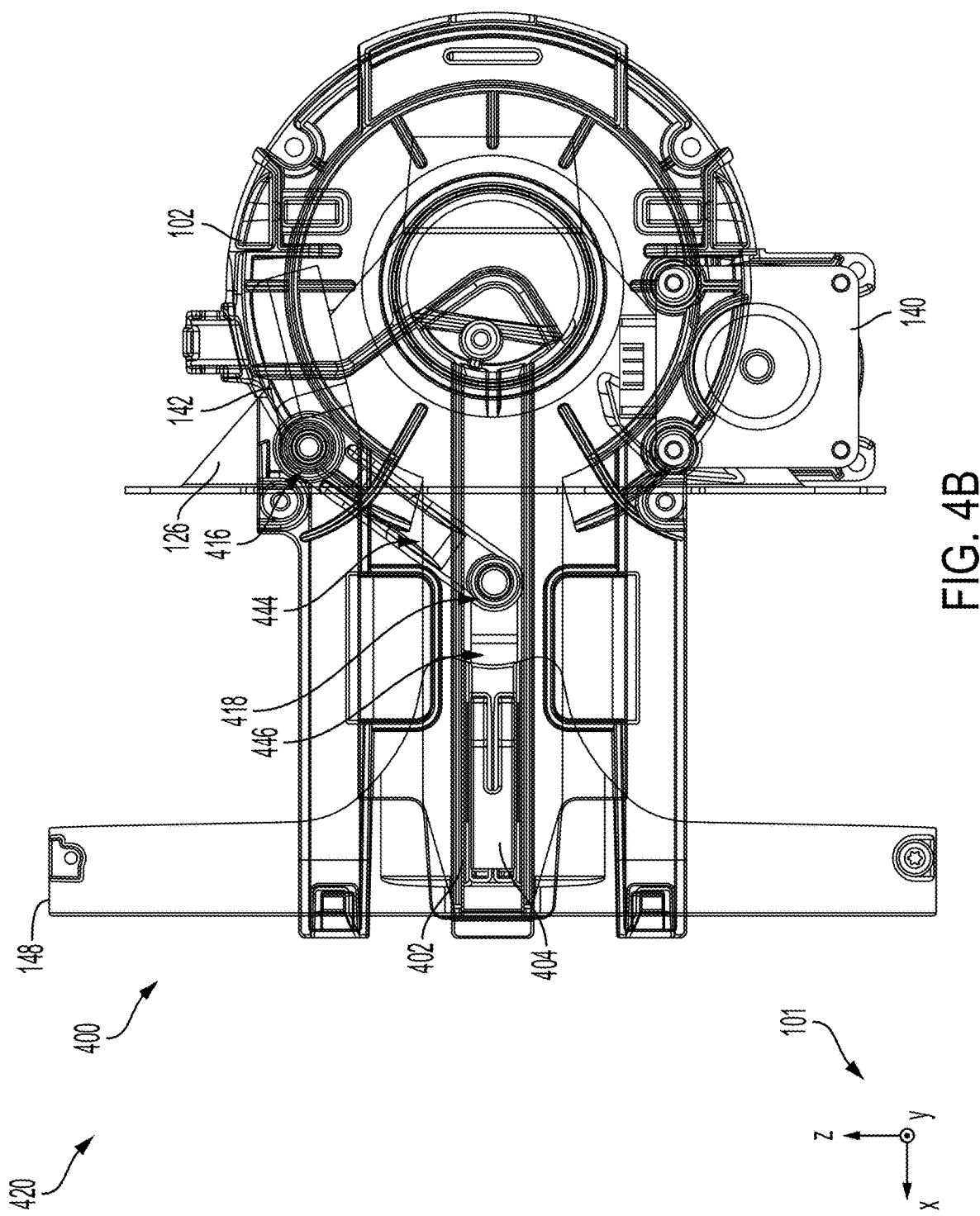
Figure 4C:
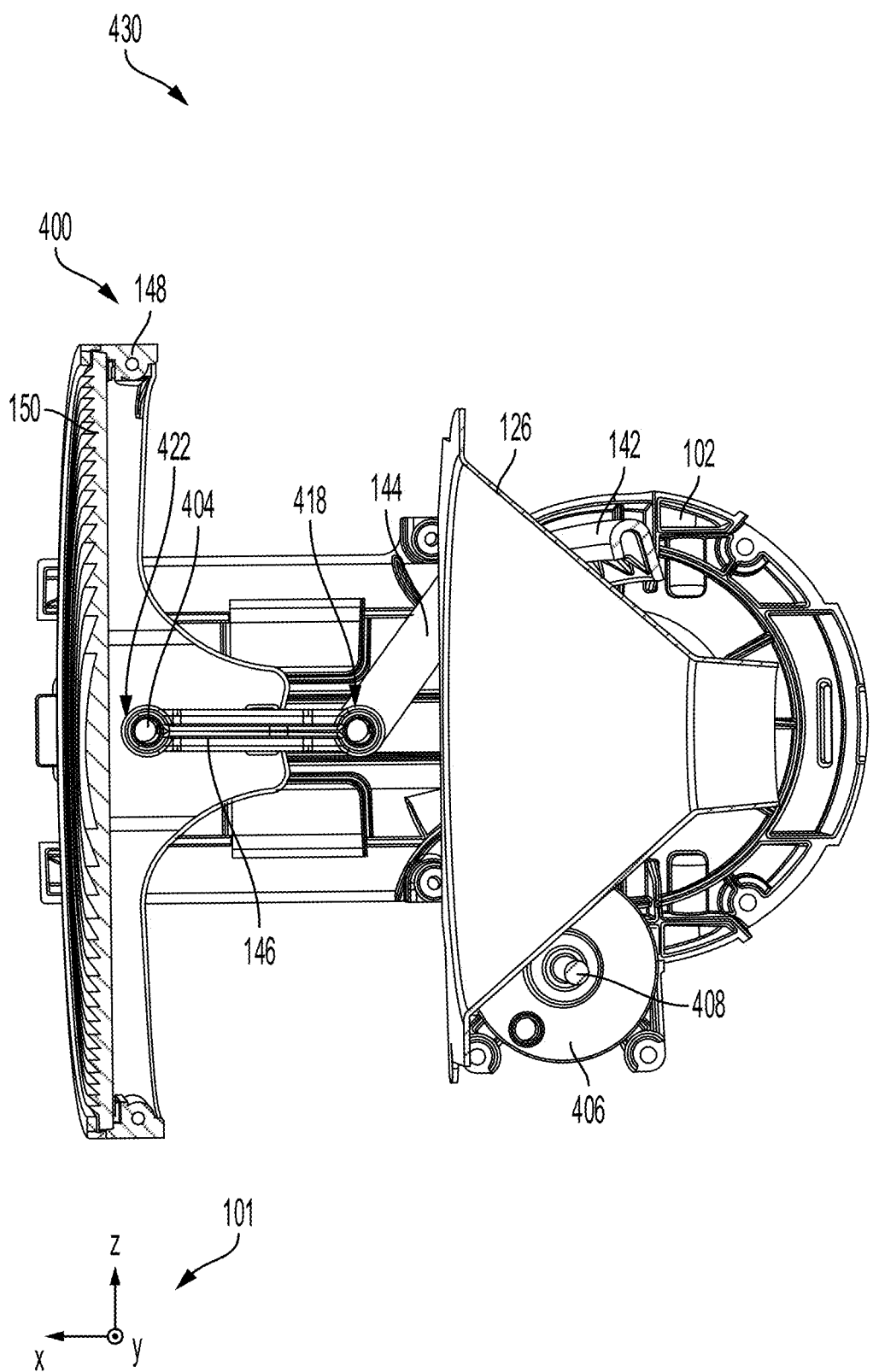
Figure 24:
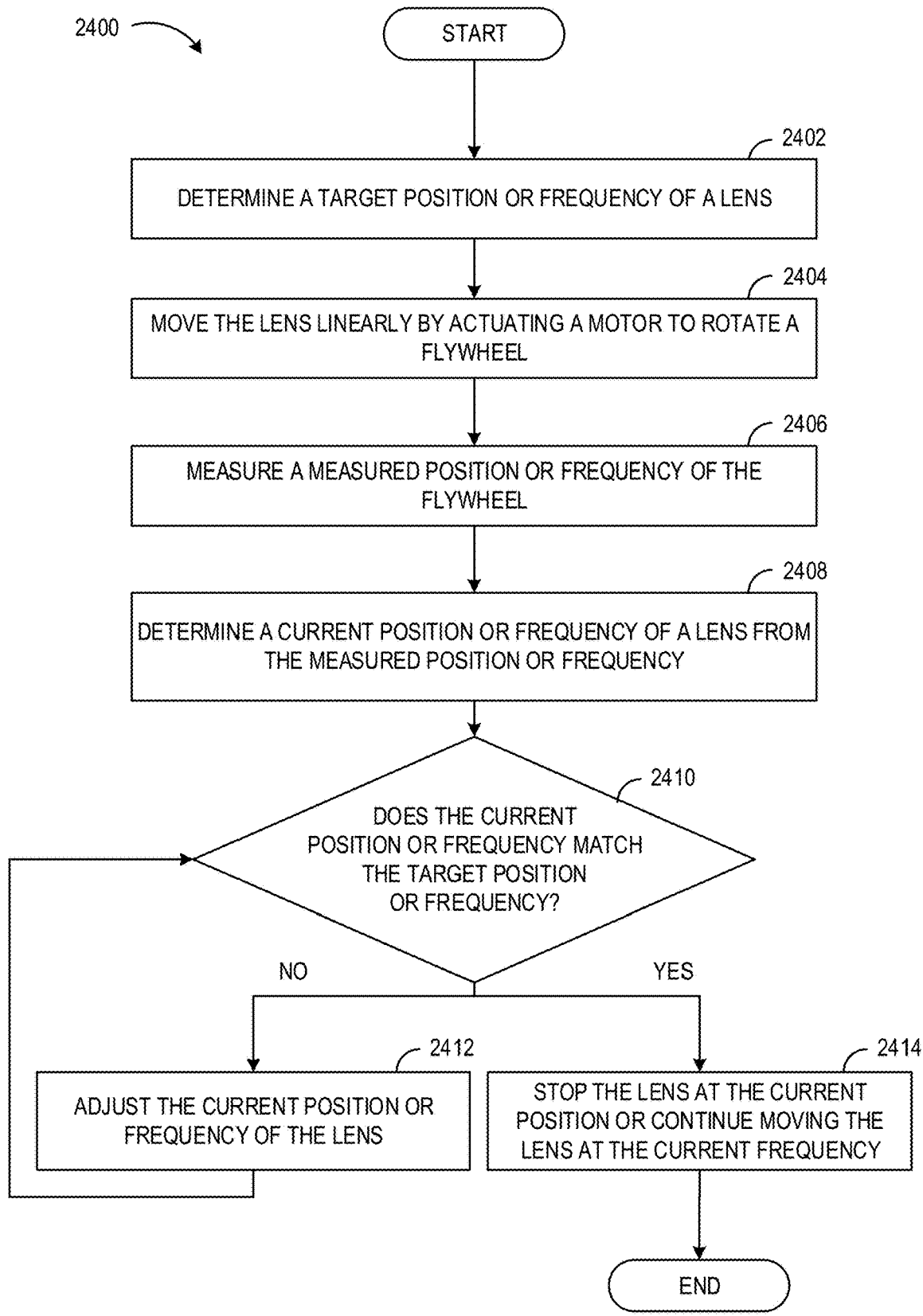
FIGS. 24 and 25 show a flowcharts of methods for operating the lens actuation system.
Figure 25:
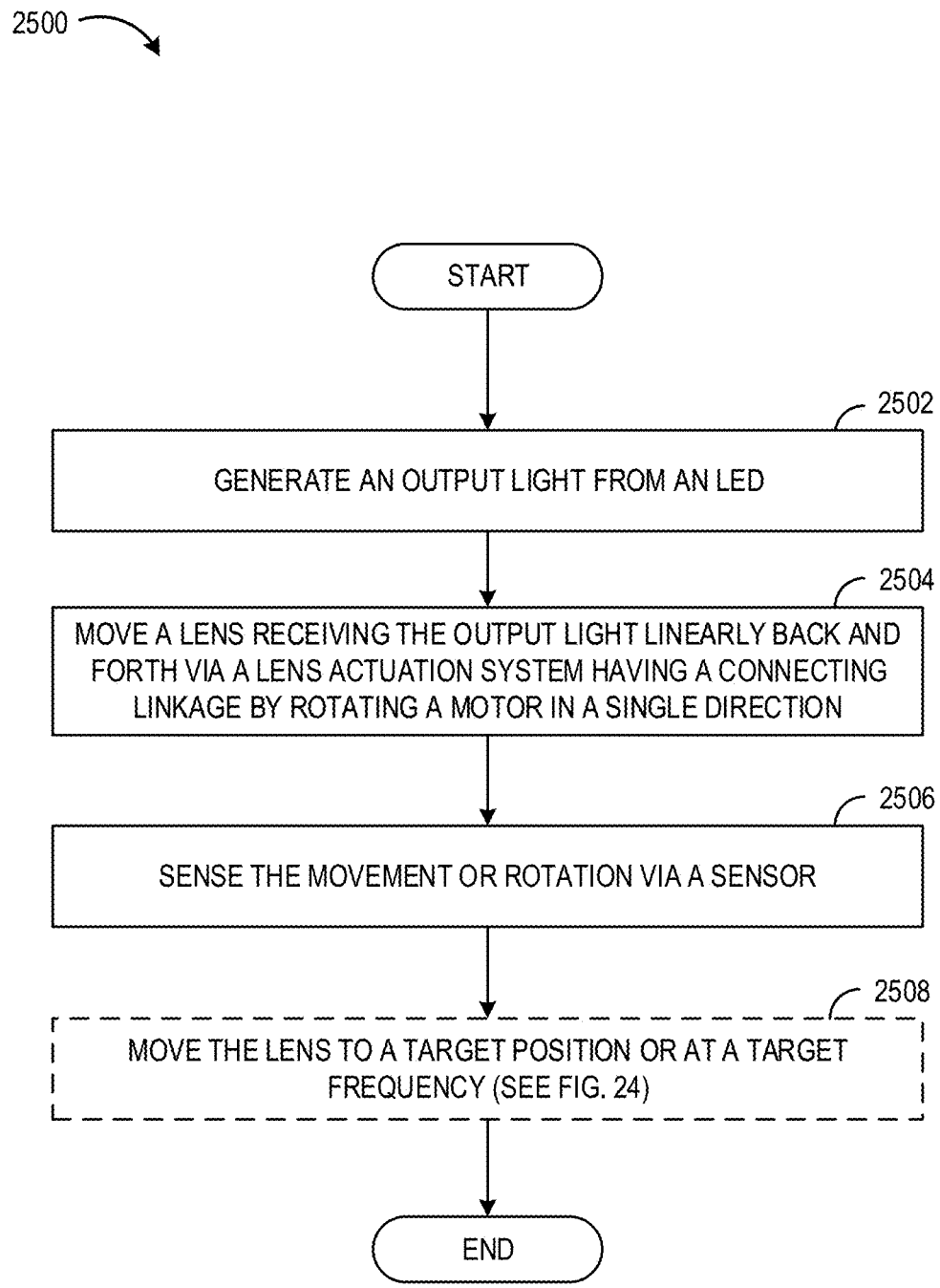

The present disclosure provides support for an optical device. In one example, the optical device is a lighting fixture. FIGS. 1 and 6 illustrate cross-sectional views of an optical device including a lens and a light engine partially enclosed in a housing, the light engine comprising a light emitting diode (LED), a light mixing rod, and a plurality of heat exchangers. In at least some examples, the LED is in face-sharing contact with the light mixing rod. FIGS. 2A and 2B illustrate examples of the LED, the light mixing rod, and the lens of the optical device. FIGS. 3A-3B illustrate views of the light engine. The optical device may include a lens actuation system adapted to move the lens in a linear path between an upstream position where the lens is closest to the LED and a downstream position where the lens is furthest from the LED. The lens actuation system and a portion of the housing where the lens actuation system may be coupled thereto is shown in various views in FIGS. 4A-5. The lens actuation system is further shown in a first position in FIG. 7 and a second position in FIGS. 8A and 8B, where the first position is more upstream than the second position. A flowchart of a method for operating the lens actuation system is shown in FIG. 25. A flowchart of a method for moving the lens to a target position or at a target frequency is shown in FIG. 24.

Figure 9:
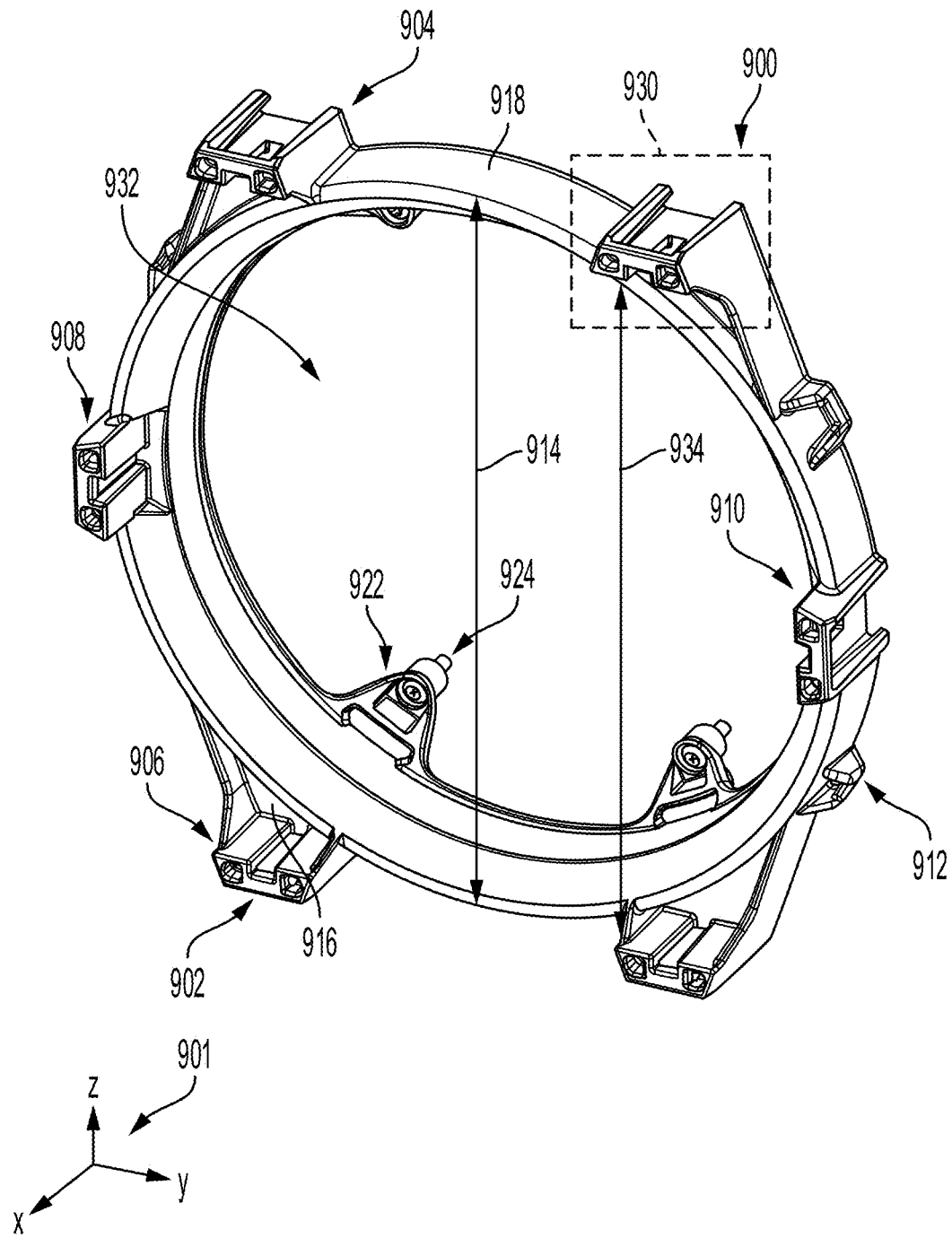
FIG. 9 illustrates a first view of a frame.
Figure 10:
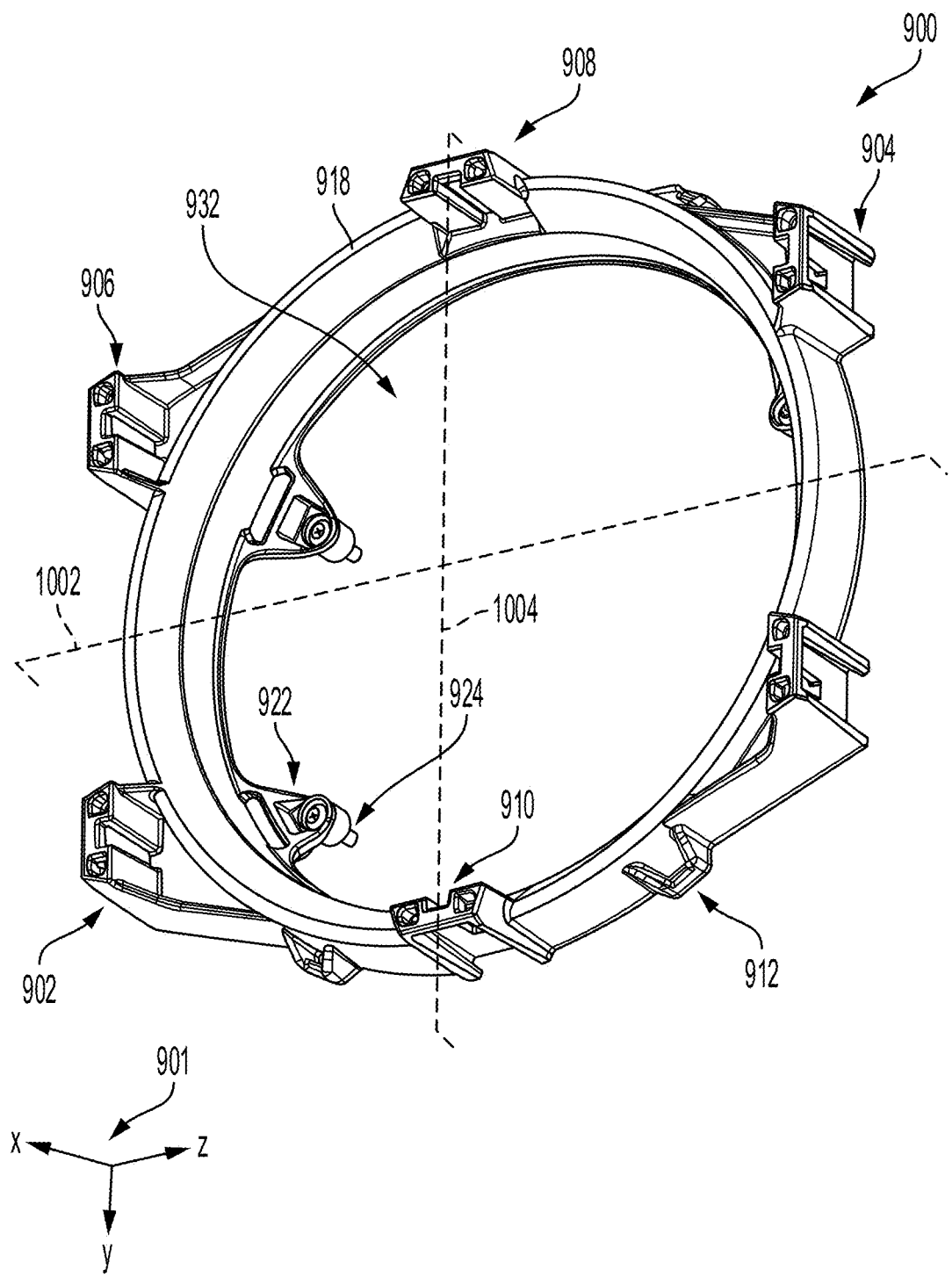
FIG. 10 illustrates a second view of the frame.
Figure 11:
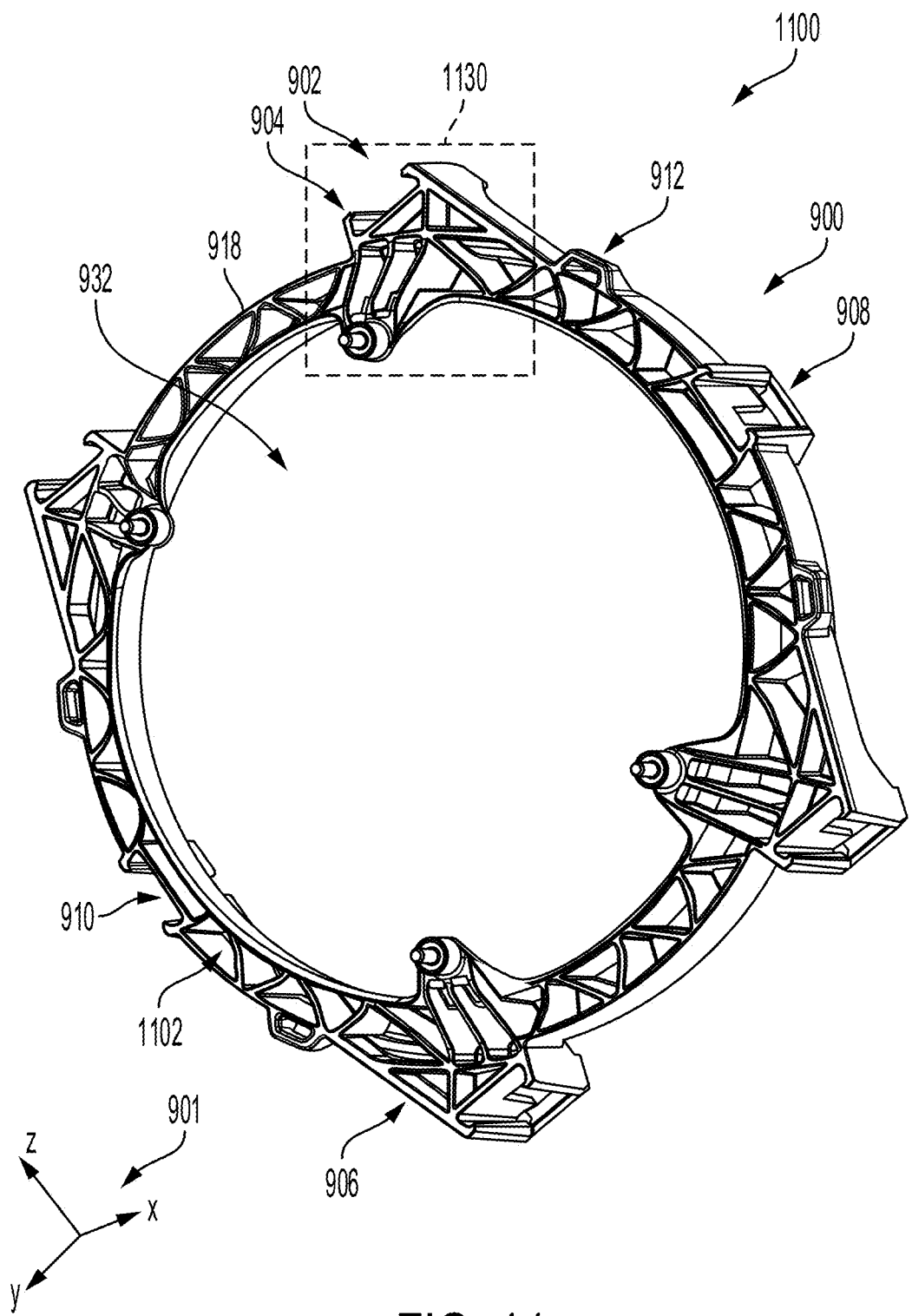
FIG. 11 illustrates a third view of the frame.
Figure 15:
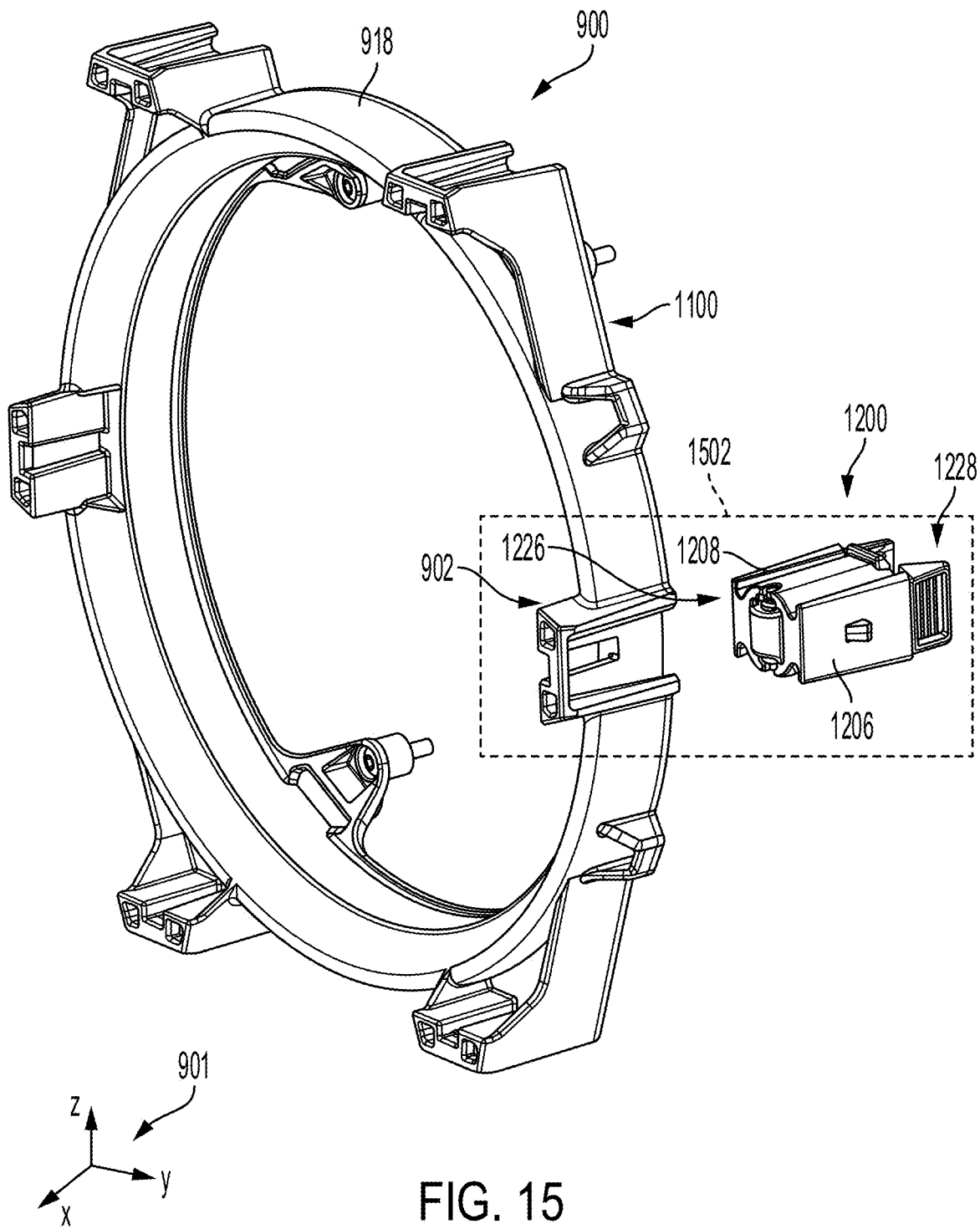
FIG. 15 illustrates the coupling device positioned to engage with a mount of the frame.
Figure 16:
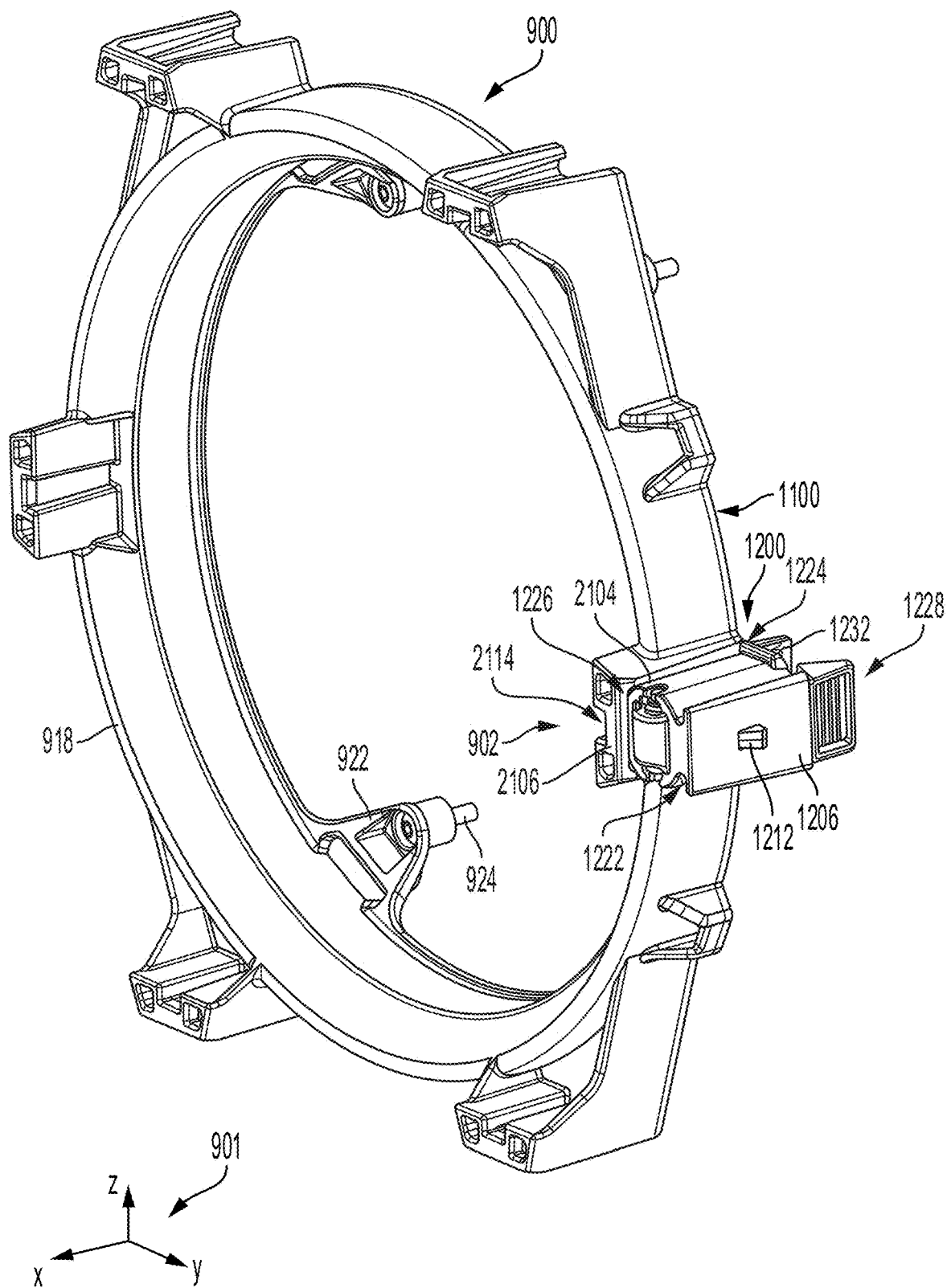
FIG. 16 illustrates the coupling device engaged with the mount of the frame.
Figure 17:
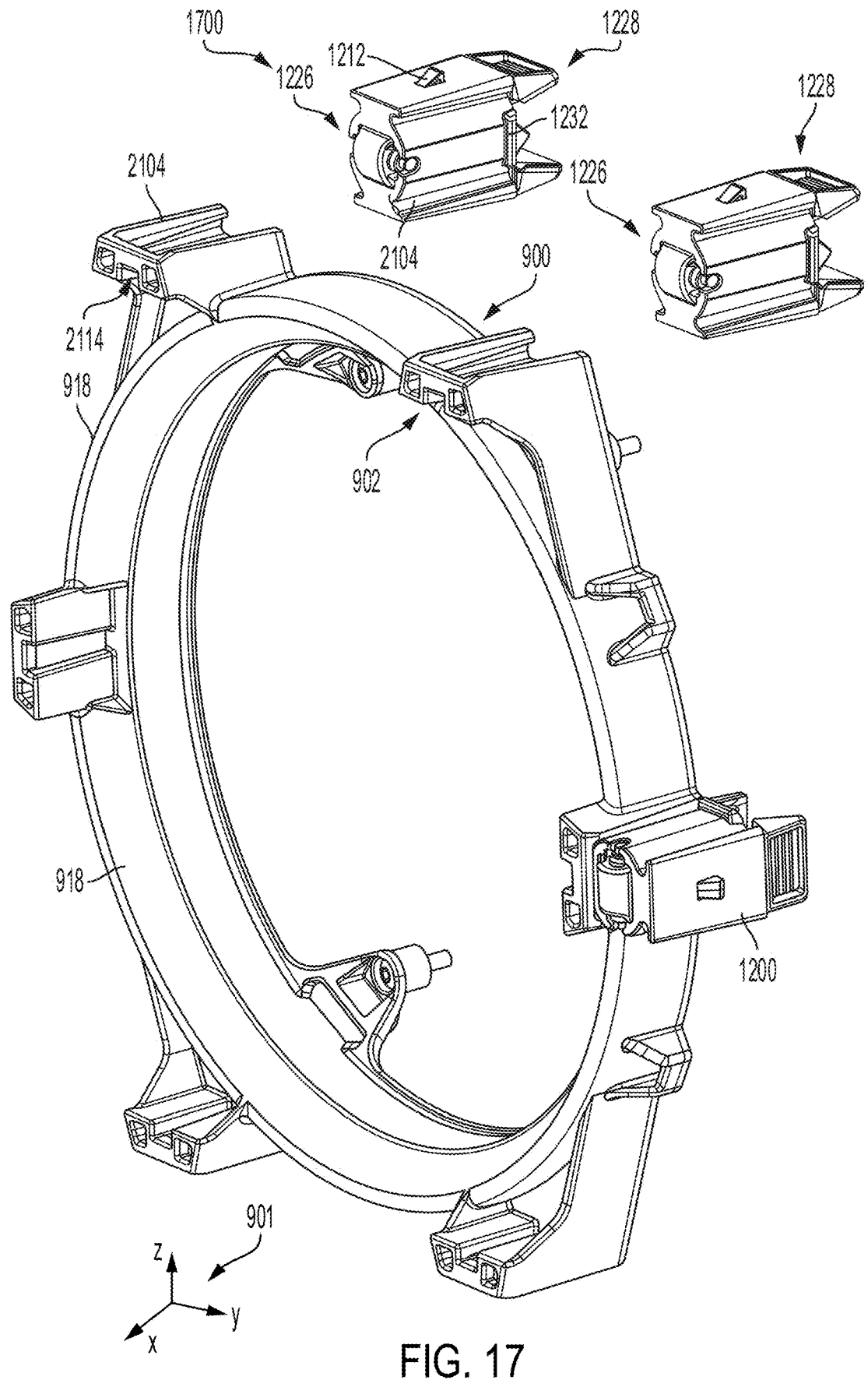
FIG. 17 illustrates further coupling devices positioned to engage with further mounts of the frame.
Figure 18:
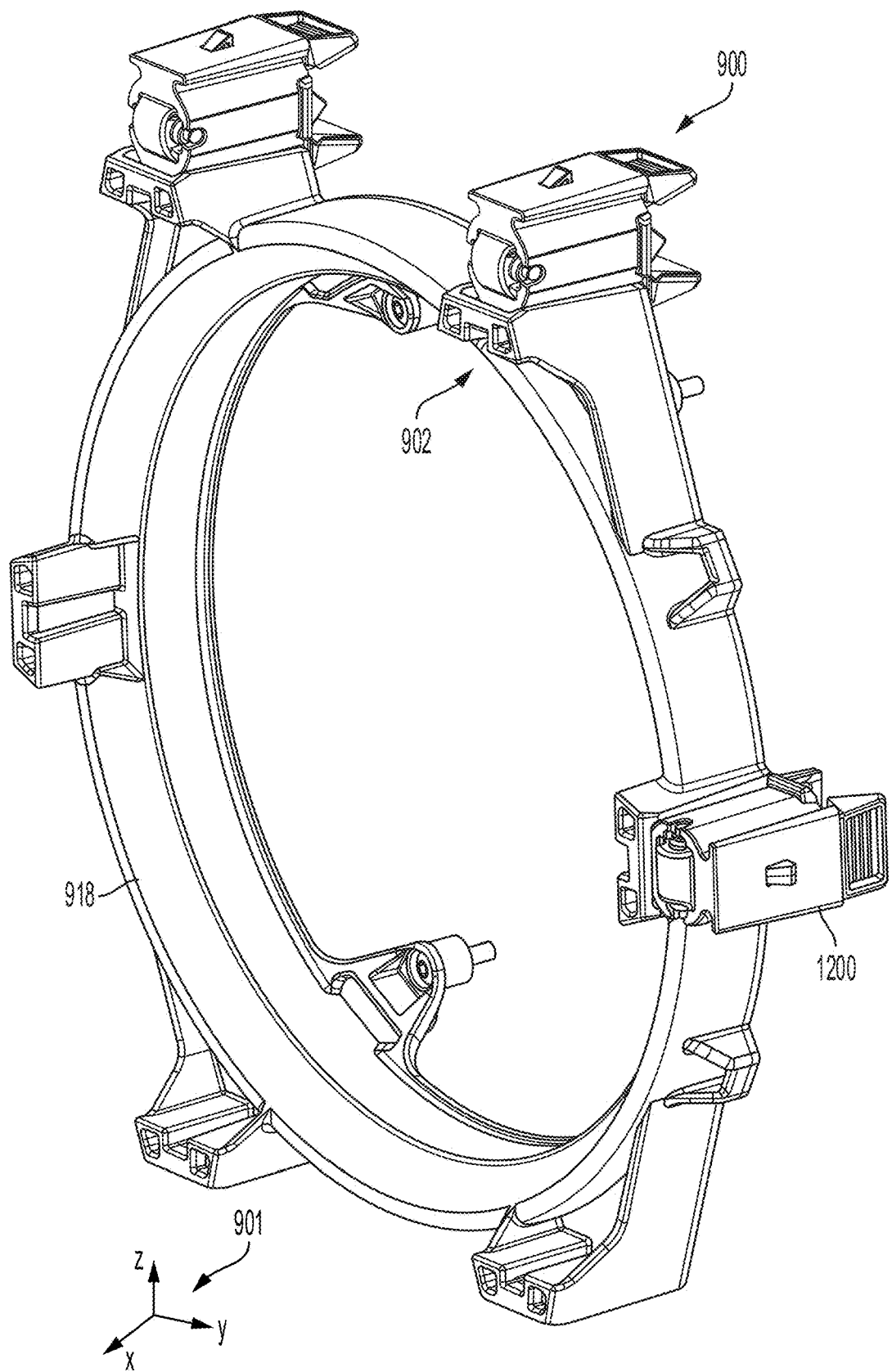
FIG. 18 illustrates a plurality of coupling devices engaged with a plurality of mounts of the frame.
Figure 19:
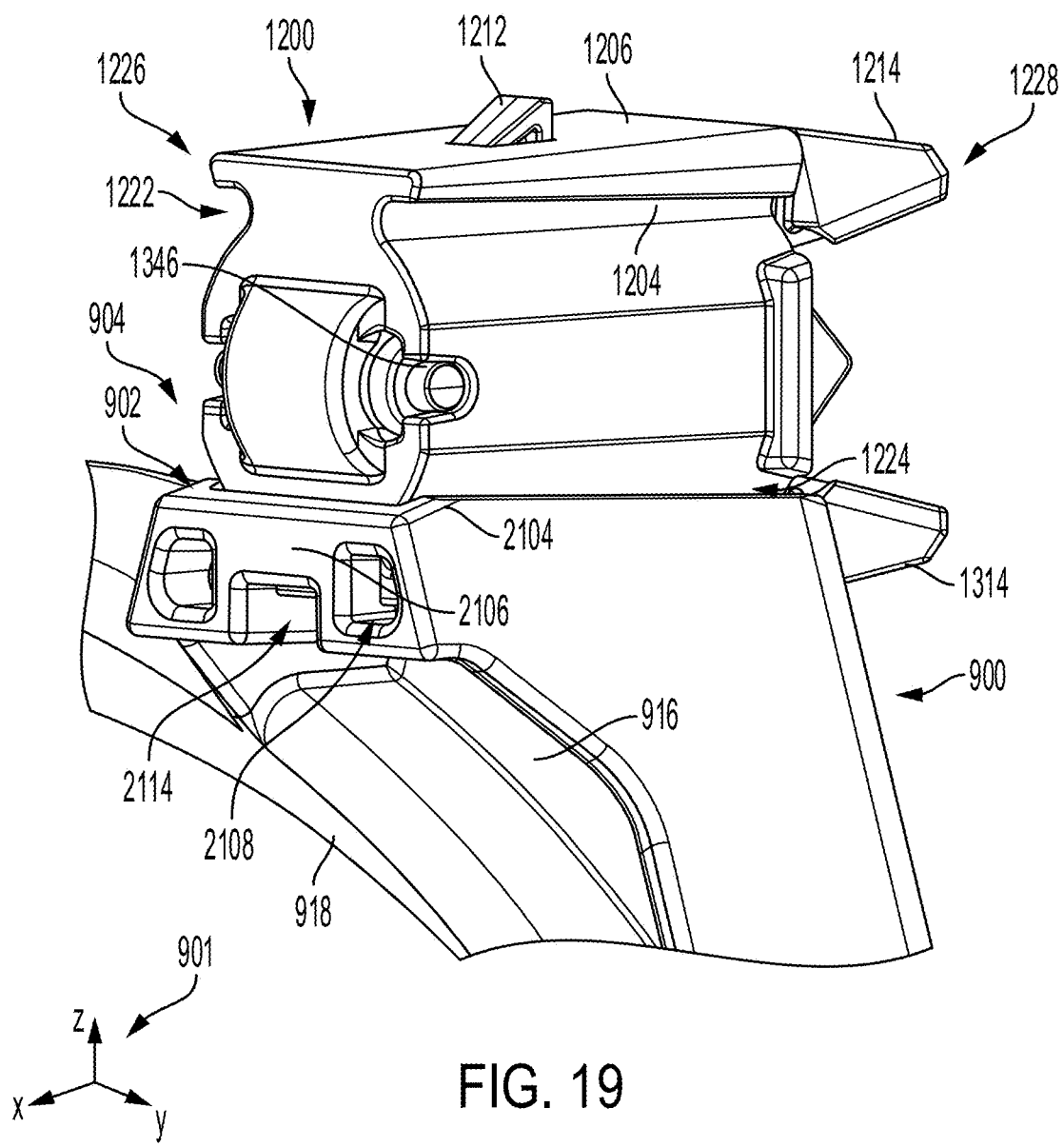
FIG. 19 illustrates a detailed view of the coupling device engaged with the mount of the frame.
Figure 20:
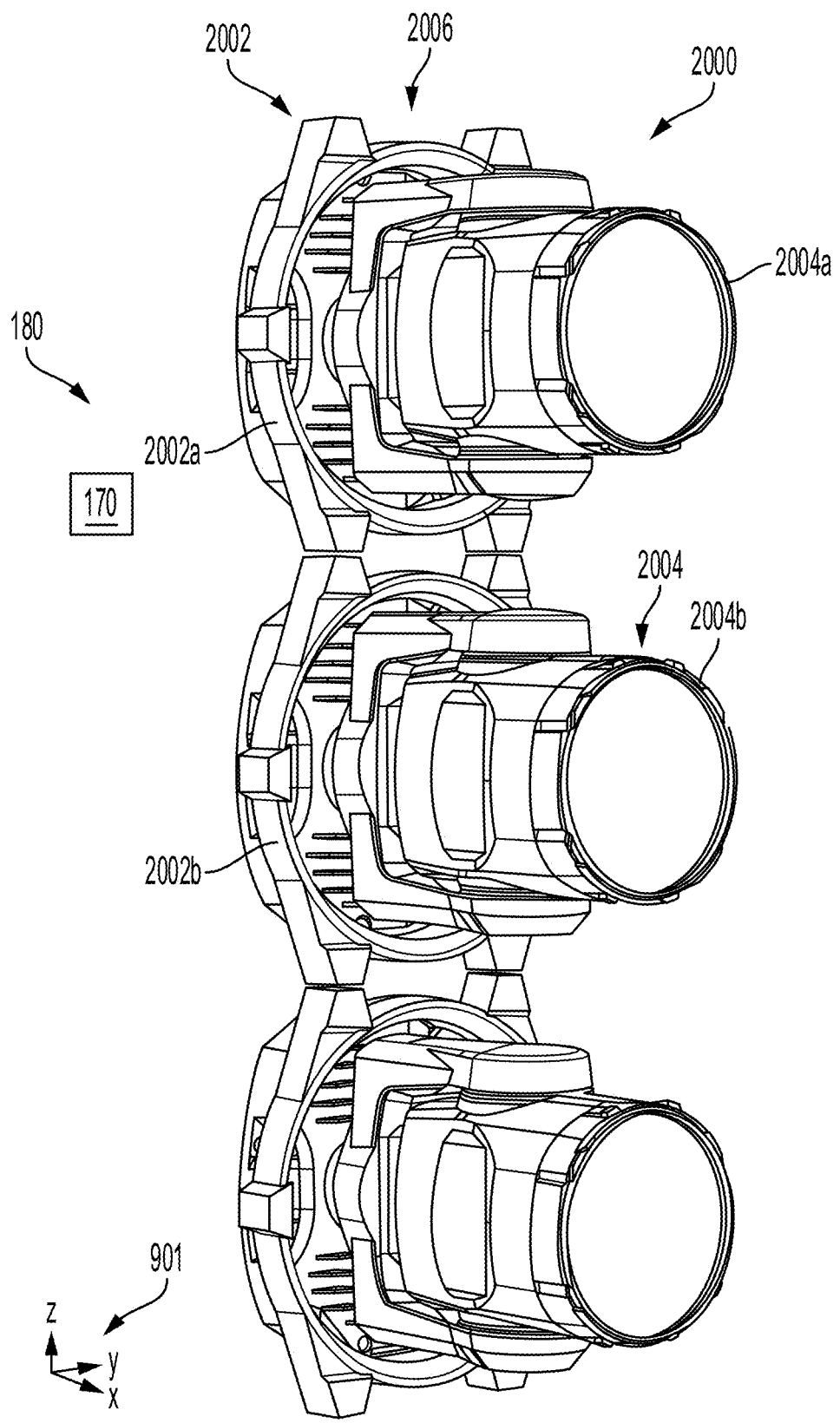
FIG. 20 illustrates a plurality of fixtures, such as the optical device, interconnected via a plurality of frames.
Figure 22:
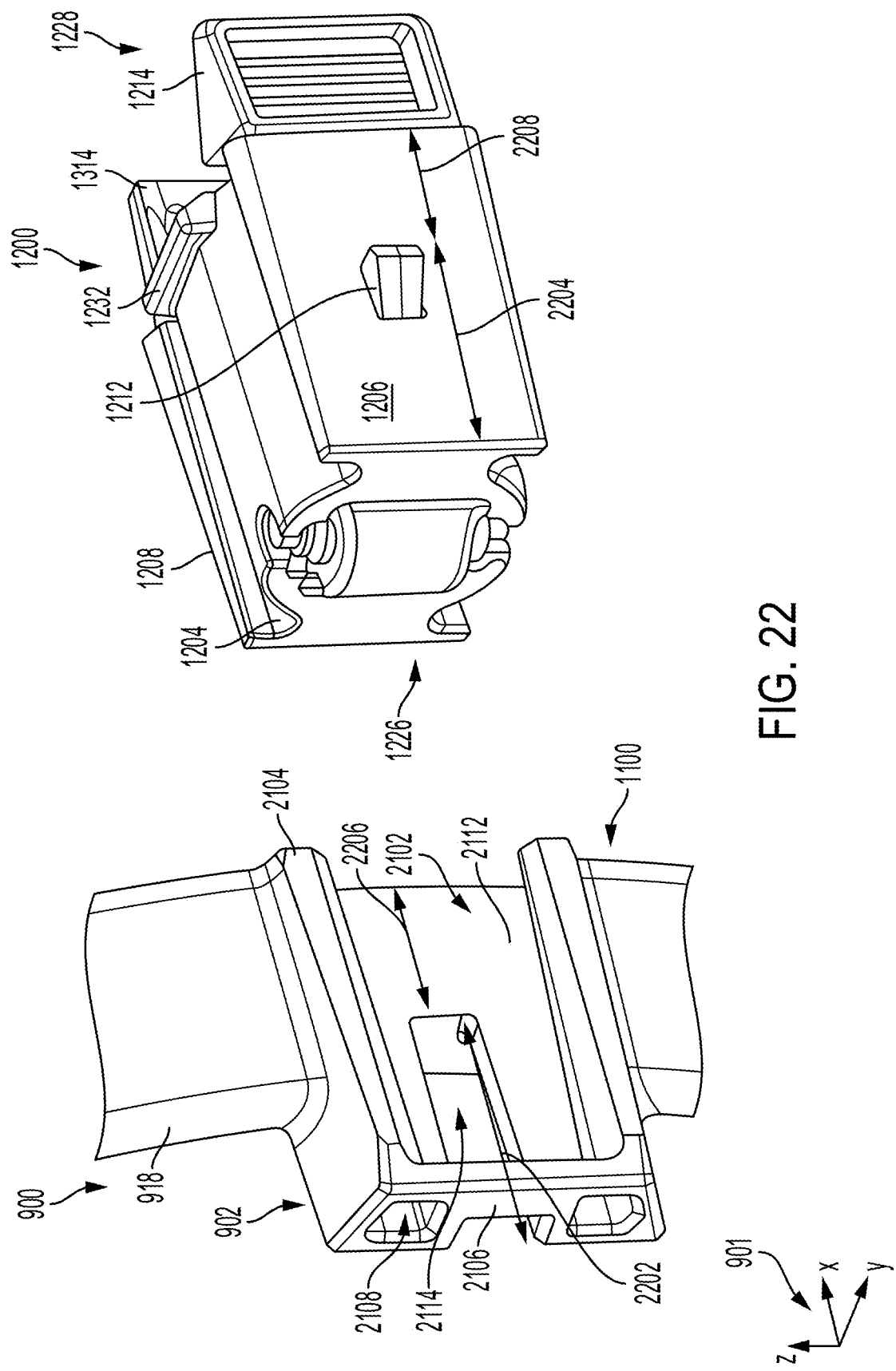
FIG. 22 illustrates a detailed view of the coupling device positioned to engage with the mount.
Figure 23:
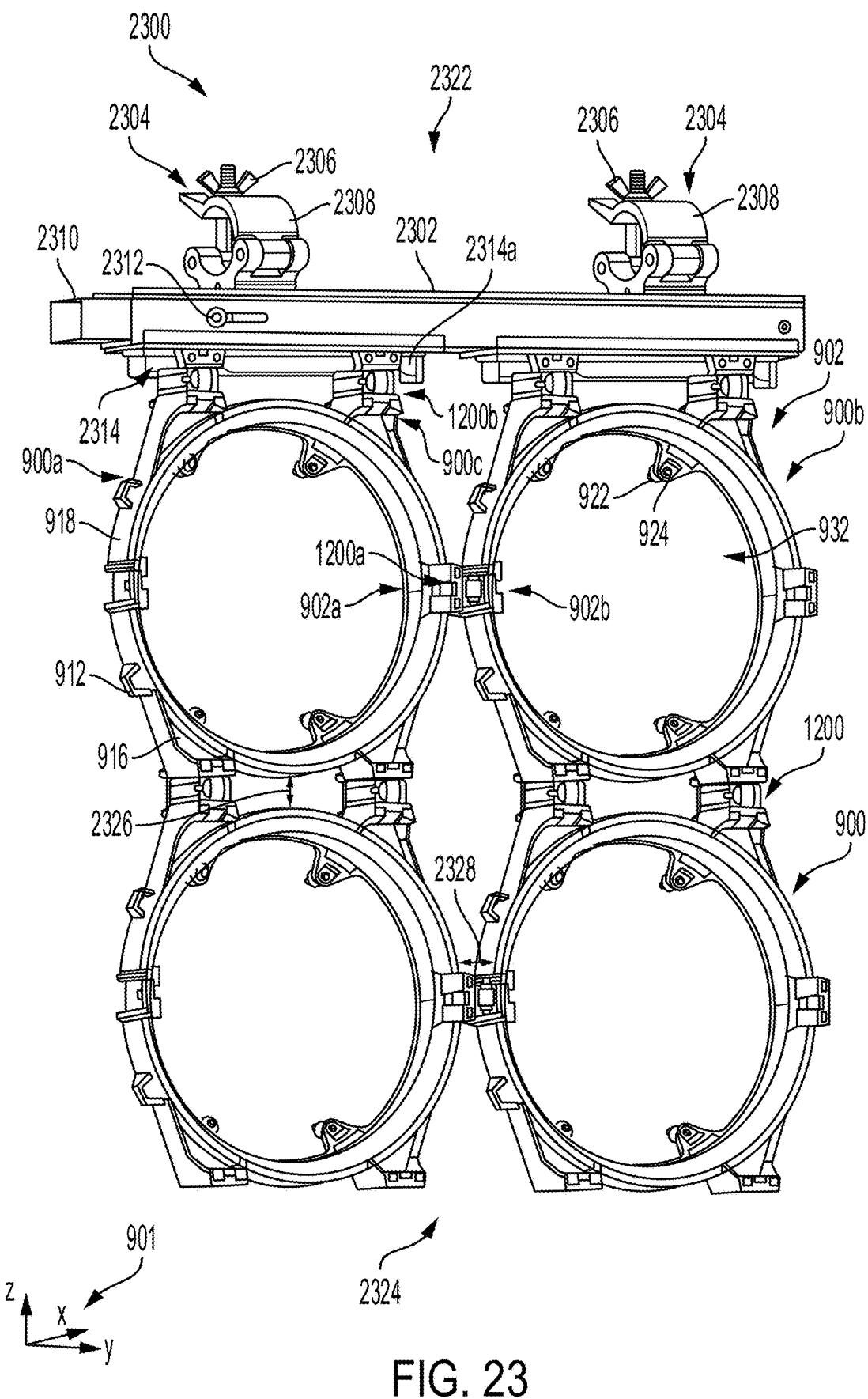
FIG. 23 illustrates a coupling system comprising a plurality of frames and a plurality of coupling devices.

A coupling system may be configured to interlock a plurality of fixtures (e.g., light fixtures such as the optical device of FIGS. 1-8B) with one another to generate a grid or lattice structure. The coupling system may be configured to provide load support and mitigate fixture sag. The coupling system may include at least one frame and at least one coupling device. There may be a frame surrounding each of the fixtures. The coupling devices may physically couple vertically and/or horizontally adjacent frames to interlock the fixtures. An exemplary frame is illustrated in FIGS. 9-11. An exemplary coupling device is illustrated in a perspective view and a cross-sectional view in FIGS. 12 and 13, respectively. The coupling device may be in a first position shown in FIG. 14A or a second position shown in FIG. 14B. The first position may be an unlocked (e.g., disengaged) position and the second position may be a locked (e.g., engaged) position, for example. Specifically, the coupling devices may engage with mounts of the frame, such as the mount shown in a detailed view in FIGS. 21A and 21B. FIGS. 15 and 22 illustrate the coupling device positioned to engage with a mount of the frame. FIG. 16 illustrates the coupling device engaged with the mount of the frame. There may be more than one coupling device engaged with each frame. As such, FIG. 17 illustrates further coupling devices positioned to engage with further mounts of the frame. FIG. 18 illustrates the coupling devices engaged with the mounts of the frame. FIG. 19 illustrates a detailed view of the coupling device engaged with the mount of the frame. FIG. 20 illustrates a first example of a coupling system comprising a plurality of fixtures, such as the optical device of FIGS. 1-8B, interconnected via a plurality of frames and a plurality of coupling devices. FIG. 23 illustrates a second example of a coupling system in accordance with the present disclosure hanging vertically from a support.

It is to be understood that the specific assemblies and systems illustrated in the attached drawings, and described in the following specification, are exemplary embodiments of the inventive concepts defined herein. For purposes of discussion, the drawings are described collectively. Thus, like elements may be commonly referred to herein with like reference numerals and may not be re-introduced.

Turning now to FIG. 1, it shows an optical device 100 comprising a housing 102. A set of reference axes 101, including an x-axis, a y-axis, and a z-axis, is shown in FIG. 1, as well as FIGS. 2-8B for comparison of orientations of the views illustrated therein. The x-axis may be parallel with a direction of movement of a lens 150 of the optical device 100. Additionally or alternatively, the z-axis and the y-axis may be parallel with a plane in which the lens 150 lies. Additionally or alternatively, the x-axis may be parallel with a general direction of light travel through the optical device 100. Additionally or alternatively, the z-axis may be parallel with a direction of gravity, in at least some positions of the optical device 100 during operation (e.g., movement, rotation, etc.) thereof.

As used herein, "upstream" may refer to a component or system, a position of a component or system, or a direction (e.g., of movement) oriented in a relatively negative x-direction. Additionally, as used herein, "downstream" may refer to a component or system, a position of a component or system, or a direction (e.g., of movement) oriented in a relatively positive x-direction. As an example, light may travel through the optical device 100 in a downstream direction. An upstream position of the optical device 100 may describe positions of all of the movable components of the optical device 100 where the lens 150 is furthest upstream. Likewise, a downstream position of the optical device 100 may describe positions of all of the movable components of the optical device 100 where the lens 150 is furthest downstream. The optical device 100 may transition between the upstream position and the downstream position via a lens actuation system. The lens actuation system may operate continuously during repetitive switching between the upstream position and the downstream position, rather than including discrete stops at each of the upstream and downstream positions, as described further below.

In one example, the optical device 100 is a light fixture. The housing 102 may include a front section 104 and a rear section 106. While described as separate sections, it will be appreciated that the housing 102 may be manufactured as a single integral piece or as multiple pieces without departing from the scope of the disclosure.

The rear section 106 may surround one or more of a light emitting diode (LED) 112, a light mixing rod 114, a light rod housing 116, a light rod cap 122, a resilient member 124, a fluid manifold 130, and a plurality of heat exchangers 132. The rear section 106 may include a plurality of louvers 134.

The LED element 112 may be in face-sharing contact with the light mixing rod 114. In one example, the optical device 100 may be configured to rotate in a plurality of directions. The light mixing rod 114 may remain in face-sharing contact with the LED element 112 through a range of motion of the optical device 100.

In previous examples, a gap is present between the LED and the light mixing rod. In the example of FIG. 1, a thickness of the LED element 112 (e.g., dimension parallel with the x-axis) is increased relative to previous examples of optical devices. Specifically, a glass thickness of a glass cover of the LED element 112 may be increased. With this increased thickness, the LED element 112, relative to previous examples, may be configured to withstand pressures applied by the light mixing rod 114 onto the LED element 112 during actuation of the optical device 100. In one example, the thickness of the surface of the LED is greater than 0.5 mm. Additionally or alternatively, the thickness of the surface of the LED is between 0.55 to 1.0 mm. As another example, the thickness of the surface of the LED is between 0.55 to 0.8 mm. In one example, the light mixing rod 114 and the LED element 112 are a single integral piece. As another example, the light mixing rod 114 and the LED element 112 may be separate pieces. The increased thickness of the glass cover of the LED element 112 may be resistant to degradation while being pressed against the light mixing rod 114 through the range of motion of the optical device 100.

In FIG. 2A, the LED element 112, the light mixing rod 114, and the lens 150 are shown. The lens 150 is a Fresnel lens in at least some examples. Additionally or alternatively, the lens may be constructed of a lightweight material, such as plastic. Additionally or alternatively, the lens 150 may be a front lens. Additionally or alternatively, the lens 150 may be the only lens 150 included in the optical device 100.

The LED element 112 is shown in FIG. 2A in face-sharing contact with the light mixing rod 114, with the light mixing rod 114 spaced away from the lens 150. The LED element 112 is additionally shown in FIG. 2B enlarged for greater detail. The LED element 112 may include LED(s) 208 which may be a single LED or a group of LEDs. In examples where the LED(s) 208 include a group of LEDs, the LEDs may be arranged in a cluster, for example as shown in FIG. 2B. The LED element 112 may emit red, green, white, and blue light, in one example. The LED element 112 may emit additional or alternative colors in other examples. For example, the LED element 112 may be square with a side length 202 of approximately 10-20 mm. However, other dimensions and shapes are possible without departing from the scope of the present disclosure. As described above, a transparent cover 204 of the LED element 112 may have an increased thickness (e.g., dimension parallel with the x-axis) compared to conventional LEDs. The transparent cover 204 may be constructed of glass or another transparent material. For example, the thickness of the transparent cover 204 may be greater than 0.6 mm. Additionally or alternatively, the transparent cover 204 may be between 0.7 and 0.9 mm in thickness. Additionally or alternatively, the thickness of the transparent cover 204 may be one tenth or less of the side length 202. The transparent cover 204 may be adapted to protect the LED(s) 208 of the LED element 112.

Further, an air gap present between the LED and the light mixing rod in at least some previous examples of optical devices may be eliminated by positioning the transparent cover 204 and the light mixing rod 114 in face-sharing contact in the optical device 100 of the present disclosure. In this way, a distance light travels from the LED(s) before reaching the light mixing rod 114 (e.g., through the transparent cover 204) may be reduced, compared to examples where the light travels through both glass (or other transparent material) and air before reaching the light mixing rod. Further, due to differences in light refraction in air and the transparent material such as glass, removing the air gap may allow for more focused light beams, and therefore a greater amount of light being transmitted through the light mixing rod. Further still, fewer tolerances may contribute to variations between optical devices in the distance between the LED element 112 and the light mixing rod 114. For example, rather than a tolerance in thickness of both the LED and the air gap, only a thickness of the LED may be considered. In this way, manufacturing variations between optical devices may be reduced, allowing for more similar optical effects produced by different optical devices and thus a higher quality of performance.

Returning to FIG. 1, the light rod housing 116 may house the light mixing rod 114. The light mixing rod 114 may be a rod-shaped and configured to homogenize light emitted by the LED element 112. The light mixing rod 114 may include an integral diffuser at the end adjacent to the light rod cap 122. The light rod housing 116 may include one or more guiding features configured to center the light mixing rod 114 relative to the LED element 112, such as the guiding features 316 of FIG. 3C described below.

Additionally, a fixation system may be implemented to ensure contact between the light mixing rod 114 and the LED element 112 is maintained throughout actuation of the optical device 100. For example, the light mixing rod 114 may be retained against the LED element 112 via the resilient member 124. In one example, the resilient member 124 includes one or more springs. The resilient member 124 may be physically coupled to a light rod cap 122 and a surface whereon the LED element 112 is mounted. Thus, the light rod cap 122 may be pulled against the light rod housing 116, and the light rod housing 116 may be pulled against the LED element 112. That is, the light rod housing 116 may be compressed between the LED element 112 and the light rod cap 122. The increased thickness of the transparent cover of the LED element 112 (e.g., transparent cover 204 of FIG. 2B) may strengthen the transparent cover so as to reduce a likelihood of (e.g., prevent) degradation thereof under compressive forces applied by the resilient member 124. Thus, additionally or alternatively to other examples of transparent cover thickness provided herein, the thickness may be selected according to the strength of the resilient member 124. The resilient member 124 is described further below with regard to FIGS. 3A-3C.

The fluid manifold 130 may be arranged between the LED element 112 and a surface of the housing 102. For example, the fluid manifold 130 may be in face-sharing contact with the surface of the housing 102. The fluid manifold 130 may be included in a thermal management system further including a plurality of heat exchangers 132 fluidly coupled to the fluid manifold, the plurality of louvers 134, and a fan 136, where the thermal management system is configured to cool one or more components in the rear section 106. The plurality of heat exchangers 132 may be configured to radially surround the light rod housing 116, making the optical device 100 more compact than other examples wherein heat exchangers are positioned elsewhere (e.g., between the LED and the surface of the housing 102 where the fluid manifold 130 is positioned) and do not surround any components on more than one side. The thermal management system is further described with regard to FIGS. 3A-3C.

The optical device 100 may include a control system 180 comprising a controller 170, one or more actuators including the motor 140, and one or more sensors, such as a magnetic sensor positioned on the PCB 152. The controller 170 may be communicatively coupled to the actuators and the sensors, such as via wires or wireless connection. The controller 170 may include non-volatile memory with instructions stored therein executable to perform methods of the present disclosure, such as the method 2500 of FIG. 25 for moving the lens 150 to a target position or at a target frequency. The control system 180 may include devices for entering user input, including buttons, for example to input the target position or the target frequency. In examples where multiple optical devices 100 are used in conjunction, the control system 180 may concurrently control the optical devices 100. Thus, the one or more actuators and the one or more sensors may belong to separate optical devices 100 and the controller 170 may be communicatively coupled to more than one optical device 100.

Figure 3C:
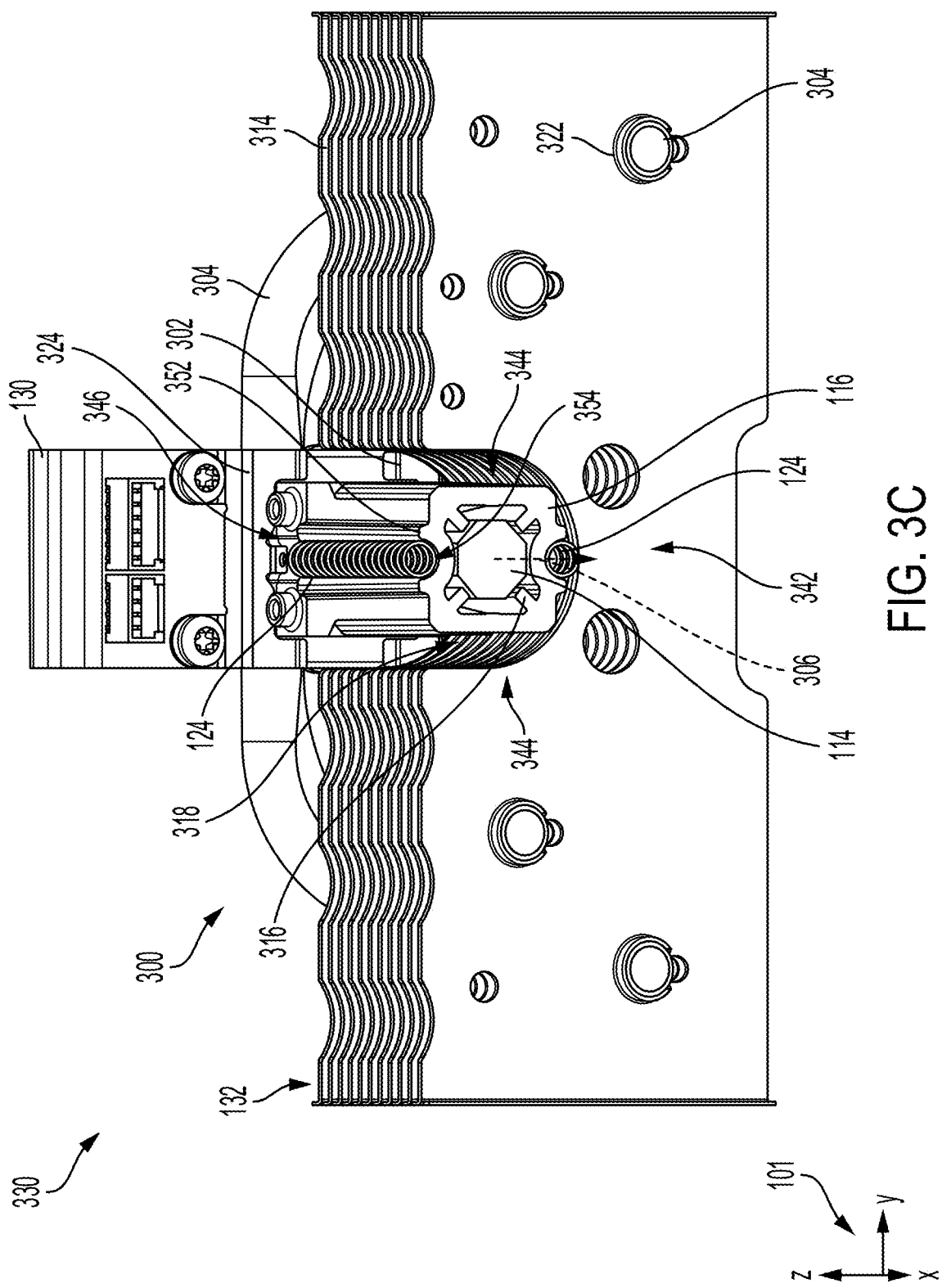

A light engine 300 including the LED element 112, the light mixing rod 114, and the plurality of heat exchangers 132 are illustrated in greater detail in a first view 310, a second view 320, and a third view 330 in FIGS. 3A, 3B, and 3C, respectively. The second view 320 is a cross section taken along cutting plane A-A' of FIG. 3A. The third view 330 is a cross section of the first view 310 taken along cutting plane B-B'.

The plurality of heat exchangers 132 may surround the light mixing rod 114, as noted above. For example, the plurality of heat exchangers 132 may radially surround the light rod housing 116, around at least a portion, such as half or more, of the perimeter thereof. The plurality of heat exchangers 132 may include a substantially planar shape normal to a central axis 306 of the light mixing rod 114. The light rod housing 116 may be spaced away from the plurality of heat exchangers 132. For example, the plurality of heat exchangers 132 may include cut outs that form a U-shaped opening 318 where the light rod housing 116 containing the light mixing rod 114 is positioned without physical contact therebetween. In this way, the plurality of heat exchangers 132 may surround a bottom 342 (e.g., area facing the negative z-direction) and both sides 344 (e.g., areas facing y-directions) of the light rod housing 116, increasing heat removal compared to placing the plurality of heat exchangers 132 adjacent to the light rod housing 116 without wrapping therearound (e.g., without the U-shaped opening 318 configured to receive the light rod housing 116).

In alternate examples, the plurality of heat exchangers 132 may surround the sides 344 and a top 346 (e.g., area facing the positive z-direction) of the light rod housing 116. In yet other examples, the plurality of heat exchangers 132 may surround the top 346, bottom 342, and one or both sides 344 of the light rod housing 116. For example, the plurality of heat exchangers 132 may comprise through-holes aligned such that the light rod housing extends therethrough and is circumferentially surrounded by the plurality of heat exchangers 132. In any of the examples of arrangements of the plurality of heat exchangers 132, two or more of the top 346, the bottom 342, and the two sides 344 of the light rod housing 116 may be surrounded by the plurality of heat exchangers 132. For example, three or more of the top 346, the bottom 342, and the two sides 344 may be positioned adjacent to (and spaced away from) portions of the plurality of heat exchangers 132. In this way, thermal management capability may be enhanced and packing volume may be decreased, compared to systems where the thermal management system does not radially surround the light engine 300.

The plurality of heat exchangers 132 may include one or more light leak features 302 configured to block light emission from certain areas, such as areas adjacent to an upstream heat exchanger 314 and a downstream heat exchanger 312. The light leak features 302 may protrude laterally from the upstream heat exchanger 314 and the downstream heat exchanger 312 and angle towards the central axis 306.

The plurality of heat exchangers 132 may be mounted to the housing 102 of FIG. 1 via one or more of fasteners, welds, fusions, adhesives or a combination thereof. Additionally or alternatively, the plurality of heat exchangers 132 may be held via one or more tubes 304. The tubes 304 may be configured to conduct fluid from the fluid manifold 130 to each of the plurality of heat exchangers 132. The fluid manifold 130 and the plurality of heat exchangers 132 may be fluidly coupled via the tubes 304. The tubes 304 may extend through the plurality of heat exchangers 132 parallel with the light mixing rod 114 (e.g., parallel to the central axis 306) and normal to the plurality of heat exchangers 132. The plurality of heat exchangers 132 may include protrusions 322 extending from the downstream heat exchanger 312 that at least partially circumferentially surround the tubes 304 for stabilization thereof. The tubes 304 may end in caps 308 adjacent to the downstream heat exchanger 312. The tubes 304 may be symmetrically arranged with respect to the light rod housing 116. Although there are four tubes 304 shown in FIGS. 3A-3C, there may be more or fewer tubes 304 for conducting fluid through the heat exchangers 132 in other examples. Accordingly, there may be more or fewer protrusions 322 in other examples.

The light rod housing 116 comprises guiding features 316 configured to center the light mixing rod 114 relative to the light rod housing 116, and consequently relative to the LED element 112. For example, the guiding features 316 may protrude from inner walls of the light rod housing 116 inwards towards the light mixing rod 114. The guiding features 316 may be symmetrically (e.g., circumferentially equidistantly) arranged. There may be three or more guiding features 316. For example, there may be four guiding features 316, as shown in FIG. 3C. By centering the light mixing rod 114 with the LED element 112 using the guiding features 316, quality of optical effects produced by the light traveling from the LED element 112 through the light mixing rod 114 may be increased.

The LED element 112 may be mounted on a surface 326, for example via thermally conductive adhesive. The surface 326 may be of a heatsink. In this way, the LED element 112 may be cooled via heat transfer through the thermally conductive adhesive to the surface 326 of the heatsink. The LED element 112 may be fixed relative to the tubes 304 and the fluid manifold 130, which may be fixed relative to the housing 102 of the optical device 100 shown in FIGS. 1 and 6.

Additionally, the LED element 112 may be in face-sharing contact with the light mixing rod 114, as described above. Specifically, the transparent cover of the LED element 112 (e.g., transparent cover 204 of FIG. 2B) may be in face-sharing contact with the light mixing rod 114. The resilient member 124 may ensure contact is maintained between the LED element 112 and the light mixing rod 114 throughout actuation of the optical device 100. For example, actuation of the optical device 100 may include rotation, which may impose separating centrifugal forces upon components of the optical device 100 such as the LED element 112 and the light mixing rod 114.

As noted above, the light mixing rod 114 may be retained (e.g., spring-loaded) against the LED element 112 throughout such actuation of the optical device 100 via the resilient member 124. The resilient member 124 may comprise one or more springs (e.g., one or more compression springs). For example, the resilient member 124 may include two springs (e.g., two compression springs) arranged parallel with the central axis 306. The two springs may be positioned with one at each of the top 346 and the bottom 342 of the light rod housing 116. Alternatively, the resilient member 124 may include two springs arranged parallel with the central axis 306, one on each of the two sides 344 of the light rod housing 116. The resilient member 124 may include two or more springs arranged symmetrically about the light rod housing 116. As an example, the resilient member 124 may include four compression springs arranged with one on each of the top 346, bottom 342, and sides 344. Additionally or alternatively, the resilient member 124 may include one or more elastic bands (e.g., rubber band) with sufficient resistance to stretching. Additionally or alternatively, the resilient member 124 may include any other resilient (e.g., elastic) component capable of providing tension greater than separating forces imposed on the LED element 112 and the light mixing rod 114, for example due to rotation thereof according to rotation of the housing 102.

The resilient member 124 (e.g., one or more springs, elastic bands, a combination thereof, etc.) may physically and elastically couple the light rod cap 122 at a first end of the light mixing rod 114 with securing members 324 at a second end of the light mixing rod 114, where the second end is opposite of the first end. The securing members 324 may be secured (e.g., via fasteners 328, welding, soldering, adhesive, and/or the like) to the surface 326 on which the LED element 112 is positioned. In this way, the resilient member 124 may be physically coupled to the light rod cap 122 and securing members 324 which are fixed to the surface 326. The securing members 324 may be integral with the surface 326 such that the resilient member 124 is directly physically coupled to the surface 326, rather than indirectly such as via the securing member 324.

The resilient member 124 may extend between the surface 326 and the light rod cap 122 parallel with the light rod housing 116. For example, the resilient member 124 may extend parallel with the central axis 306 whereon the light mixing rod 114 and the light rod housing 116 are centered. Additionally, the resilient member 124 may be in contact with the light rod housing 116. For example, the light rod housing 116 may include centering protrusions 352 which flank springs of the resilient member 124. Additionally or alternatively, the light rod housing 116 may include recesses 354 adapted to center the resilient member 124 relative thereto. For example, the recesses 354 may be contoured according to the shape of the resilient member 124. In one example, the recesses 354 may be semicircular to partially circumferentially surround compression springs. The recesses 354 and/or the centering protrusions 352 may extend axially along the length of the light rod housing 116 on the top 346, bottom 342, and/or sides 344 according to configuration of the resilient member 124. The recesses 354 and/or the centering protrusions 352 may be in contact with and support the resilient member 124.

The light rod housing 116 may include tabs 332 which bend radially outwards towards the securing members 324. In this way, the light rod housing 116 may remain spaced away from the LED element 112 to protect the translucent cover of the LED element 112 from mechanical degradation. Additionally, if the light rod housing 116 shifts towards the light rod cap 122, the light rod housing 116 may be stopped before contacting the LED element 112 by the tabs 332 pressing against the securing members 324, in addition to the light rod housing 116 hitting the light rod cap 122. Alternatively, the light rod housing 116 may be integral with the securing members 324. In this way, the light rod housing 116 may be directly fixed to the surface 326 (e.g., via the fasteners 328, welding, soldering, adhesive, and/or the like) such that the light rod housing 116 is spaced away from and centered around the LED element 112. Thus, the resilient member 124 may be physically coupled at a first end to the light rod cap 122 and at a second end to the surface 326 whereon the LED element 112 is mounted, either directly or indirectly (e.g., via the securing members 324).

The light rod cap 122 may be in face-sharing contact with the light mixing rod 114. The light mixing rod 114 may include a widening 334 with greater diameter than the rest of the light mixing rod 114 at the end adjacent to the light rod cap 122. The widening 334 may be interposed between the light rod cap 122 and the light rod housing 116. The light rod housing 116 may include a circumferential notch to accommodate the widening 334. Thus, the light mixing rod 114 may be interposed and compressed between the light rod cap 122 and the LED element 112 via the resilient member 124. By elastically coupling the light rod cap 122 with the surface 326 (e.g., via the resilient member 124 and the securing members 324), the light rod cap 122 may be pulled towards the LED element 112, pressing against the light mixing rod 114 and/or the light rod housing 116 such that the light mixing rod 114 is spring-loaded and able to withstand forces experienced during movement (e.g., rotation) of the light engine 300 without separating the LED element 112 and the light mixing rod 114.

For example, returning to FIG. 1, the resilient member 124 may provide a force that maintains contact between the LED element 112 and the light mixing rod 114 throughout movement of the optical device 100. For example, the optical device 100 may rotate, swivel, pivot, or execute another movement, wherein the resilient member 124 is configured to maintain the face-sharing contact between the LED element 112 and the light mixing rod 114 through these movements. Thus, a resistance of the resilient member 124 to stretching (e.g., spring constant in examples where the resilient member 124 includes a spring) may be selected according to a maximum force experienced during movement of the optical device 100. For example, the resistance to stretching of the resilient member may be greater than maximum separating forces experienced during movement (e.g., rotation, swiveling, pivoting, etc.) of the optical device 100.

In this way, omitting an air gap between the LED element 112 and the light mixing rod 114 may reduce tolerance considerations (e.g., tolerances of fasteners and components to ensure adequate air gap thickness), and therefore diminish variation in a distance between the LED element 112 and the light mixing rod 114. For example, the only variation between optical devices 100 in the distance between the LED element 112 and the light mixing rod 114 may be attributed to variation in transparent cover thickness of the LED element 112 (e.g., within manufacturing tolerance of the LED thickness). Due to the resilient member 124, small variations (e.g., within manufacturing tolerance) in thickness of the LED element 112 may not affect the security of the coupling between the LED element 112 and the light mixing rod 114. Further, by providing tension exceeding forces imposed on the light engine 300 during actuation of the optical device 100 in the coupling between the LED element 112 and the light mixing rod 114, contact between the LED element 112 and the light mixing rod 114 may be maintained more securely compared with operating non-resilient fasteners (e.g., bolts, welding, adhesive, etc.) to couple the light mixing rod 114 in face-sharing contact with the LED element 112.

The optical device 100 further includes a cone 126 arranged around the light rod cap 122. The cone 126 may extend from the rear section 106 and into the front section 104 of the housing 102. A diameter of the cone 126 may increase in the downstream direction (e.g., positive x-direction) such that a maximum diameter of the cone 126 is arranged in the front section 104 and a minimum diameter of the cone 126 is arranged towards the rear section 106.

The cone 126 may block light from entering the optical device 100 and contacting one or more of a printed circuit board (PCB) 152, electronics, or other components of the optical device 100 behind the cone 126 (e.g., to the left of the cone 126 with respect to the orientation in FIG. 1). The cone 126 may be further configured to block light (e.g., emitted from the sun or other exterior source) from being focused by the lens 150 onto the components behind the cone 126, including the light engine 300. Additionally or alternatively, the cone 126 may be configured as a heatsink and thus may provide an amount of thermal management to the optical device 100. The cone 126 may be further configured to support a plurality of back light LEDs 127. For example, the cone 126 may include an annular section 154 protruding from the wide end (e.g., downstream end) of the cone 126 and facing parallel with the lens 150. The plurality of back light LEDs 127 may be circularly distributed along a circumference of the cone 126. Specifically, the plurality of back light LEDs 127 may be arranged along the annular section 154. Thus, the back light LEDs 127 may be positioned between the light mixing rod 114 and the movable lens 150. The plurality of the back light LEDs 127 may be configured to produce lighting effects.

The front section 104 may further surround a motor 140, a connecting linkage 142, and articulating arms including a first arm 144, and a second arm 146. The second arm 146 may be coupled to a lens frame 148 housing the lens 150. The motor 140, the connecting linkage 142, the first arm 144, the second arm 146, the lens frame 148, and the lens 150 may be included in a lens actuation system 400 shown in FIGS. 4A-4D. The lens actuation system 400 may make a position of the lens 150 within the housing 102 adjustable.

The connecting linkage 142 may be positioned opposite the motor 140 across the cone 126. For example, the connecting linkage 142 may be positioned above the cone 126 and the motor 140 may be positioned below the cone 126. The connecting linkage 142 may be configured to actuate in a circular motion in a space between the cone 126 and the rear section 106 of the housing 102. In one example, the connecting linkage 142 may include a curved shape contoured to match the cone 126. For example, the connecting linkage 142 may curve around and be spaced away from the cone 126. Thus, the connecting linkage 142 may move within the space between the PCB 152 and the cone 126 (e.g., from the upstream position to the downstream position), or any position therebetween, without contacting the cone 126.

The articulating arms may translate movement of the connecting linkage 142 to movement of the lens frame 148. For example, the lens frame 148 and the lens 150 may move linearly between the upstream position and the downstream position according to a position of the connecting linkage 142. The connecting linkage 142, and thus the lens frame 148 and the lens 150, may be driven by the motor 140, as described further below.

Moving the lens 150 linearly with respect to the housing 102 and the light engine 300 may adjust an optical effect produced by the optical device 100. For example, a distance between the LED element 112 and the lens 150 may correlate to a beam width of a light beam exiting the optical device 100 via the lens 150. Rapid transition between a narrow beam and a wide beam may be demanded. The lens actuation system 400 may move the lens 150 more rapidly and efficiently than previous systems, as described further below.

Turning to FIGS. 4A, 4B, 4C, and 4D, the lens actuation system 400 is shown in a perspective view 410, a side-on view 420, a side-on cross sectional view 430, and a top-down cross sectional view 440, respectively. Some parts are shown translucently in the perspective view 410 and the side-on view 420 so as to not obstruct visuals of parts therebehind. The side-on cross sectional view 430 may be a section taken along a cutting plane C-C' parallel with an x-z plane in the perspective view 410. The top-down cross sectional view 440 may be a section taken along a cutting plane D-D' parallel with an x-y plane in the perspective view 410. The cone 126 and a portion of the housing 102 are also shown in FIGS. 4A-4D. The position of the lens 150 (e.g., relative to the cone 126) may be adjustable via the lens actuation system 400.

The motor 140 may be coupled to a flywheel 406 via a shaft 408. The shaft 408 may extend from side to side of the cone 126 such that the flywheel 406 and the motor 140 are opposite each other across the cone 126. In this way, packing volume of the optical device 100 may be reduced compared to positioning the motor 140 and the flywheel 406 on the same side of the cone 126. The motor 140 may rotate the flywheel 406 via the shaft 408, which in turn may actuate the connecting linkage 142 via a rod (e.g., rod 702 of FIGS. 7-8B). The connecting linkage 142 may be coupled to the housing at connecting linkage joints 416 (e.g., pivot joints) such that the connecting linkage 142 can rotate but not translate with respect to the housing 102.

Actuating the connecting linkage 142 may include rotating the connecting linkage 142 about a first rotational axis 414 that extends through the connecting linkage joints 416. As described above, the connecting linkage 142 may be curved according to the curvature of the cone 126 such that the connecting linkage 142 remains spaced away from the cone 126 throughout actuation of the connecting linkage 142. In this way, the packing volume of the optical device 100 may be reduced (e.g., compared to spacing a straight connecting linkage away from the cone 126) while preventing interference of the cone 126 with function of the lens actuation system 400, including rotation of the connecting linkage 142.

The first arm 144 may be an arm of a first arm pair 444. The first arm pair 444 is directly coupled to the connecting linkage 142 and a second arm pair 446 comprising the second arm 146. The first arm pair 444 may extend between the connecting linkage 142 and the second arm pair 446. Specifically, first ends of the first arm pair 444 may be coupled to the connecting linkage 142 at the connecting linkage joints 416 such that the connecting linkage 142 connects the first arm pair 444 of arms diametrically opposite one another across the cone 126. Second ends of the first arm pair 444 may be coupled to first ends of the second arm pair 446 at arm joints 418 (e.g., pivot joints), where the second ends of the first arm pair 444 are opposite lengthwise from the first ends of the first arm pair 444. Pivot joints, such as the connecting linkage joints 416 and the arm joints 418, may allow for rotational independence of the components coupled at the joint. In this way, there may be a variable angle (e.g., second arm angle 724 of FIGS. 7-8B) between the first arm pair 444 and the second arm pair 446, where the variable angle may change according to rotation of the flywheel 406. The first arm pair 444 may be rotationally coupled to the connecting linkage 142 such that upon rotation of the connecting linkage, the first arm pair 444 may also rotate about the first rotational axis 414 with the same rotational speed. In some examples, the first arm pair 444 may be integral with the connecting linkage 142.

The second arm pair 446 is directly coupled to the lens frame 148 at frame joints 422. Specifically, second ends of the second arm pair 446 are coupled to the lens frame 148 at the frame joints 422, where the second ends are opposite lengthwise from the first ends of the second arm pair 446 which are coupled to the first arm pair 444. The second arm pair 446 may extend between the first arm pair 444 and the lens frame 148.

Motion from the connecting linkage 142 may be symmetrically applied to each of the first arm pair 444, the second arm pair 446, and the lens frame 148. In this way, the connecting linkage 142 may distribute torque approximately equally between the arms of the first arm pair 444, thereby applying approximately equal force to both sides of the lens frame 148. Rotational motion of the flywheel 406 may be translated via the connecting linkage 142 and the articulating arms (including the first arm pair 444 and the second arm pair 446) to linear oscillating motion of the lens frame 148. In this way, each of the flywheel 406, the connecting linkage 142, the rod 702, the plurality of articulating arms, the lens frame 148, and the lens 150 may be configured to move according to operation of the motor 140.

To repetitively transition back and forth between the upstream position and the downstream position, pausing output of the motor 140 may not be demanded, eliminating deceleration of the motor 140 and flywheel 406 near the upstream and downstream positions and allowing for more rapid cycles. As used herein, a cycle may include motion of the lens from a starting position, through all other positions between and including the upstream position and the downstream position, back to the starting position. Thus, a cycle may be executed by a single full, continuous rotation (e.g., 360 degrees) of the flywheel 406 in a single rotational direction. Such rotation of the flywheel 406 may perform one or more sequential cycles more quickly than systems where stopping and reversing at each of the upstream and the downstream positions is demanded, such as a belt drive or worm drive system.

The housing 102 may include a plurality of features for coupling to the lens actuation system 400. The plurality of features may include threaded inserts/molds, tracks, bearings, tabs, receiving holes, and interlocking shapes for retaining the lens 150 and maintaining linearity of the motion thereof.

For example, the housing 102 may include a pair of tracks 402. The pair of tracks 402 may be diametrically opposite one another. In some examples, the pair of tracks 402 may be positioned at the frame joints 422. For example, as shown in FIGS. 4A-4D, the frame joints 422 may be diametrically opposite each other along the y-axis, and the tracks 402 may also be diametrically opposite each other along the y-axis. In other examples, the pair of tracks 402 may be offset from the frame joints 422. For example, the frame joints 422 may be diametrically opposite each other along the y-axis as shown, and the tracks 402 may be diametrically opposite each other along the z-axis. In some examples, there may be additional tracks. The pair of tracks 402 may be located downstream relative to the cone 126 and the connecting linkage joints 416.

Figure 4D:
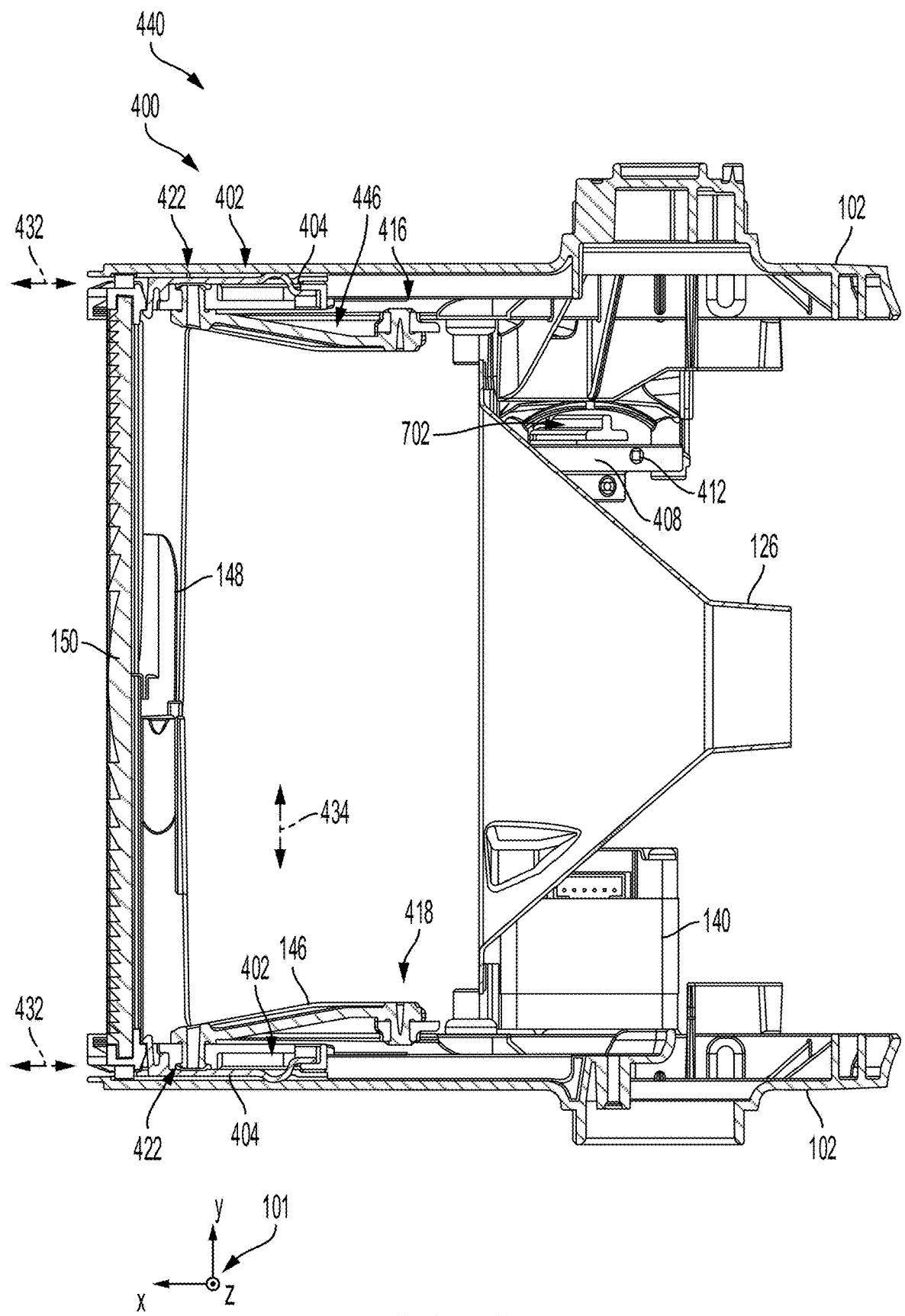

The pair of tracks 402 may each be configured to engage with a retention arm 404 of the lens actuation system 400. In one example, the retention arms 404 are spring clips configured to retain the lens actuation system 400 within the tracks 402. In one example, the retention arms 404 may be directly coupled to the lens frame 148. For example, as best seen in FIG. 4D, the retention arms 404 may fit into a complementary recess formed in the lens frame 148. In some examples, the second arm 146 may be in face-sharing contact with the retention arm 404. The retention arms 404 may be flexible and configured to press against a surface of a corresponding track of the pair of tracks 402. In one example, a number of tracks 402 is equal to a number of retention arms 404. In such an example, there may be two or more tracks 402 and correspondingly, there may be two or more retention arms 404.

The tracks 402 may include different cutouts, protrusions, and indentations that are complementary to features of the retention arms 404 such that the retention arms 404 may slide within a corresponding track 402 as the lens 150 is actuated from the upstream position to the downstream position, or vice-versa, without disengaging from the tracks 402. As described above, the lens 150 is relatively closer to the cone 126 in the upstream position compared to the downstream position.

The retention arms 404 may each move relative to the housing 102 along a respective first axis 432 and a second axis 434, where the second axis 434 is normal to the first axis 432. There may be a first axis 432 for each retention arm 404, where the first axes are parallel to one another. The first axis 432 may be parallel with motion of the lens frame 148. The second axis 434 may be perpendicular to motion of the lens frame 148. Movement of the retention arms 404 along the first axis 432 may include sliding of the retention arms against the tracks 402. Movement of the retention arms 404 along the second axis 434 may include tension of the retention arms 404 increasing or decreasing.

In one example, the portion of the housing 102 comprising the tracks may be a separate piece from a remainder of the housing 102 shown in FIGS. 1, 2 and 6. In such an example, the portion of the housing 102 comprising the tracks 402 may be physically coupled to the remainder of the housing 102 via fasteners, welds, adhesives, and/or fusions. Additionally or alternatively, the housing 102 may be a single integral piece.

Additionally or alternatively to the tracks 402 and complementary retention arms 404, the lens actuation system 400 may include other means of guiding the motion of the lens frame 148 and accordingly, motion of the lens 150, linearly relative to the housing 102. For example, the lens frame 148 may include features such as indents (e.g., indents 704 of FIGS. 7-8B) that are complementary to features of the housing 102 such as protrusions adapted to be received by the indents.

Figure 7:
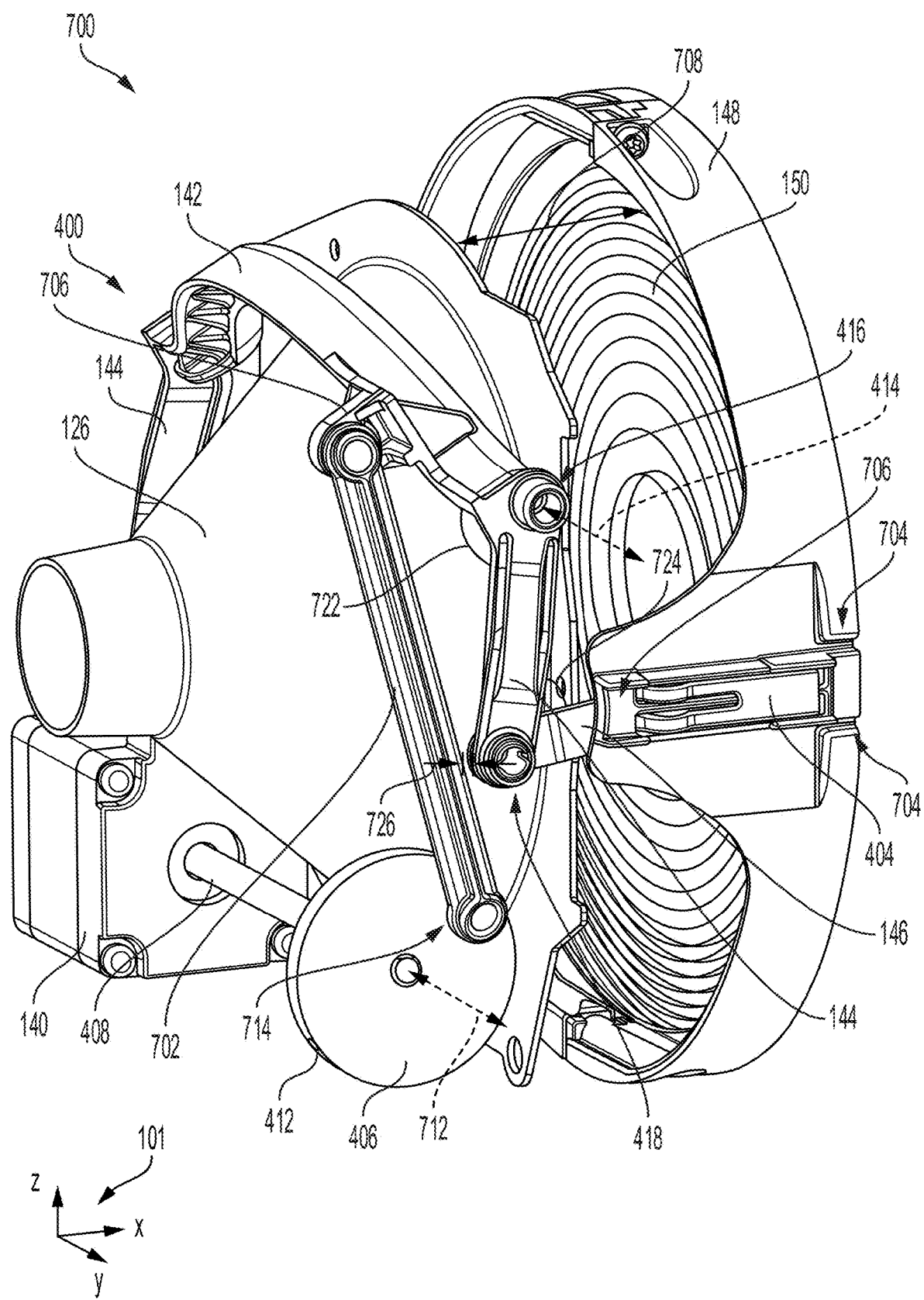
FIG. 7 illustrates the lens in a first position.
Figure 8A:
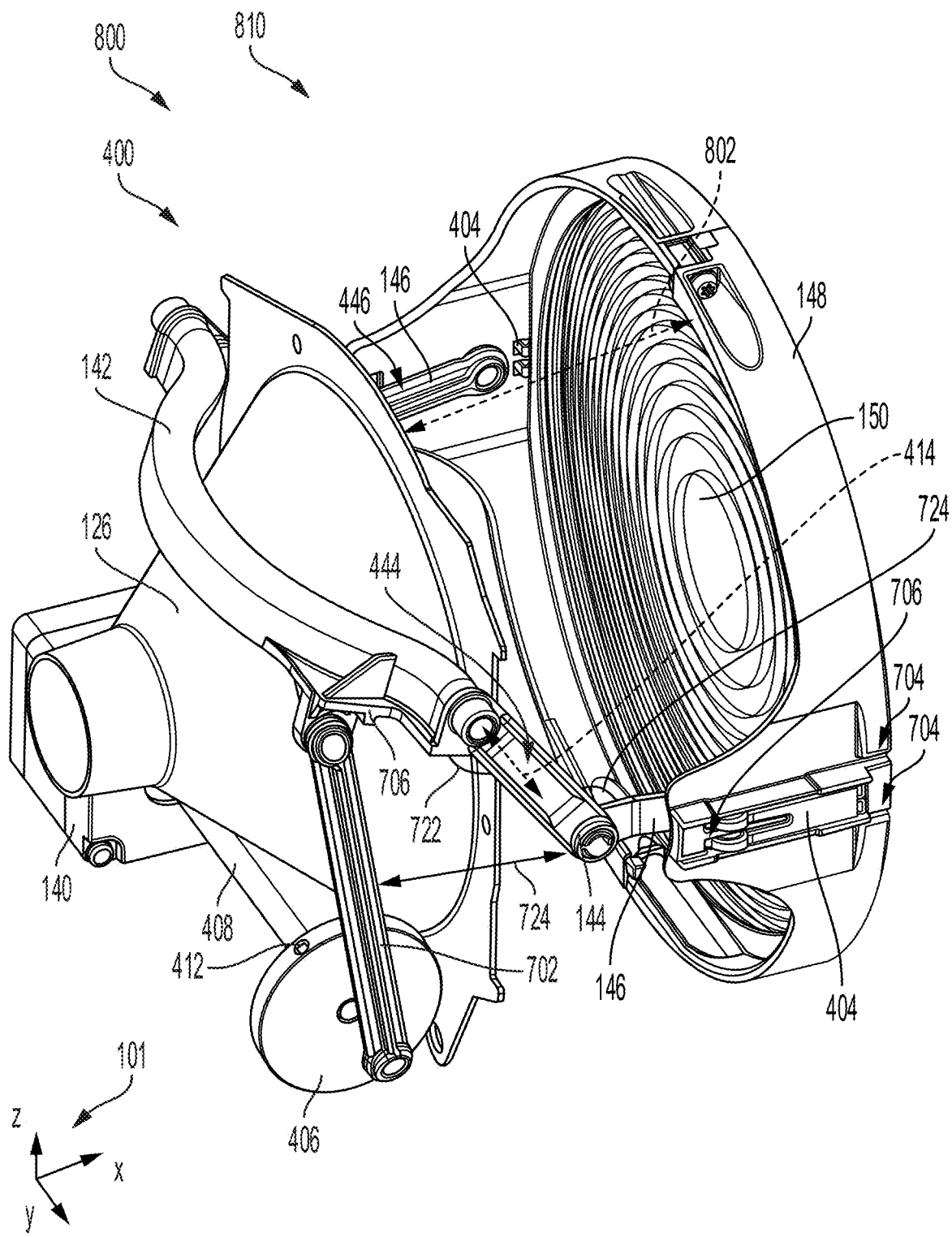
FIGS. 8A and 8B illustrate the lens in a second position.
Figure 8B:
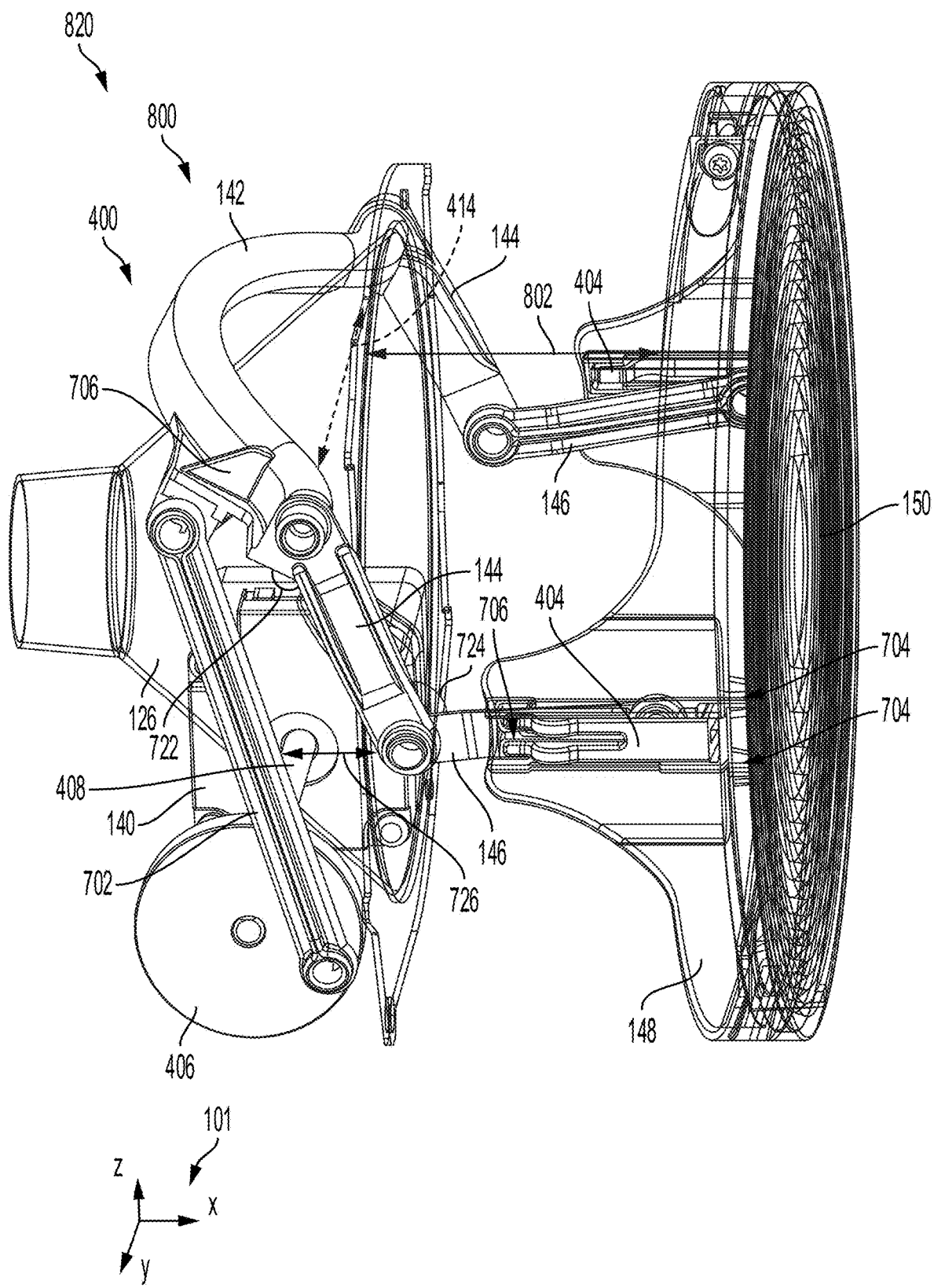

The lens actuation system 400 may actuate the lens 150 from a first position 700 shown in FIG. 7, to a second position 800 shown respectively in a first view 810 and a second view 820 in FIGS. 8A and 8B, or vice versa. In one example, the first position 700 is a relatively upstream position and the second position 800 is a relatively downstream position. For example, a first distance 708 between the cone 126 and the lens frame 148 in the first position 700 may be shorter than a second distance 802 between the cone and the lens frame 148 in the second position 800. That is, the distance between the cone 126 and the lens frame 148 may be adjustable according to rotation of the flywheel 406. Additionally or alternatively, the first position 700 may be a relatively wide beam position and the second position 800 may be a relatively narrow beam position.

A first end of the rod 702 may be coupled to the flywheel 406 at a flywheel joint 714. The flywheel joint 714 may be off-center with respect to the center of the flywheel 406. In this way, the first end of the rod 702 may be moved in a circular pathway according to rotation of the flywheel 406. A second end, opposite the first end, of the rod 702 may be physically coupled to a bracket 706 of the connecting linkage 142. The bracket 706 may protrude from the connecting linkage 142 in a direction oriented away from the lens 150. In one example, the bracket 706 is off-center relative to a center of the connecting linkage 142. The bracket 706 may be spaced away from the connecting linkage joints 416. The bracket 706 may be vertically above the flywheel 406. The bracket 706 and the flywheel 406 may be secured to the rod 702 such that they are rotationally independent and thus allowed to pivot relative to one another.

The flywheel 406 may rotate in either rotational direction (e.g., clockwise or counterclockwise with respect to FIG. 7) about a second rotational axis 712 extending centrally through the shaft 408. The flywheel 406 may rotate 360 degrees such that the flywheel 406 rotates continuously (e.g., 360 degrees) about the second rotational axis 712. As the flywheel 406 rotates about the second rotational axis 712, the bracket 706 may be compelled upwards and downwards via the rod 702, causing the connecting linkage 142 to rotate about the first rotational axis 414.

Specifically, as the bracket 706 is pushed upwards by rotation of the flywheel 406 about the second rotational axis 712, the second arm pair 446 may pull the lens frame 148 closer to the cone 126, which is stationary with respect to the housing 102. The lens frame 148 may slide along the tracks 402 which may be perpendicular to the first rotational axis 414 and/or the second rotational axis 712. For example, a first arm angle 722 between the first arm 144 and the connecting linkage 142 may remain constant due to the first arm pair 444 being rotationally coupled or integral with the connecting linkage 142. A second arm angle 724 between the first arm 144 and the second arm 146 may be reduced as the bracket 706 is pushed upwards and the lens 150 is moved closer to the flywheel 406, the motor 140, and the cone 126. Additionally, a distance 726 between the rod 702 and the arm joints 418 may be reduced as the lens 150 is moved closer to the flywheel 406, the motor 140, and the cone 126.

Conversely, as the bracket 706 is pulled downwards by rotation of the flywheel 406, the second arm pair 446 may push the lens frame 148 further away from the cone 126, linearly along the tracks 402 as described above. For example, the first arm angle 722 may remain constant. The second arm angle 724 and the distance 726 may increase. For example, comparing the first position 700 with the second position 800, the first arm angle 722 may be the same. The second arm angle 724 may be greater in the second position 800 than the first position 700. Thus, the second arm angle 724 may be variable according to rotation of the flywheel 406. The distance 726 may be greater in the second position 800 than the first position 700.

Rotating the flywheel 406 a full rotation may prompt a full cycle of lens 150 movement through every position between and including the upstream position (e.g., closest to the cone 126) and the downstream position (e.g., furthest from the cone 126). The upstream position may include the flywheel 406 being at an angular position where the flywheel joint 714 is closest to the bracket 706 (e.g., at a topmost position) and the downstream position may include the flywheel 406 being at an angular position where the flywheel joint 714 is furthest from the bracket 706 (e.g., at a bottommost position).

Therefore, the angular position of the flywheel 406 may directly correlate to the linear position of the lens 150. A single sensor (e.g., magnetic sensor) may be used to monitor the current state of the lens actuation system 400 by detecting a detectable element 412 positioned along the circumference of the flywheel 406. The detectable element 412 may alternatively be positioned elsewhere along the flywheel 406 that is off-center of the flywheel 406. For example, the detectable element 412 may be a magnet detectable by a magnetic sensor positioned on and electrically coupled to the PCB 152 shown in FIGS. 1, 5, and 6. The magnetic sensor may be stationary with respect to the housing 102. The flywheel 406 may not move besides rotating with respect to the housing 102. Therefore, a distance between the detectable element 412 (e.g., magnet) and the sensor (e.g., magnetic sensor) may be used to find an angular position of the flywheel 406. The distance between the detectable element 412 and the sensor may be used to measure the position of the flywheel 406, and thus determine the position of the lens 150. Additionally, a rate of change in the distance between the detectable element 412 and the sensor may be used to determine the angular velocity of the flywheel 406, and correspondingly the oscillating frequency of the lens 150.

In this way, each of the shaft 408, the flywheel 406, the connecting linkage 142, the rod 702, the plurality of articulating arms (e.g., first arm pair 444 and second arm pair 446), the lens frame 148, and the lens 150 is configured to move based on operation of the motor 140. For example, because operation of the motor 140 determines the angular position and speed of the flywheel 406 via the shaft 408, operation of the motor 140 may also determine the position and speed of the connecting linkage 142, the rod 702, the plurality of articulating arms, the lens frame 148, and the lens 150.

Operation of the motor 140 may be controlled to rotate the flywheel 406 and consequently move the lens 150 in any patterns. In some examples, the motor 140 rotates the flywheel 406 in one rotational direction. In other examples, the flywheel 406 alternates rotational directions according to a desired optical effect (e.g., beam width patterns). For example, the flywheel 406 may repetitively rotate a partial cycle before switching to the other direction to circumvent one or both of the end positions of the lens 150, decreasing a contrast between wide and narrow beams. In some examples, the motor 140 may pause rotation of the flywheel 406 when beam width variation is no longer desired. In other examples, rotation of the flywheel 406 may be continuous throughout operation of the optical device 100. Continuous rotation of the flywheel 406 via continuous operation of the motor 140 may be more rapid and efficient than other systems where continuous cycling of the lens demands stopping and reversing the motor, such as a belt drive or worm drive system. Additionally or alternatively, the motor 140 may operate at a range of speeds such that the lens 150 oscillates at a range of frequencies (e.g., up to 3 Hz). Additionally or alternatively, the motor 140 may operate at a single speed such that the lens 150 oscillates at a constant frequency throughout actuation of the lens 150.

Relative dimensions of the lens actuation system 400 may be adjusted to adapt the lens actuation system 400 to an application. For example, if a greater span between the upstream and downstream positions of the lens 150 is demanded, the diameter of the flywheel 406 may be increased and the flywheel joint 714 may be moved radially outwards, away from the second rotational axis 712. Conversely, if a smaller difference between the upstream and downstream positions of the lens 150 is demanded, the diameter of the flywheel 406 may be decreased and/or the flywheel joint 714 may be moved radially inwards, closer to the second rotational axis 712. Additionally or alternatively, relative lengths of the articulating arms may be adjusted.

Figure 5:
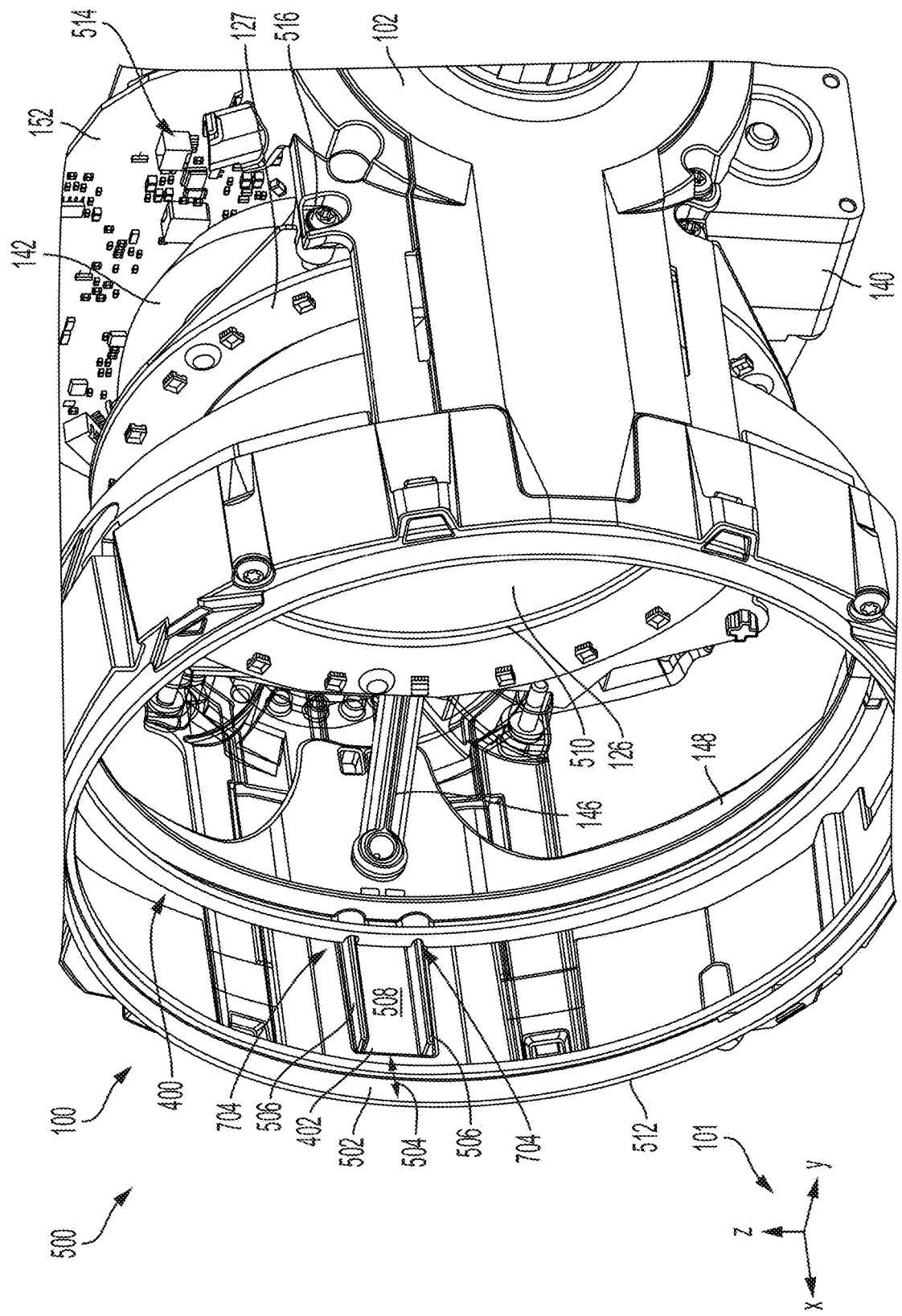
FIG. 5 illustrates a perspective view of the portion of the housing of the optical device coupled to the lens.
Figure 6:
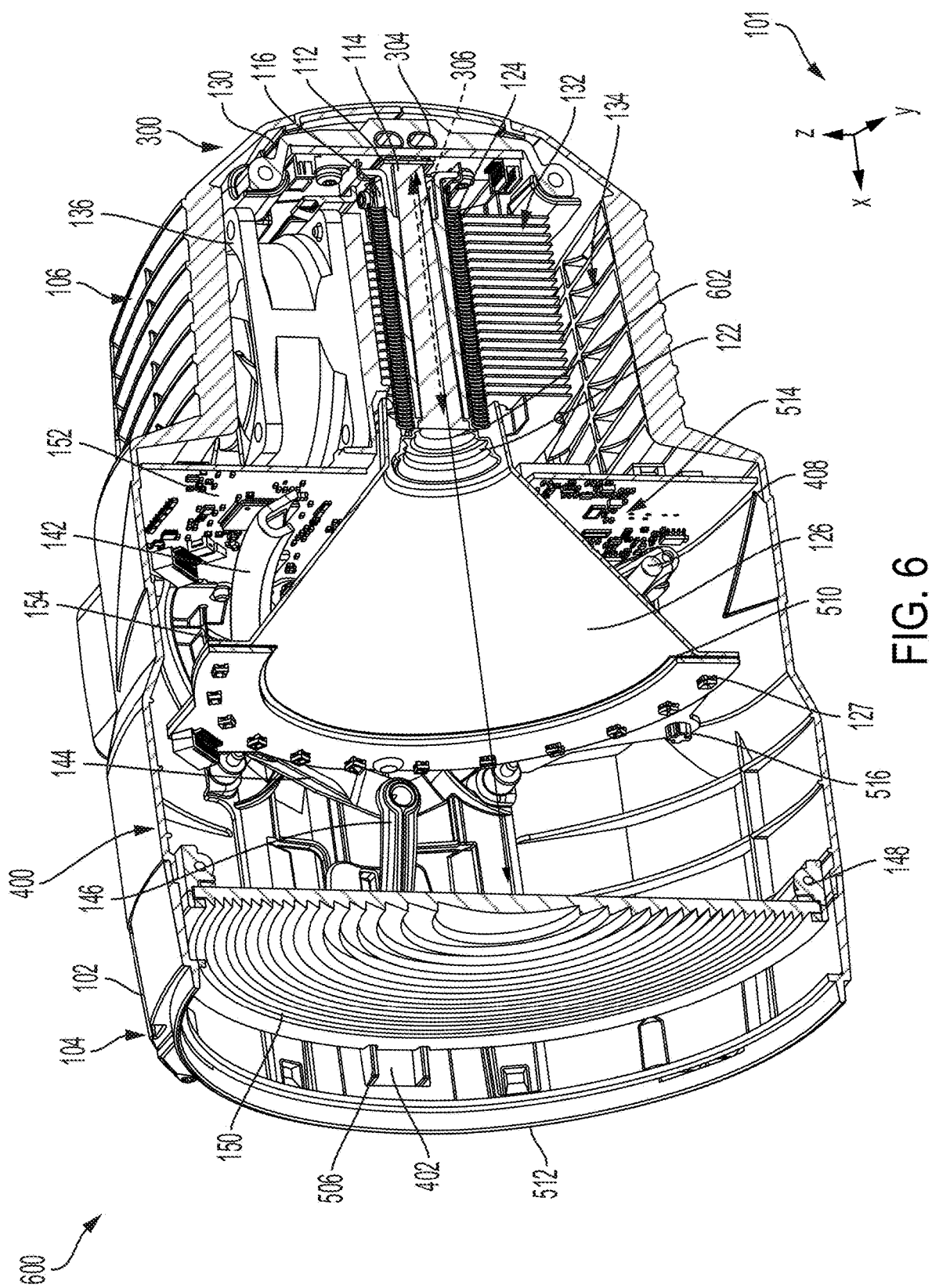
FIG. 6 illustrates a cross-sectional view of the optical device.

Turning to FIGS. 5 and 6, a first view 500 and a second view 600 of the optical device 100 are respectively shown. The lens 150 and some parts of the housing 102 are omitted in the first view 500 for visibility of components housed therein. The second view 600 is a cross section view.

A portion 502 of the housing 102 may extend beyond the tracks 402. In this way, the tracks 402 may be spaced away from a downstream end 512 of the optical device 100 by a distance 504. The downstream position of the lens 150 may be at least the distance 504 away from the downstream end 512. The portion 502 may be integral with the portion comprising the tracks 402, in some examples, such as examples where the housing 102 is a single integral piece. Alternatively, the portion 502 may be a separate piece from the portion comprising the tracks 402 and coupled thereto via fasteners, adhesive, soldering, a combination thereof, etc.

The lens actuation system 400 may adjust a distance 602 between the LED element 112 and the lens 150. The distance 602 may be perpendicular with the lens 150. The tracks 402 may be parallel with the distance 602 such that the lens 150 moves linearly therealong when actuated by the lens actuation system 400 to increase or decrease the distance 602. The tracks 402 may be bordered by protrusions 506 on both sides, extending parallel with motion of the lens frame 148 and the lens 150, and with the distance 602. The protrusions 506 may jut radially inwards from the housing 102. The protrusions 506 may engage with the indents 704 in the lens frame 148. For example, the indents 704 may receive the protrusions 506. As the lens 150 is moved via the lens actuation system 400 as described above, the indents 704 may slide along the protrusions 506 to maintain linearity of the motion of the lens 150 in a direction parallel with the distance 602. In some examples, there may be further protrusions and complementary indents arranged circumferentially around the housing 102 and the lens frame 148, respectively. Additionally or alternatively, retention arms such as the retention arms 404 of FIGS. 4A-8B may slide along a surface 508 of the tracks 402 interposed between the protrusions 506. In this way, the tracks 402 may be slidingly engaged with the lens frame 148 and the retention arms which may be physically coupled to the lens frame 148.

An insulating layer 510 may be interposed between the back light LEDs 127 and the cone 126. The insulating layer 510 may protrude radially inwards from the cone 126 to catch stray light and ensure the light is directed towards the lens 150. Extensions of the cone 126 may protrude radially outward towards the housing 102. The extensions may be physically coupled to the housing 102, for example via fasteners 516 extending through the housing 102 and the cone 126 or other fastening means such as soldering.

As described above, a sensor may detect a state of the flywheel 406 of FIGS. 4A-8B. For example, a plurality of electrical components 514 may be electrically coupled to the PCB 152 and may include a flywheel sensor. The PCB 152 may be annular shaped. The PCB may be interposed between the light engine 300 and the cone 126. Additionally or alternatively, the PCB 152 may be interposed between the light engine 300 and the lens actuation system 400. The cone 126 and/or the light rod cap 122 may extend through the center of the PCB 152. For example, the narrowest end of the cone 126 may be circumferentially surrounded by the PCB 152. The sensor of the plurality of electrical components 514 electrically coupled to the PCB 152 may be positioned on an area of the PCB 152 proximate to the flywheel 406. For example, the sensor may be closer to the flywheel 406 than the motor 140 or the connecting linkage 142. Additionally, the PCB 152 may be interposed between the sensor and the light engine 300. Additionally or alternatively, the PCB 152 may be located between the LED element 112 and the lens actuation system 400.

By utilizing continuous rotational motion of the flywheel to drive back and forth linear motion of the lens 150, the sensor may be the only sensor demanded to track the lens 150. Hence, the lens actuation system 400 may be less complex than other systems demanding two or more sensors to track the lens, for example one at each of the end positions (e.g., upstream and downstream positions). Additionally, the size of the flywheel may correlate directly to the distance between the upstream and downstream positions of the lens 150. In this way, the range of motion of the lens 150 may be intrinsic to the geometry of the lens actuation system design, rather than affected by operation of the motor 140 as in previous systems where the drive stops and reverses at each end position.

Turning to FIG. 25, a flowchart of a method 2500 is shown for operating a lens actuation system having a connecting linkage, such as the lens actuation system 400 which includes the connecting linkage 142 of FIGS. 1 and 4A-8B.

The method 2500 begins at 2502, wherein an output light is generated from an LED, such as the LED element 112 of FIGS. 1-3C and 6. The output light may comprise one or more colors (wavelengths of light). The output light may be homogenized, for example via the light mixing rod 114 of FIGS. 1-3C and 6.

The method 2500 proceeds to 2504, wherein a lens receiving the output light is moved linearly back and forth via the lens actuation system having the connecting linkage by rotating a motor (e.g., motor 140 of FIGS. 1 and 4A-8B) in a single direction. The motor may not pause or reverse rotation (e.g., rotate in the rotational direction opposite to the single direction) in order to reverse the linear lens movement. The linear movement of the lens may be oscillating motion. The lens actuation system may further include a flywheel (e.g., flywheel 406 of FIGS. 4A-4D and 7-8B) driven by the motor and coupled to the connecting linkage via a rod (e.g., rod 702 of FIGS. 7-8B). The lens actuation system may further include articulating arms (e.g., first arm pair 444 and second arm pair 446 of FIGS. 4A-4D) coupling the connecting linkage to a frame (e.g., frame 148 of FIGS. 1 and 4A-8B) housing the lens.

The method 2500 proceeds to 2506, wherein the movement or rotation is sensed via a sensor. Sensing may include the sensor detecting a detectable element (e.g., detectable element 412 of FIGS. 4D, 7, and 8A) such as a magnet. For example, a magnetic sensor may detect a position of a magnet. The magnet may be located off-center of a rotating component of the lens actuation system, such as the flywheel, to sense rotation thereof. Alternatively, the magnet may be located on the frame that houses the lens to sense the linear movement thereof. Motion of the magnet, or other detectable element, relative to the sensor may be used to track rotation (e.g., motor output) or the movement of the lens.

The method 2500 may include moving the lens to a target position or at a target frequency at 2508, such as by executing the method 2400 of FIG. 24 as described below.

The method 2500 ends. The method 2500 may be executed continuously throughout operation of the lens actuation system. Steps of the method 2500 may occur concurrently and/or in different orders than provided in the method 2500.

Turning to FIG. 24, a flowchart of a method 2400 is shown for operating a lens actuation system, such as the lens actuation system 400, where rotational motion of a flywheel (e.g., flywheel 406 of FIGS. 4A-8B) is translated to linear oscillating motion of a lens (e.g., lens 150 of FIGS. 1-8B).

The method 2400 may be executed as part of the method 2500 of FIG. 5. The method 2400 may be performed by a control system, such as the control system 180 of FIG. 1, by executing instructions stored in non-volatile memory of a controller or the control system, such as the controller 170 of FIG. 1.

The method 2400 begins at 2402, wherein a target position or frequency of the lens is determined. The target position may be a location within a housing of an optical device (e.g., optical device 100 of FIGS. 1-8B) along a linear path between and including an upstream position and a downstream position. The target frequency may be a target oscillating frequency at which the lens linearly oscillates between the upstream and the downstream position. For example, the target position or the target frequency may be part of a pre-programmed routine stored in the nonvolatile memory of the controller comprising a series of target positions and/or target frequencies. As another example, the target position or the target frequency may be input manually by a user.

The method 2400 proceeds to 2404, wherein the lens is moved linearly by actuating a motor (e.g., motor 140 of FIGS. 1, 4A-4D, and 7-8B) to rotate the flywheel. For example, rotating the flywheel via the motor may drive motion of a connecting linkage and articulating arms physically coupled to a frame housing the lens. The motor may operate continuously, in a single rotational direction, in order to move the lens back and forth along the linear path. In this way, deceleration and stopping of the motor may not be demanded to reverse the linear direction of the lens motion. The flywheel may rotate 360 degrees for each cycle of lens movement. The direction of rotation of the motor and the flywheel may be selected according to which direction is kinematically favorable. Additionally, or alternatively, the direction of rotation may be selected according to a comparison of the current and target positions. For example, rotation may occur in the direction which may reach the target position faster. The controller may control operation of the motor, such as output speed of the motor.

The method 2400 proceeds to 2406, wherein a measured position or frequency of the flywheel is measured. For example, the measured frequency of the flywheel may be a number of full rotations per unit of time (e.g., per second). The measured position of the flywheel may be an angular position. The measured position and frequency may be measured by a sensor (e.g., magnetic sensor) detecting a detectable element (e.g., magnet) positioned off-center of the flywheel, for example along a circumference of the flywheel. The sensor may be part of the control system and communicatively coupled to the controller. In some examples, both the position and the frequency are measured. Other metrics may also be measured, such as a rotational direction of the flywheel.

The method 2400 proceeds to 2408, wherein a current position or frequency of the lens is determined. For example, if there is a target position, the current position of the lens may be determined therefrom. For example, if there is a target frequency, the current frequency of the lens may be determined therefrom. The current frequency of the lens may be approximately equal to the measured frequency of the flywheel. The linear position of the lens may correspond directly to the angular position of the flywheel. The orientation of the velocity of the lens may correspond to the rotational direction of the flywheel.

The method 2400 proceeds to 24010, wherein it is determined whether the current position or the current frequency of the lens respectively matches the target position or the target frequency. For example, the controller may compare the target frequency with the current frequency determined at 2408. Alternatively, the controller may compare the target position with the current position determined at 2408. If the corresponding target and current values are within a threshold difference, it may be determined that they match (e.g., the target condition is met). Alternatively, if the corresponding target and current values are outside of the threshold difference, it may be determined that they do not match (e.g., the target condition is not met).

If the current position does not match the target position or the current frequency does not match the target frequency (NO at 2410), the method 2400 proceeds to 2412, wherein the current position or the current frequency of the lens is adjusted. For example, the current position or the current frequency of the flywheel may be adjusted via actuation of the motor in order to adjust the position or frequency of the lens.

If the current position matches the target position or the current frequency matches the target frequency (YES at 2410), the method 2400 proceeds to 2414, wherein respectively, the lens is stopped at the target position or moving the lens at the current frequency is continued. For example, if the target position is determined at 2402 and the target position matches the current position of the flywheel, movement of the lens may be stopped due to having reached the target position. Stopping the motion of the lens may include stopping output of the motor, and therefore stopping rotation of the flywheel. Alternatively, if the target frequency is determined at 2402, and the target frequency matches the current frequency at 2410, the target reached, and thus operation under the current conditions may continue. Continuing at the current frequency may include maintaining the current output of the motor. The motor may generate continuous output in a single rotational direction in order to oscillate the lens at the frequency of rotation.

The method 2400 ends after 2414. By executing the method 2400, the target frequency or the target position of the lens is reached. The method 2400 may be iteratively repeated throughout operation of the optical device 100 to produce desired optical effects.

As described above, a coupling system in accordance with the present disclosure may fix a plurality of the optical device 100 and/or other fixtures in vertical arrays, horizontal arrays, or a lattice or grid formation. The coupling system of the present disclosure may include one or more frames and one or more coupling devices assembled together and vertically hung from a fixed structure. In this way, the optical devices 100 may be supported by the coupling system throughout actuation, such as throughout movement of a movable front lens (e.g., lens 150) via a lens actuation system (e.g., lens actuation system 400), for example by implementing the method 2400 of FIG. 24.

An example of a coupling system 2000 is shown schematically in FIG. 20. A set of reference axes 901, including an x-axis, a y-axis, and a z-axis, are shown in FIGS. 9-23 for comparison of the orientations shown therein. In at least some examples, the z-axis may be a vertical axis, and the y-axis and the x-axis may be horizontal axes. Additionally or alternatively, the z-axis of the reference axes 901 may be parallel with the z-axis of the reference axes 101 in FIGS. 1-8B. Additionally or alternatively, the z-axis may be parallel with a direction of gravity. The coupling system 2000 may include a plurality of frames 2002. In one example, each of the plurality of frames 2002 is identical. As shown, the plurality of frames 2002 may be coupled to a corresponding fixture 2004.

The corresponding fixture 2004 may be an optical device (e.g., optical device 100 of FIGS. 1-8B), such as a light fixture. In at least some examples, the fixture may include an LED in face-sharing contact with a light mixing rod, configured to produce optical effects. Additionally or alternatively, the fixture 2004 may include a lens actuation system adapted to move a lens therein. In another example, the fixture 2004 may be a different optical device, or other type of fixture, such as an audio device. In some examples, the fixtures 2004 may be identical to one another. In another example, the fixtures 2004 may include various types of fixtures.

The coupling system 2000 further includes the control system 180 comprising the controller 170. The control system 180 may control each of the fixtures 2004. For example, the control system 180 may execute instructions stored in non-volatile memory of the controller 170 to move lenses within the fixtures 2004. The lenses may be moved synchronously or asynchronously. The control system 180 may also rotate, swivel, or otherwise move the fixtures 2004. In examples where the fixtures 2004 are optical devices, the control system 180 may also control optical effects produced by the fixtures 2004, such as by controlling colors emitted by LEDs therein (e.g., LED element 112 and back light LEDs 127 of FIGS. 1 and 6). The coupling system 2000 may support the fixtures 2004 throughout a range of motion of the fixtures 2004. For example, due to the structure of the coupling system 2000, the fixtures 2004 may be supported throughout movement of lenses within the fixtures 2004. The coupling system 2000 may remove load-bearing burden from the fixtures 2004 and dampen vibrations produced by movement thereof.

The plurality of frames 2002 are interlocked via a plurality of coupling devices physically coupled to mounts of different frames. For example, a coupling device may be physically coupled to a mount of a first frame 2002a coupled to a first fixture 2004a, and the coupling device may also be physically coupled to a mount of a second frame 2002b coupled to a second fixture 2004b. A top 2006 of the coupling system 2000 may be attached to a fixed structure such that the coupling system 2000 hangs therefrom.

In the example of FIG. 20, the plurality of frames 2002 interlock with one another to arrange the plurality of fixtures in a column. Further frames and coupling devices may be included to arrange the plurality of fixtures in a row and/or into a grid with uniform spacing between each of the plurality of fixtures. In one example, spacing between neighboring fixtures of the plurality of fixtures may prevent fixture-to-fixture contact as the fixtures rotate, spin, oscillate, or move in another way. Additionally, the frames 2002 may be removable coupled via the coupling devices such that the frames 2002 may be rearranged.

Turning now to FIGS. 9 and 10, a frame 900 is shown, which is an example of the frames 2002 of FIG. 20.

The frame 900 may include a ring 918. The frame 900 may be configured to circumferentially surround a fixture (e.g., fixture 2004 of FIG. 20). The frame 900 may include a central opening 932 through which the fixture may be arranged. The frame 900 may further include a plurality of bosses 922 with a plurality of fasteners 924 extending therethrough that physically couple the frame 900 to the fixture in the central opening 932. For example, the fasteners 924 may extend through the bosses 922 and into a housing of the fixture, such as the housing 102 of the optical device 100 shown in FIGS. 1 and 6. In this way, the fasteners may mechanically couple the frame 900 to the fixture such that the frame 900 circumferentially surrounds the fixture. The frame 900 may be positioned along a center of gravity of the fixture, which may provide additional support to the fixture.

The frame 900 may further include a plurality of mounts 902 arranged along a circumference of the ring 918. The plurality of mounts 902 may be equally spaced from one another. For example, the plurality of mounts 902 may be equidistantly circumferentially arranged along the frame 900. The plurality of mounts 902 may be arranged in a hexagon shape, for examples where there are six mounts. The mounts 902 may extend parallel with the x-direction.

In one example, there are an even number of the plurality of mounts 902. Alternatively, there may be an odd number of the plurality of mounts 902. In one example, a first pair of mounts 904 may face a first direction (e.g., positive z-direction), a second pair of mounts 906 may face a second direction (e.g., negative z-direction), opposite the first direction. A distance 934 between mounts of the first pair of mounts 904 and the second pair of mounts 906 may be equal to or less than a diameter 914 of the frame 900. A third mount 908 may be positioned diametrically opposite to a fourth mount 910, wherein the third mount 908 faces a third direction (e.g., negative y-direction) and the fourth mount 910 faces a fourth direction (e.g., positive y-direction) opposite to the third direction. The third direction and the fourth direction may be normal to each of the first direction and the second direction.

The first direction and the second direction may be vertical directions while the third direction and the fourth direction may be horizontal directions. Thus, there may be more mounts 902 facing vertical directions than mounts 902 facing horizontal directions. There may be at least as many mounts 902 facing vertical directions than mounts 902 facing horizontal directions. For example, more mounts 902 may be demanded in vertical directions for vertical load bearing than in horizontal directions for horizontal stabilization. In this way, more coupling devices may be used for vertical load bearing than horizontal stabilization, as described further below. In alternative examples, there may be two or more mounts 902 facing each of the first direction, the second direction, the third direction, and the fourth direction.

In one example, the first pair of mounts 904 and the second pair of mounts 906 may extend radially outward from the frame 900 further than the third mount 908 and the fourth mount 910. The first pair of mounts 904 and the second pair of mounts 906 may include a body 916 that extends from the frame 900 and includes a triangular shape. The body 916 may level a curvature of the ring 918 such that the mounts of the first pair of mounts 904 are level to one another. Similarly, the mounts of the second pair of mounts 906 are level to one another. The third and fourth mounts 908, 910 may not include a body configured like the body 916 to face the horizontal directions due to being tangential with the ring 918 according to the position along the ring 918.

The frame 900 may further include guide points 912. The guide points 912 may be configured to retain wires coupled to a fixture, such as a fixture shown in FIG. 20. The guide points 912 may be symmetrically arranged about the frame 900. In one example, neighboring guide points 912 may be separated by at least one of the plurality of mounts 902. The guide points 912 may ensure the wires do not interfere with assembly of the coupling system or movement of the fixtures within the coupling system.

The frame 900, comprising the mounts 902, the guide points 912, and the bosses 922 may be symmetric. For example, the frame 900 may be symmetric across a first symmetry plane 1002 that is parallel with a vertical direction (e.g., z-direction). Additionally or alternatively, the frame 900 may be symmetric across a second symmetry plane 1004, where the second symmetry plane 1004 is parallel with a horizontal direction (e.g., y-direction). The second symmetry plane 1004 may be perpendicular to the first symmetry plane 1002.

Turning now to FIG. 11, it shows a rear side 1100 of the frame 900. The rear side 1100 may be open and reveal a support structure 1102 of the frame 900. The support structure 1102 may include a plurality of triangles that extend between outer and inner circumferences of the frame 900. In this way, the frame 900 may withstand forces imposed thereon due to supporting the fixture. The frame 900 may take load bearing forces away from the fixture positioned in the opening 932.

FIGS. 21A and 21B show a front view 2110 and rear view 2120, respectively, of one of the mounts 902. The front view 2110 is an enlarged view of a portion 930 of FIG. 9. The rear view 2120 is an enlarged view of a portion 1130 of FIG. 11.

The mount 902 includes a receptacle 2102 adapted to receive a coupling device. The receptacle 2102 may be defined by two rails 2104 and an end wall 2106 protruding from a surface 2112. The surface 2112 may determine the direction the mount 902 faces. For example, a mount 902 may be described as facing a direction which the corresponding surface 2112 faces.

The end wall 2106 may be perpendicular to the surface 2112. The end wall 2106 may be trapezoidal. Alternatively, the end wall 2106 may be rectangular, ovular, or any other shape according to geometry of the coupling device. The end wall 2106 may include one or more openings 2108. For example, the openings 2108 may allow visibility of the coupling device when positioned in the receptacle 2102.

The two rails 2104 may be perpendicular to the end wall 2106. The two rails 2104 may extend from the angled sides of the trapezoidal shape of the end wall 2106. The two rails 2104 may extend at a non-perpendicular angle from the surface 2112. In other examples, the two rails may be perpendicular to the surface 2112. The two rails 2104 may bend (e.g., curve, corner, etc.) towards each other. In this way, the two rails 2104 may partially enclose the receptacle 2102. For example, portions 2116 of the two rails 2104 that are further from the surface 2112 may be parallel with the surface 2112. The two rails 2104 may be symmetrical with one another.

A mount opening 2114 may extend from the surface 2112 towards the ring 918. The two rails 2104 may be arranged on opposite sides of the mount opening 2114. The mount opening 2114 may be spaced away from the rear side 1100. The mount opening 2114 may extend along the surface 2112 towards the end wall 2106. In some examples, the mount opening 2114 may also extend upwards along the end wall 2106. In such examples, the mount opening 2114 may be spaced away from the one or more openings 2108. Additionally or alternatively, the mount opening 2114 may be spaced away from the rails 2104. In some examples, the mount opening 2114 is a through-hole. In other examples, the mount opening 2114 may be a recess, or blind hole shaped to receive a latch of a coupling device as described further below.

Figure 12:
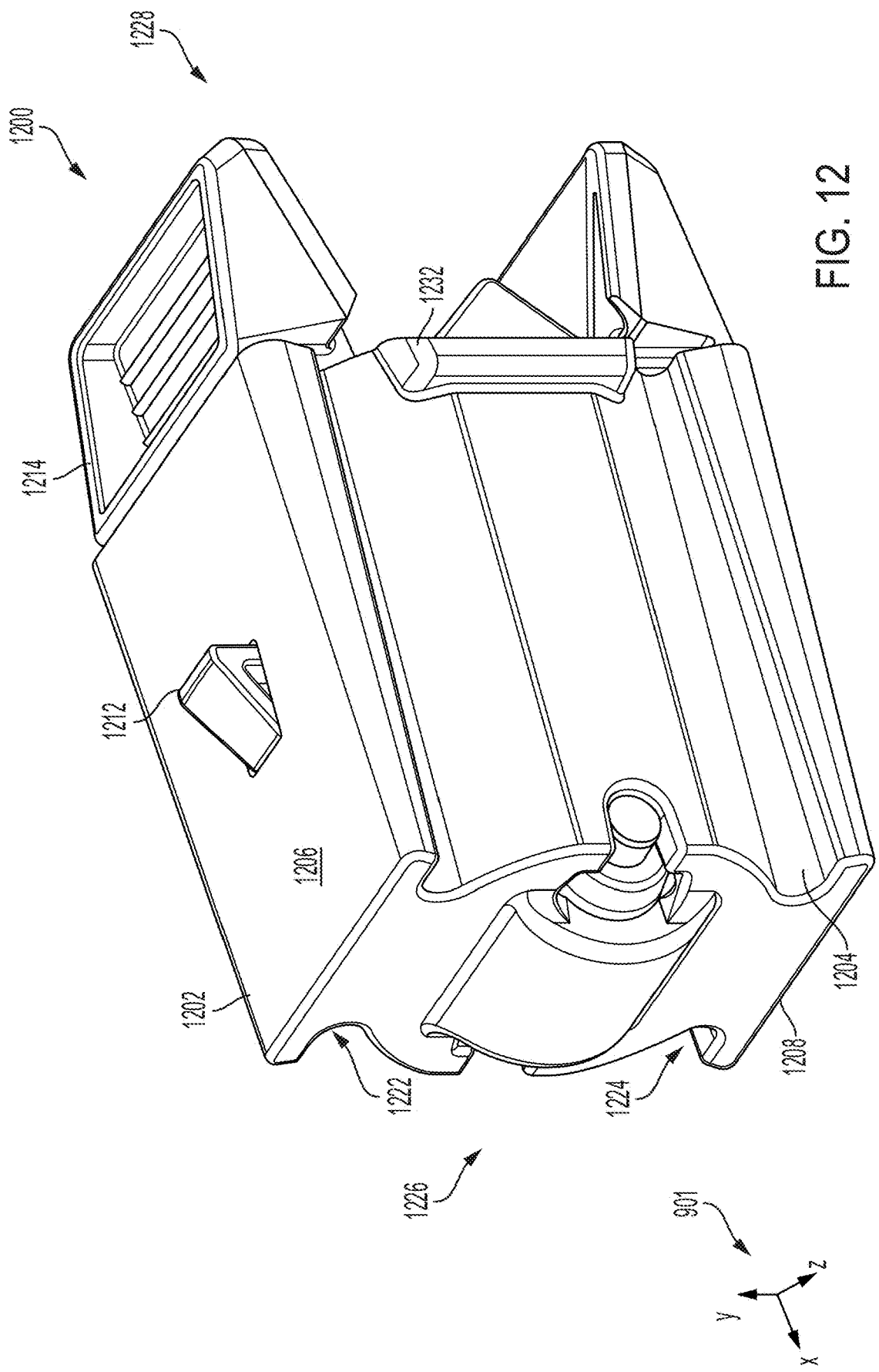
FIG. 12 illustrates a first view of a coupling device.

Turning now to FIG. 12, it shows a coupling device 1200. The coupling device 1200 may be a clip, in one example. Specifically, the coupling device 1200 may be a spring-loaded clip. The coupling device 1200 may be used to couple two frames together by physically and reversibly coupling to their respective mounts. The coupling device 1200 may have an engaged position and a disengaged position. In the engaged position, the coupling device may lock the two frames together. In the disengaged position, the coupling device may not be physically coupled with the two frames. The coupling device 1200 may be moved between the engaged and disengaged positions by adjusting latches such as by actuating levers of the coupling device, as described further below.

The coupling device 1200 may include a body 1202. The body 1202 may be symmetric and complementarily shaped relative to the plurality of mounts 902 of FIGS. 9-11 and 21A-22. For example, the body 1202 may include lobe-shaped recesses 1204 that each receives a rail (e.g., one of the two rails 2104 of FIGS. 21A-22) of a mount of the plurality of mounts. A top 1206 or a bottom 1208 may interface with a receptacle of the mount (e.g., receptacle 2102 of FIGS. 21A-22) such that the coupling device 1200 slidingly engages with the mount. Specifically, the lobe-shaped recesses 1204 may slidingly engage with the rails. For example, the body 1202 may include four lobe-shaped recesses 1204 with a first pair 1222 of the lobe shapes recesses 1204 adjacent to the top 1206 and a second pair 1224 of lobe-shaped recesses 1204 adjacent to the bottom 1208. The first pair 1222 may receive rails of a first mount positioned in face-sharing contact with the top 1206, and the second pair 1224 may receive rails of a second mount positioned in face-sharing contact with the bottom 1208. For example, a hinge end 1226 may be inserted into receptacles of the first mount and the second mount, and the coupling device 1200 may slide theretowards to slidingly engage with the first and second mounts such that a lever end 1228 is positioned where the hinge end 1226 was initially inserted. The coupling device 1200 may also include protrusions 1232 from sides of the body 1202. The protrusions 1232 may be perpendicular to the recesses 1204. The protrusions 1232 may be configured to secure the rails of the corresponding mount within the recesses 1204. Engagement of the coupling device 1200 with mounts is described in greater detail with regard to FIGS. 15-19.

As another example, the coupling device 1200 may include rails shaped similarly to the rails 2104, and the mounts 902 may include complementary lobe-shaped recesses, similar to the recesses 1204. In this way, the coupling device 1200 and the mounts 902 may be slidingly engaged via complementary rails and recesses, where the mounts 902 may include either the rails or the recesses, and the coupling device 1200 may include the other of the rails or the recesses.

The coupling device 1200 may further include a latch 1212. In one example, the latch 1212 is a first latch adjacent to the top 1206. The latch 1212 may be moveable via a first lever 1214. The latch 1212 may be spring-loaded. In the position of FIG. 12, the latch 1212 protrudes through a surface of the top 1206. In one example, the position of FIG. 12 is an engaged (e.g., locked) position. The latch 1212 may extend through an opening of the mount (e.g., mount opening 2114 of FIGS. 21A-22) and lock the coupling device 1200 to the mount. In one example, the latch 1212 may not be removed from a mount to which it is locked without actuating the first lever 1214 to a disengaged position.

Figure 14A:
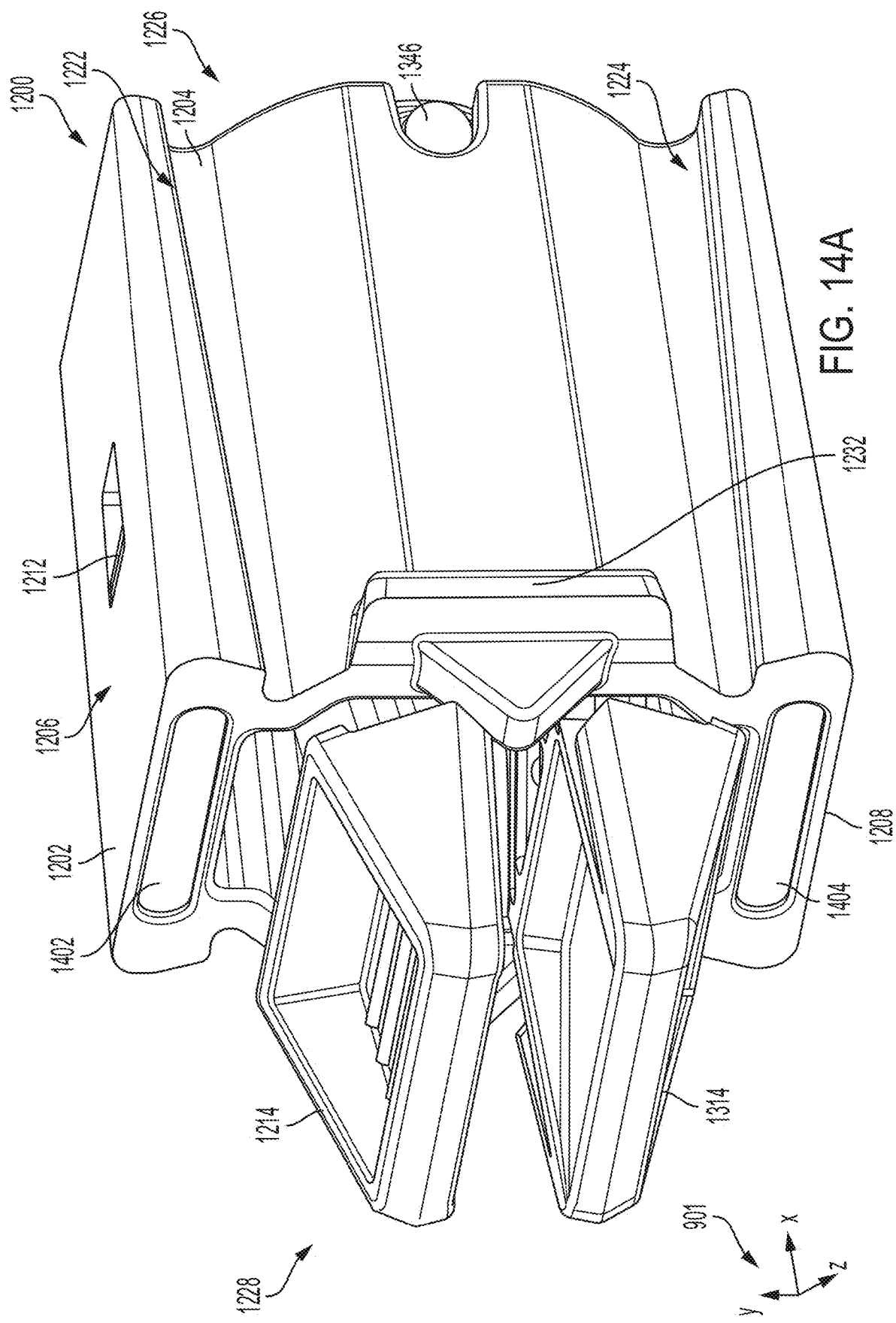
FIGS. 14A and 14B illustrate a first position and a second position, respectively, of the coupling device.

The disengaged (e.g., unlocked) position is shown in greater detail with respect to FIG. 14A. Therein, the disengaged position includes the latch 1212 being flush with (or below) the surface of the top 1206. The latch 1212 does not protrude through the opening of the top 1206 and the coupling device 1200 may be disengaged (e.g., separated, removed, etc.) from a corresponding mount.

Figure 13:
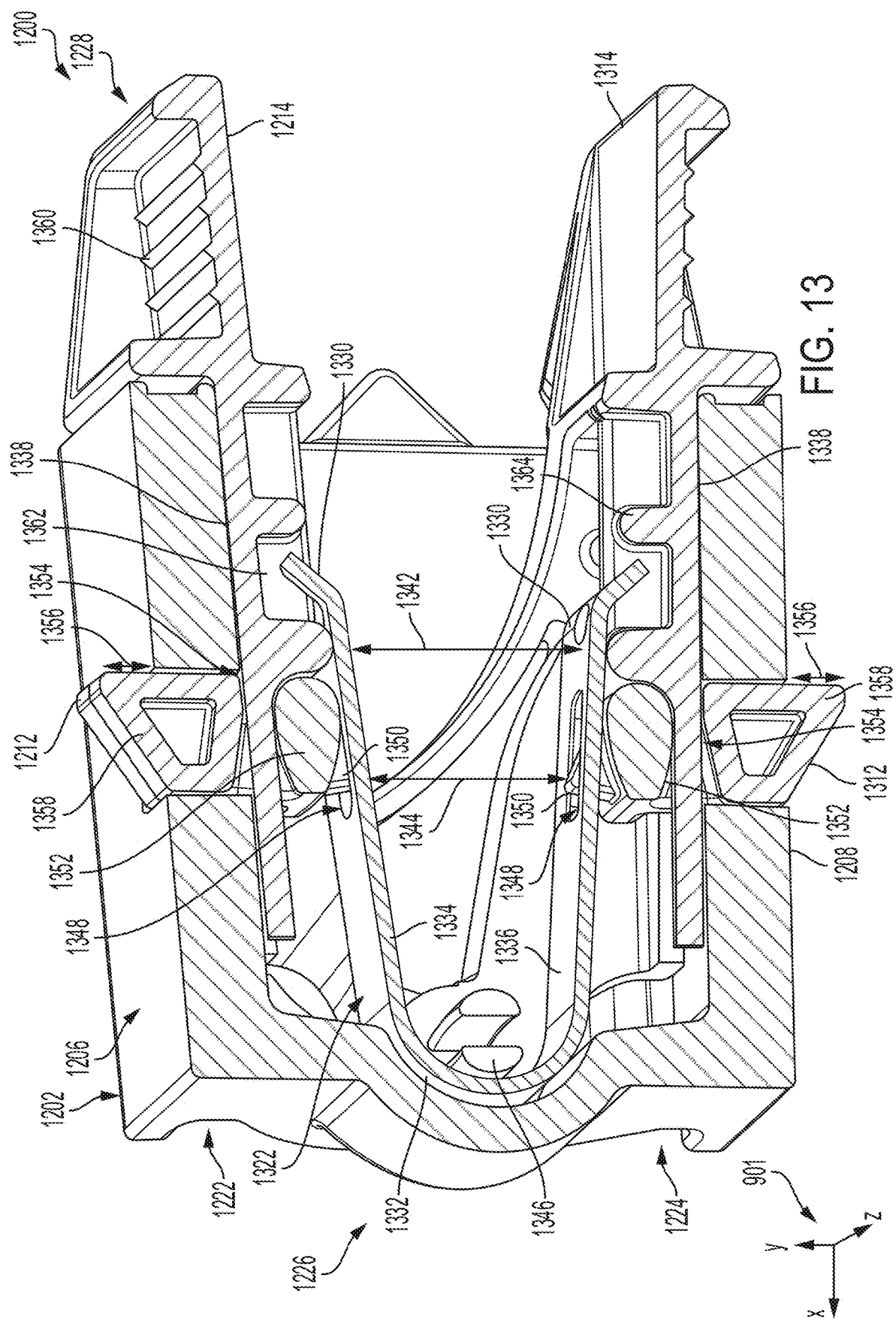
FIG. 13 illustrates a cross-sectional view of the coupling device.

Turning now to FIG. 13, it shows a cross-sectional view of the coupling device 1200. Therein, a second latch 1312 is shown. The second latch 1312 is moved via a second lever 1314. The first latch 1212, the second latch 1312, the first lever 1214, and the second lever 1314 are coupled to a spring 1322. The levers 1214, 1314 may extend beyond the body 1202, allowing a user to actuate the levers 1214, 1314. The first latch 1212 may be moveable via the first lever 1214 and the second latch 1312 may be moveable via the second lever 1314.

The spring 1322 may be flat and curved to fold over in half. For example, the spring 1322 may be described as having three integral portions including a first arm 1334, a second arm 1336, and a curved portion 1332 interposed therebetween. The curved portion 1332 may be closer to the hinge end 1226 than the arms 1334, 1336. The spring 1322 may be resistant to compression. For example, the arms 1334, 11336 may press against inner surfaces 1338 of the body 1202. Specifically, the first arm 1334 may press against the top 1206 and the second arm 1336 may press against the bottom 1208. The locked position where the levers 1214, 1314 are furthest apart and the latches 1212, 1312 protrude out of the body 1202 may be a resting position of the coupling device 1200. In this way, the latches 1212, 1312 may be spring-loaded by the spring 1322 such that the locked position is the resting position of the coupling device 1200.

By moving the levers 1214, 1314 towards each other, the spring 1322 may be compressed, curving further at the curved portion 1332. For example, a user may apply pressure to the levers 1214, 1314 by pinching the levers 1214, 1314 together. The levers 1214, 1314 may include gripping surfaces 1360 with textures such as a plurality of parallel protrusions for the user to grasp the levers 1214, 1314 more firmly (e.g., with greater friction). The levers 1214, 1314 may be separated from the top 1206 and the bottom 1208 of the body 1202 when the spring 1322 is compressed. There may be a gap between the levers 1214, 1314 and the inner surfaces 1338 when the spring 1322 is compressed.

The first and second arms 1334, 1336 may include tabs 1330 on ends opposite the curved portion 1332, closer to the lever end 1228. Each of the first and second arms 1334, 1336 may include two tabs 1330 extending therefrom. The tabs 1330 of the first arm 1334 may bend away from tabs 1330 of the second arm 1336 such that the tabs 1330 extend towards the respective adjacent levers 1214, 1314. The levers 1214, 1314 may include indents 1362 wherealong the tabs 1330 slide as the spring 1322 compresses and expands. In this way, compression of the spring 1322 may be guided relative to the levers 1214, 1314 by the indents 1362 aligning the tabs 1330 with the levers 1214, 1314. Additionally, protrusions 1364 extending laterally from the indents 1362 may stop the tabs 1330 from moving too far towards the lever end 1228. For example, if the spring 1322 were compressed enough that the latches 1212, 1312 do not extend into the body 1202, misalignment of the latches 1212, 1312 and the openings in the top 1206 and the bottom 1208 may occur. Inclusion of the protrusions 1364 may bound a range of motion of the spring 1322 to prevent excess compression where the latches 1212, 1312 separate from the body 1202.

The latches 1212, 1312 may extend through openings 1348 in the first arm 1334 and the second arm 1336. For example, the latches 1212, 1312 may include triangular protrusions 1350 extending through the openings 1348. The protrusions 1350 may remain through the openings 1348 throughout actuation of the spring 1322. In this way, the protrusions 1350 may prevent the spring 1322 from moving laterally, for example towards the lever end 1228. The protrusions 1350 may guide movement of the spring 1322 upon actuation via the levers 1214, 1314 such that the arms 1334, 1336 move vertically to compress or expand the spring 1322.

The spring 1322 may curve around a rivet 1346. The rivet 1346 may extend through the levers 1214, 1314 and the body 1202 at the hinge end 1226. When compressed, the spring 1322 may bend further around the rivet 1346 and the levers 1214, 1314 may hinge around the rivet 1346. The rivet 1346 may ensure the spring 1322 remains in place, relative to the body 1202. Specifically, the rivet 1346 may prevent lateral movement of the spring 1322 towards the lever end 1228. For example, the curved portion 1332 may be interposed between the body 1202 and the rivet 1346. Thus, the rivet 1346, like the protrusions 1350 and the tabs 1330, may stabilize movement of the spring 1322. The rivet 1346 may not be included in some examples.

The latches 1212, 1312 may further include curved portions 1352. The curved portions 1352 may include curved surfaces in contact with the levers 1214, 1314 and with the arms 1334, 1336. The curved surfaces of the curved portions 1352 may allow for smooth transition during actuation of the spring 1322 via the levers 1214, 1314. Additionally, the curved portions 1352 may be sized larger than the arm openings 1348 and lever openings 1354 wherethrough the latches 1212, 1312 extend. In this way, the curved portions 1352 may be interposed between the respective levers 1214, 1314, and the arms 1334, 1336. Thus, as pressure is applied to the levers 1214, 1314, the levers 1214, 1314 may press on the spring 1322 via the curved portions 1352 and/or direct contact therebetween. When pressure is released from the levers, 1214, 1314, the spring 1322 may expand back to the resting position.

The spring 1322 is illustrated in an expanded position in the example of FIG. 13. When the coupling device 1200 is in the disengaged position (e.g., unlocked position), as shown in FIG. 14A, the spring 1322 may be in a compact position, wherein an arm distance 1342 between the arms 1334, 1336 of the spring 1322 is reduced, compared to the expanded position. Additionally, a latch distance 1344 between the first latch 1212 and the second latch 1312 is reduced in the disengaged position, compared to the engaged position. The first latch 1212 and the second latch 1312 may be retractable to the unlocked position via the first lever 1214 and the second lever 1314, respectively. Thus, the first latch 1212 and the second latch 1312 may reversibly lock and unlock, for example respectively with a first mount opening of a first frame and a second mount opening of a second frame.

Turning to FIG. 14A, the coupling device 1200 is shown in the disengaged (e.g., unlocked) position. In the disengaged position, the latches 1212, 1312 do not protrude out of the body 1202. For example, the first latch 1212 and the second latch 1312 may be flush with the top 1206 and the bottom 1208, respectively. To reach the disengaged position from the resting engaged position, a user may manually apply pressure to the levers 1214, 1314 to compress the spring 1322 (not shown in FIG. 14A) and retract the latches 1212, 1312. In this way, the coupling device 1200 may be allowed to slide along surfaces in face-sharing contact with the top 1206 and/or the bottom 1208.

Further, the coupling device 1200 may include visual indicators, including a first indicator 1402 and a second indicator 1404, to signal whether the latches 1212, 1312 are in the engaged or disengaged position when the latches 1212, 1312 are not directly visible. For example, when the coupling device 1200 is positioned to engage with the mount of a frame, the latch may not be visible due to being in contact with the mount. Thus, the indicators 1402, 1404 may provide a simple visual confirmation of whether the coupling device 1200 is engaged with the mount. The first indicator 1402 may indicate whether the latch 1212 is protruding from the body 1202. For example, if the first indicator 1402 is visible, it may be concluded that the first latch 1212 is not locked. If the first indicator 1402 is covered by the lever 1214, the latch 1212 may be in the locked position. Likewise, the second indicator 1404 may indicate whether the second latch 1312 is protruding from the body 1202. For example, if the second indicator 1404 is visible, it may be concluded that the second latch 1312 is not locked. If the second indicator 1404 is covered by the second lever 1314, the second latch 1312 may be in the locked position. In this way positions of the latches 1212, 1312 may be determined without directly seeing the latches 1212, 1312 in order to ensure engagement between the coupling device and the mount of the frame when desired.

In one example, the first lever 1214 and the second lever 1314 may be independently actuated such that one of the levers 1214, 1314 may be in the disengaged position and the other may be in the engaged position. For example, the first lever 1214 may be actuated and the first latch 1212 may retract into an interior space of the coupling device 1200 while the second latch 1312 protrudes out of the bottom 1208 due to the second lever 1314 not being actuated. By doing this, the coupling device 1200 may remain locked (e.g., engaged) to a first mount of a first frame via the second latch 1312 while being unlocked (e.g., disengaged) from a second mount of a second frame, different than the first frame, via the first latch 1212 being retracted.

Figure 14B:
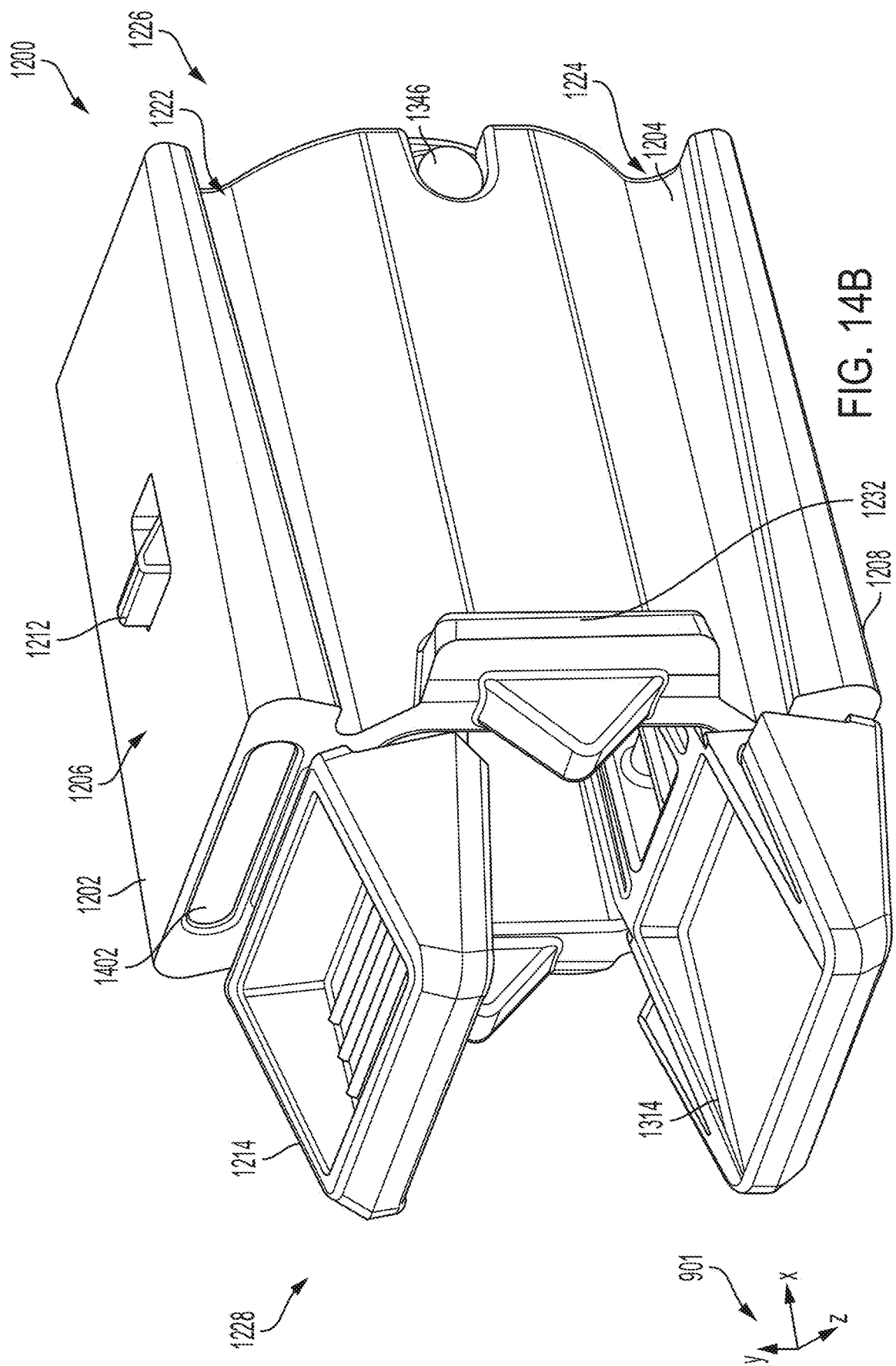

For example, turning to FIG. 14B, the coupling device 1200 is shown in a position where the second latch 1312 (not shown) is locked and the first latch 1212 is not locked. Because the second indicator 1404 of FIG. 14A is blocked by the lever 1314, it may be concluded (e.g., by an installer) that the second latch 1312 is in the locked position. Thus, in the position of FIG. 14B, if the bottom 1208 is in face-sharing contact with a surface, the latch 1312 may be protruding through the surface and interlocked therewith.

Conversely, because the first indicator 1402 is visible, it may be concluded (e.g., by the installer) that the first latch 1212 is protruding less than the maximum distance 1356 of FIG. 13 (e.g., not protruding at all or is protruding up to and not including the distance 1356), and thus is not in the locked position. Therefore, in the position of FIG. 14B, if the top 1206 is in face-sharing contact with a surface, the latch 1212 may not be extending fully therethrough and thus may not be securely interlocked therewith. During assembly of the coupling system, an installer may check for indicators such as the first indicator 1402 to ensure that the coupling devices 1200 are securely locking components such as frames together. If indicators are visible, the installer may adjust the coupling device 1200 until the indicators are not visible to correct misplacement of the coupling device 1200. In this way, structural integrity of the coupling system may be visually confirmed during and following assembly.

Returning to FIG. 13, in one example, portions 1358 of each of the first latch 1212 and the second latch 1312 that protrude from the body 1202 may include a triangular shape. The first latch 1212 and the second latch 1312 may be ramped in a direction such that the coupling device 1200 may be inserted into a mount without actuating the first lever 1214 or the second lever 1314. For example, the latches 1212, 1312 may be ramped towards the lever end 1228. That is, in the locked position, the latches 1212, 1312 may slope from flush with the body 1202 nearest the hinge end 1226, up to a distance 1356 of maximum protrusion from the body 1202 nearest the lever end 1228. In this way, for example, as a surface (e.g., of a mount) slides from the hinge end 1226 towards the latch 1212 along the top 1206, the latch may remain protruding from the top 1206. When the surface reaches the latch 1212 and continues thereover, the latch 1212 may be gradually pushed downwards by the surface according to incline of the ramp shape of the portion of the latch 1212 that protrudes from the body 1202 in the locked position. Thus, the surface being in face-sharing contact with the top 1206 and sliding across the ramped slope of the latch 1212 may retract the latch 1212, rather than actuation of the lever 1214. Although not directly actuated, the lever 1214 may move towards the lever 1314 as a consequence of pushing the latch 1212 into the body 1202. For example, pushing the latch 1212 downwards may directly push the lever 1214 and the first arm 1334 downwards.

The surface may comprise an opening that, when aligned with the latch 1212, allows the latch 1212 to extend therethrough, locking the latch 1212 with the surface. For example, the coupling device 1200 may slide along the surface 2112 of FIG. 21A until the latch 1212 is aligned with the mount opening 2114, allowing the latch 1212 to spring therein and interlock with the corresponding mount 902.

The latch 1312 may be similarly pushed upwards via a surface sliding in face-sharing contact along the bottom 1208 until reaching an opening to spring into. As described above, the latches 1212, 1312 may be independent of one another. Thus, the latch 1212 may be pushed down by a first surface sliding across the top 1206 while the latch 1312 remains in the locked position. Prior, following, or alternatively to the latch 1212 being pushed downward, the latch 1312 may be pushed upward by a second surface sliding across the bottom 1208 while the latch 1212 remains in the locked position. Additionally or alternatively, the latch 1212 and the latch 1312 may be pushed towards each other concurrently by the first and second surfaces sliding against the top 1206 and the bottom 1208.

Thus, the latches 1212, 1312 may be locked with surfaces (e.g., of mounts on frames) to physically couple the surfaces with or without actuating the levers 1214, 1314. Moreover, the latches 1212, 1312 may be locked with the surfaces sequentially or concurrently, allowing for flexibility in assembly, disassembly, or rearrangement of the coupling system comprising the surfaces and the coupling device 1200.

As shown in FIG. 15, the coupling device 1200 may be directed toward a mount of the plurality of mounts 902. The hinge end 1226 of the coupling device 1200 may be closer to the mount 902 when positioned to engage therewith, compared to the lever end 1228. For example, the coupling device 1200 may be directed toward the mount 902 such that the coupling device 1200 may engage with the mount 902 without actuating either the first lever 1214 or the second lever 1314. A detailed view of a portion 1502 of FIG. 15 is shown in FIG. 22. Therein, the coupling device 1200 is positioned with the hinge end 1226 facing the rear side 1100 of the frame 900 and aligned with the mount 902 along the x-direction. For example, the rails 2104 and the recesses 1204 may be parallel with the x-direction. Additionally, the bottom 1208 may be parallel with the surface 2112.

A first distance 2202 from the end wall 2106 to an end of the mount opening 2114 may be approximately the same as a second distance 2204 between the hinge end 1226 and an end of the latch 1212 furthest from the hinge end 1226. Though not shown in FIG. 22, the end of the second latch 1312 furthest from the hinge end 1226 may also be spaced away from the hinge end 1226 by the second distance 2204. In this way, when the latch 1312 is locked into the mount opening 2114, the latch 1312 may hold the coupling device firmly against the end wall 2106. Thus, the latch 1312 may prevent lateral movement in the x-direction of the coupling device 1200 relative to the frame 900 when in the locked position with the mount 902. Additionally, a third distance 2206 between the mount opening 2114 and the rear side 1100 of the frame 900 may be no longer than a fourth distance 2208 between the latches 1212, 1312 and the levers 1214, 1314. In this way, the levers 1214, 1314 may extend from the rear side 1100 such that the frame 900 does not impede the actuation of the levers 1214, 1314 when the coupling device 1200 is locked into the mount 902.

The coupling device 1200 is shown coupled to the mount 902 in FIG. 16. For example, the coupling device 1200 may slide along the x-direction from the position in FIG. 15 to the position in FIG. 16 such that the receptacle 2102 receives the coupling device 1200 and the recesses 1204 receive the rails 2104. Specifically, the second pair 1224 are shown coupled to the rails 2104 with the bottom 1208 (not shown in FIG. 22) in face-sharing contact with a surface of the mount 902 (e.g., the surface 2112 of FIGS. 21A-22). However, due to the symmetrical design of the coupling device 1200, the coupling device 1200 may be flipped such that the first pair 1222 engages with the rails 2104 and the top 1206 is in face-sharing contact with the surface of the mount 902.

The rails 2104 engaging with the recesses 1204 may maintain the position of the coupling device 1200 relative to the frame 900 in the radial and tangential directions with respect to the frame 900. The radial and tangential directions may be y- and z-directions respectively in the orientation of FIG. 16. Additionally or alternatively, the radial and tangential directions may be perpendicular to the rails 2104. Additionally, the protrusions 1232 may directly contact the rails 2104. In this way, the protrusions may further stabilize the position of the coupling device 1200 relative to the frame 900 in the radial direction with respect to the frame 900 (e.g., y-direction in the orientation of FIG. 16). For example, the rails 2104 may be interposed between the protrusions 1232 and the bottom 1208. In some examples, there may be additional protrusions extending from the coupling device 1200 that are configured to contact the rails 2104 in the locked position in order to add strength to the coupling between the coupling device 1200 and the frame 900 in the radial direction with respect to the frame 900.

The coupling device 1200 may be in face-sharing contact with the end wall 2106. That is, the hinge end 1226 may be pressed against an inner surface of the end wall 2106. For example, the latch 1312 being against an end of the mount opening 2114 (not shown in FIG. 16) closest to the rear side 1100 such that the latch is locked into the mount opening may maintain the position of the coupling device 1200 relative to the frame 900 in an axial direction (e.g., x-direction with respect to the orientation in FIG. 16). The axial direction may be parallel with the rails 2104.

The coupling device 1200 may engage with a second mount of a second frame. For example, the second mount may slidingly engage with the first pair 1222 with the top 1206 in contact with a surface of the second mount, and the latch 1212 extending through an opening in the second mount. Additionally, further coupling devices 1200 may couple to other mounts 902 of the frame 900. For example, each of the mounts 902 may engage with a coupling device 1200. In one example, there may be up to six coupling devices 1200 coupled to the frame 900.

FIG. 17 shows a plurality of coupling devices 1700, which may be identical to the coupling device 1200 of FIG. 12, directed toward mounts of the plurality of mounts 902. As this occurs, the coupling device 1200 remains physically coupled to the mount of the plurality of mounts 902. In this way, coupling devices 1200 may be sequentially physically coupled to the frame 900 to build a coupling system in accordance with the present disclosure. Additionally, to disassemble or rearrange the coupling system, some coupling devices may remain engaged while others are disengaged. In this way, the coupling systems of the present disclosure may be modular and rearrangeable following initial installation.

FIG. 18 shows the plurality of coupling devices 1700 physically coupled to the plurality of mounts 902. The plurality of coupling devices 1700 may be physically coupled to the first pair of mounts 904. Each of the coupling devices 1700 may be physically coupled to a corresponding mount of the plurality of mounts 902. In the example of FIG. 18, three coupling devices 1200 are physically coupled to three different mounts of the plurality of mounts 902. In the example of FIG. 18, the three coupling devices 1200 may be configured to physically couple the frame 900 with up to three other frames, which may be identical to the frame 900. Two of the coupling devices 1200 may couple to two mounts of a second frame such that the three coupling devices shown in FIG. 18 may physically couple the frame 900 with up to two other frames. In the example of FIG. 18, up to three more coupling devices may be engaged with the frame 900. In this way, the frame 900 may be coupled with up to six other mounts, for example of three or more other frames, which may be identical to the mounts 902 of the frame 900.

FIG. 19 illustrates a detailed view of the coupling device 1200 engaged with the mount 902 of the first pair of mounts 904. As described above, the coupling device 1200 may be reversibly slidingly engaged with the rails 2104 and locked with the opening 2114 via the latch 1312 of FIG. 13 such that the coupling device 1200 is in face-sharing contact with the end wall 2106. A second mount (e.g., of a second frame) may engage with the first pair 1222 and the latch 1212 of the coupling device 1200 to physically couple the mount 902 with the second mount. In the example of FIG. 12, the coupling device 1200 may be load-bearing, due to facing a vertical direction.

FIG. 23 illustrates an exemplary coupling system 2300 comprising a plurality of the frame 900 and a plurality of the coupling device 1200. The coupling devices 1200 may interconnect the frames 900, as described above. The frames 900 may be identical to one another. Likewise, the coupling devices 1200 may be identical to one another.

For example, a first mount 902a of a first frame 900a may be physically coupled with a second mount 902b of a second frame 900b via a first coupling device 1200a. The first mount 902a and the second mount 902b may face each other with the first coupling device 1200a interposed therebetween. The first mount 902a and the second mount 902b may be horizontally adjacent and the first coupling device 1200 may be a horizontal coupling device. Horizontal coupling devices which couple horizontally adjacent frames may provide support between columns.

The interconnected frames 900 and coupling devices 1200 may be physically coupled to an expandable bar 2302. The bar 2302 may be a rectangular bar. Alternatively, the bar 2302 may be cylindrical. An expandable element 2310 may slide in and out of the bar 2302 to lengthen the bar 2302 according to a structure whereon the coupling system 2300 is mounted. A fastener 2312 may fix the expandable element 2310 with the bar 2302 at a desired length. The expandable element 2310 may be inserted into a second expandable bar to connect the two expandable bars 2302. In this way, additional columns of frames 900 may be added to the coupling system 2300.

The expandable bar 2302 may include one or more bar mounts 2314. The bar mount 2314 may be identical to the mounts 902 of the frames 900. For example, the bar mount 2314 may include rails adapted to engage with lobe-shaped recesses of the coupling devices 1200 and a mount opening configured to receive a latch of the coupling devices 1200. In this way, one or more of the coupling devices 1200 may engage with one of each of the mounts 902 and the bar mount 2314 to attach the frames 900 to the expandable bar 2302. For example, a second coupling device 1200*b* may physically couple a third mount 902*c* of the first frame 900*a* and a fourth mount 2314*a* of the expandable bar 2302. The third mount 902*c* and the fourth mount 2314*a* may be vertically adjacent such that the second coupling device 1200*b* may be a vertical coupling device. Vertical coupling devices may be more load-bearing than horizontal coupling devices such as the first coupling device 1200.

The bar 2302 may be secured to a structure. For example, the structure may include a rod that extends through sliding couplers 2304 atop the expandable bar 2302. The sliding couplers 2304 may slide along the bar 2302 and be fixed to any points along the bar 2302. The sliding couplers 2304 may include clamps 2308 and fasteners 2306 that tighten the clamps 2308 around the rod of the structure. In this way, the coupling system 2300 may hang from the structure at a top 2322 of the coupling system 2300. In some examples, a bottom 2324 of the coupling system 2300 may also be secured, to the same structure or a different structure. In other examples, the coupling system 2300 may hang freely (e.g., without fixing other points than the top 2322). The frames 900 and the coupling devices 1200 may withstand vertical load due to hanging, rather than fixtures arranged in the frames 900 and coupled thereto via the bosses 922 and the fasteners 924. That is, the frames 900 and the coupling devices 1200 may reduce load upon the fixtures.

Vertically adjacent frames 900 may be spaced away from one another by a vertical distance 2326. Horizontally adjacent frames 900 may be spaced away from one another by a horizontal distance 2328. The vertical distance 2326 may be approximately equal to the horizontal distance 2328. Alternatively, the vertical distance 2326 may be longer or shorter than the horizontal distance 2328. The vertical distance 2326 and the horizontal distance 2328 may be great enough to allow actuation of the fixtures (e.g., rotation, swiveling, pivoting, etc.) without collision of the fixtures.

In this way, the coupling system 2300 may support a plurality of fixtures. The coupling system 2300 may include array (e.g., individual columns or rows), grid or lattice configurations. For example, each column may include up to fifteen frames. In another example, each column may include up to twenty frames. In another example, each column may include up to fifty frames. Any number of bars 2302 may be arranged side-by-side to extend rows and increase a number of columns of frames. Between adjacent frames 900 within a column (e.g., vertically adjacent frames), two coupling devices 1200 may engage with mounts of each of the frames 900. Between adjacent frames 900 within a row (e.g., horizontally adjacent frames), one coupling device 1200 may engage with mounts of each of the frames 900. In this way, there may be more vertical coupling devices than horizontal coupling devices due to vertical load being greater. In other examples, different numbers of coupling devices may be used. For example, there may be one or more coupling devices between pairs of vertically adjacent frames and one or more coupling devices between pairs of horizontally adjacent frames.

The coupling system 2300 may support the fixtures throughout a range of motion of the fixtures, such as rotation. Additionally, in examples where the fixtures include a lens actuation system (e.g., lens actuation system 400 of FIGS. 4A-8B), the coupling system 2300 may support the fixtures throughout a range of motion of the lens (e.g., lens 150 moving between the upstream and downstream positions).

The technical effect of the optical device disclosed herein, and particularly the lens actuation system, is to move a lens of the optical device between an upstream position and a downstream position in linear motion such that stopping and reversing the driving motion is not demanded at the upstream and the downstream positions. Rotational motion of a flywheel may be translated via articulating arms to the linear oscillating motion of the lens. In this way, the lens actuation system may actuate continuously, and consequently, the lens may move more rapidly. Further, a single sensor may detect a magnet positioned off-center (e.g., along a circumference) of the flywheel in order to determine current state (e.g., position and velocity) of the lens, rather than two or more sensors as demanded in at least some previous optical devices.

The disclosure also provides support for a lens actuation system, comprising: a motor rotationally coupled to a flywheel via a shaft, a rod coupled at a first end to the flywheel and at a second end opposite the first end to a connecting linkage, wherein the first end is off-center of the flywheel and the second end is off-center of the connecting linkage, a plurality of articulating arms coupling the connecting linkage with a frame housing a lens. In a first example of the system, the connecting linkage is fixed at pivot joints to a housing surrounding the lens actuation system. In a second example of the system, optionally including the first example, the rod rotationally couples the connecting linkage and the flywheel, and the connecting linkage includes a first rotational axis extending through the pivot joints parallel with a second rotational axis of the flywheel. In a third example of the system, optionally including one or both of the first and second examples, the frame is slidingly engaged with tracks of a housing. In a fourth example of the system, optionally including one or more or each of the first through third examples, the tracks are perpendicular with a first rotational axis of the connecting linkage and a second rotational axis of the flywheel. In a fifth example of the system, optionally including one or more or each of the first through fourth examples, the plurality of articulating arms includes a first arm pair and a second arm pair, the first arm pair extending between the connecting linkage and the second arm pair and the second arm pair extending between the first arm pair and the frame with a variable angle between the first arm pair and the second arm pair. In a sixth example of the system, optionally including one or more or each of the first through fifth examples, the connecting linkage is curved around and spaced away from a cone, and a distance between the frame and the cone is adjustable according to rotation of the flywheel. In a seventh example of the system, optionally including one or more or each of the first through sixth examples, the flywheel is configured to rotate 360 degrees. In a eighth example of the system, optionally including one or more or each of the first through seventh examples, the lens is a front lens of an optical device.

The disclosure also provides support for an optical device, comprising: a light emitting diode (LED) element, a lens positioned at a distance away from the LED element, a lens actuation system including a motor adapted to drive movement of a flywheel, a connecting linkage, and a plurality of articulating arms to adjust the distance, and a sensor adapted to measure a position of the flywheel. In a first example of the system, a frame surrounding the lens includes retention arms engaged with tracks in a housing, the tracks parallel with the distance and perpendicular with the lens. In a second example of the system, optionally including the first example, the connecting linkage is contoured according to curvature of a cone interposed between the lens and the LED element. In a third example of the system, optionally including one or both of the first and second examples, the connecting linkage connects a first arm pair diametrically opposite one another across the cone. In a fourth example of the system, optionally including one or more or each of the first through third examples, the sensor is a magnetic sensor and a magnet is positioned off-center of the flywheel. In a fifth example of the system, optionally including one or more or each of the first through fourth examples, the sensor is electrically coupled to a printed circuit board located between the LED element and the lens actuation system. In a sixth example of the system, optionally including one or more or each of the first through fifth examples, the optical device further includes a controller with instructions stored in non-volatile memory thereof, the instructions executable to move the lens to a target position or at a target frequency.

In another representation, the disclosure also provides support for a method for operating a lens actuation system, comprising: determining a target position or frequency of a lens, moving the lens linearly by actuating a motor to rotate a flywheel, measuring a measured position or frequency of the flywheel, determining a current position or frequency of the lens from the measured position or frequency, until the current position or frequency matches the target position or frequency, adjusting the current position or frequency, and if the current position or frequency matches the target position or frequency, stopping the lens at the current position or continuing moving the lens at the current frequency. In a first example of the method, the target position of the lens is a position along a linear path between and including an upstream position and a downstream position. In a second example of the method, optionally including the first example, target frequency is a target oscillating frequency at which the lens linearly oscillates between an upstream and a downstream position due to continuous output of the motor in a single rotational direction. In a third example of the method, optionally including one or both of the first and second examples, the measured frequency of the flywheel is approximately the same as the current frequency of the lens.

In another representation, the disclosure also provides support for a system, comprising: a motor, a flywheel rotationally coupled to the motor, a connecting linkage coupled to the flywheel via a rod, and a plurality of articulating arms extending from the connecting linkage to a frame housing a lens. In a first example of the system, the flywheel is configured to rotate 360 degrees. In a second example of the system, optionally including the first example, the frame comprises retention arms that engage with tracks arranged in a housing. In a third example of the system, optionally including one or both of the first and second examples, the retention arms are configured to move relative to the housing along a first axis and a second axis, the second axis normal to the first axis. In a fourth example of the system, optionally including one or more or each of the first through third examples, the second axis is parallel to an axis about which the flywheel rotates. In a fifth example of the system, optionally including one or more or each of the first through fourth examples, the lens is a front lens of an optical device. In a sixth example of the system, optionally including one or more or each of the first through fifth examples, each of the flywheel, the connecting linkage, the rod, the plurality of articulating arms, the frame, and the lens is configured to move based on operation of the motor.

In another representation, the disclosure also provides support for a lens actuation system, comprising: a motor rotationally coupled to a flywheel via a shaft, a rod coupled at a first end to the flywheel and at a second end opposite the first end to a connecting linkage, wherein the first end is off-center of the flywheel and the second end is off-center of the connecting linkage, a plurality of articulating arms coupling the connecting linkage with a frame housing a lens. In a first example of the system, the connecting linkage is fixed at pivot joints to a housing surrounding the lens actuation system. In a second example of the system, optionally including the first example, the rod rotationally couples the connecting linkage and the flywheel, and the connecting linkage includes a first rotational axis extending through the pivot joints parallel with a second rotational axis of the flywheel. In a third example of the system, optionally including one or both of the first and second examples, the frame is slidingly engaged with tracks of a housing. In a fourth example of the system, optionally including one or more or each of the first through third examples, the tracks are perpendicular with a first rotational axis of the connecting linkage and a second rotational axis of the flywheel. In a fifth example of the system, optionally including one or more or each of the first through fourth examples, the plurality of articulating arms includes a first arm pair and a second arm pair, the first arm pair extending between the connecting linkage and the second arm pair and the second arm pair extending between the first arm pair and the frame with a variable angle between the first arm pair and the second arm pair. In a sixth example of the system, optionally including one or more or each of the first through fifth examples, the connecting linkage is curved around and spaced away from a cone, and a distance between the frame and the cone is adjustable according to rotation of the flywheel.

In another representation, the disclosure also provides support for an optical device, comprising: a light emitting diode (LED) element, a lens positioned at a distance away from the LED element, a lens actuation system including a motor adapted to drive movement of a flywheel, a connecting linkage, and a plurality of articulating arms to adjust the distance, and a sensor adapted to measure a position of the flywheel. In a first example of the system, a frame surrounding the lens includes retention arms engaged with tracks in a housing, the tracks parallel with the distance and perpendicular with the lens. In a second example of the system, optionally including the first example, the connecting linkage is contoured according to curvature of a cone interposed between the lens and the LED element. In a third example of the system, optionally including one or both of the first and second examples, the connecting linkage connects a first arm pair diametrically opposite one another across the cone. In a fourth example of the system, optionally including one or more or each of the first through third examples, the sensor is a magnetic sensor and a magnet is positioned along a circumference of the flywheel. In a fifth example of the system, optionally including one or more or each of the first through fourth examples, the sensor is electrically coupled to a printed circuit board located between the LED element and the lens actuation system.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lens actuation system, comprising:
a motor rotationally coupled to a flywheel via a shaft;
a rod coupled at a first end to the flywheel and at a second end opposite the first end to a connecting linkage, wherein the first end is off-center of the flywheel and the second end is off-center of the connecting linkage; and
a plurality of articulating arms coupling the connecting linkage with a frame housing a lens.

2. The lens actuation system of claim 1, wherein the connecting linkage is fixed at pivot joints to a housing surrounding the lens actuation system.

3. The lens actuation system of claim 2, wherein the rod rotationally couples the connecting linkage and the flywheel, and the connecting linkage includes a first rotational axis extending through the pivot joints parallel with a second rotational axis of the flywheel.

4. The lens actuation system of claim 1, wherein the frame is slidingly engaged with tracks of a housing.

5. The lens actuation system of claim 4, wherein the tracks are perpendicular with a first rotational axis of the connecting linkage and a second rotational axis of the flywheel.

6. The lens actuation system of claim 1, wherein the plurality of articulating arms includes a first arm pair and a second arm pair, the first arm pair extending between the connecting linkage and the second arm pair and the second arm pair extending between the first arm pair and the frame with a variable angle between the first arm pair and the second arm pair.

7. The lens actuation system of claim 1, wherein the connecting linkage is curved around and spaced away from a cone, and a distance between the frame and the cone is adjustable according to rotation of the flywheel.

8. The lens actuation system of claim 1, wherein the flywheel is configured to rotate 360 degrees.

9. The lens actuation system of claim 1, wherein the lens is a front lens of an optical device.

10. An optical device, comprising:
a light emitting diode (LED) element;
a lens positioned at a distance away from the LED element;
a lens actuation system including a motor adapted to drive movement of a flywheel, a connecting linkage, and a plurality of articulating arms to adjust the distance; and
a sensor adapted to measure a position of the flywheel.

11. The optical device of claim 10, wherein a frame surrounding the lens includes retention arms engaged with tracks in a housing, the tracks parallel with the distance and perpendicular with the lens.

12. The optical device of claim 10, wherein the connecting linkage is contoured according to curvature of a cone interposed between the lens and the LED element.

13. The optical device of claim 12, wherein the connecting linkage connects a first arm pair diametrically opposite one another across the cone.

14. The optical device of claim 10, wherein the sensor is a magnetic sensor and a magnet is positioned off-center of the flywheel.

15. The optical device of claim 10, wherein the sensor is electrically coupled to a printed circuit board located between the LED element and the lens actuation system.

16. The optical device of claim 10, wherein the optical device further includes a controller with instructions stored in non-volatile memory thereof, the instructions executable to move the lens to a target position or at a target frequency.

17. A method for operating a lens actuation system, comprising:
generating output light from a light emitting diode (LED) element;
moving a lens receiving the output light linearly back and forth via the lens actuation system by rotating a motor in a single direction, the lens actuation system having a connecting linkage; and
sensing the movement or rotation via a sensor.

18. The method of claim 17, wherein sensing includes the sensor detecting a detectable element positioned on a rotating component of the lens actuation system or on a frame housing the lens.

19. The method of claim 17, wherein movement of the lens is linear oscillating motion.

20. The method of claim 17, wherein the motor does not pause or reverse rotation to reverse linear movement of the lens.

* * * * *